(12) United States Patent
Choi et al.

(10) Patent No.: US 12,075,056 B2
(45) Date of Patent: Aug. 27, 2024

(54) VIDEO ENCODING METHOD AND DEVICE, AND VIDEO DECODING METHOD AND DEVICE

(71) Applicant: SAMSUNG ELECTRONICS CO., LTD., Suwon-si (KR)

(72) Inventors: Narae Choi, Suwon-si (KR); Minwoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 323 days.

(21) Appl. No.: 17/555,943

(22) Filed: Dec. 20, 2021

(65) Prior Publication Data

US 2022/0116613 A1    Apr. 14, 2022

Related U.S. Application Data

(63) Continuation of application No. PCT/KR2020/007995, filed on Jun. 19, 2020.
(Continued)

(51) Int. Cl.
*H04N 19/593* (2014.01)
*H04N 19/105* (2014.01)
(Continued)

(52) U.S. Cl.
CPC ......... *H04N 19/132* (2014.11); *H04N 19/105* (2014.11); *H04N 19/117* (2014.11);
(Continued)

(58) Field of Classification Search
CPC .. H04N 19/132; H04N 19/105; H04N 19/117; H04N 19/159; H04N 19/176;
(Continued)

(56) References Cited

U.S. PATENT DOCUMENTS

| 8,902,978 B2* | 12/2014 | Lim ..................... H04N 19/154 |
| | | 382/238 |
| 9,628,822 B2* | 4/2017 | Leontaris ............. H04N 19/182 |

(Continued)

FOREIGN PATENT DOCUMENTS

| KR | 10-2013-0047650 A | 5/2013 |
| KR | 10-2018-0030791 A | 3/2018 |

(Continued)

OTHER PUBLICATIONS

Akula et al., "Description of SDR, HDR and 360° video coding technology proposal considering mobile application scenario by Samsung, Huawei, GoPro, and Hisilicon", buJoint Video Exploration Team (JVET) of ITU-T SG 16 WP 3 and ISO/IEC JTC 1/SC 29 WG 11, JVET-J0024 v2, 2018, 124 pages.

(Continued)

*Primary Examiner* — Philip P. Dang
(74) *Attorney, Agent, or Firm* — Sughrue Mion, PLLC

(57) ABSTRACT

The present disclosure relates to apparatus and methods of image decoding and image encoding. In one or more embodiments, an image decoding method may comprise determining a first sample value of an upper left reference sample of the current block. The image decoding method may further comprise sequentially searching for a searched reference sample of at least one reference line from a plurality of reference lines, except for the upper left reference sample. The image decoding method may further comprise determining a second sample value of remaining reference samples of the current block, except for the upper left reference sample. The image decoding method may further comprise performing intra prediction on the current block to obtain a prediction block of the current block. The image decoding method may further comprise obtaining a (Continued)

```
if (IS_AVAIL(avail_cu, AVAIL_UP_LE)) //availability check of top-left pixel
{
    copy(up - 1, src - s_src - 1, cuw * sizeof(pel)); // store value of top-left pixel in buffer
}
else
{
    up[-1] = 1 << (BIT_DEPTH - 1); // store a default value in buffer
}
for (i = 0; i < (scuw + scuh); i++)   // upper reference // process for filling in upper reference buffer
{
    int is_avail = (y_scu > 0) && (x_scu + i < w_scu);
    if (is_avail && MCU_GET_COD(map_scu[scup - w_scu + i])) // availability check for each predetermined unit
    {
        copy(up + i * unit_size, src - s_src + i * unit_size, unit_size * sizeof(pel)); // when available, store pixel value in buffer
    }
    else
    {
        evc_mset_16b(up + i * unit_size, up[i * unit_size - 1], unit_size);  // when unavailable, pad directly previous pixel value
    }
}
up[-2] = left[0]; // when reference in left direction with respect to current block in upper reference is used,
        substitute value by reference value in more adjacent left direction
(pixel value of original location may be used, or value of up[-1] may be padded and used)
``` residual block of the current block and a reconstruction block of the current block.

4 Claims, 33 Drawing Sheets

Related U.S. Application Data

(60) Provisional application No. 62/864,815, filed on Jun. 21, 2019.

(51) Int. Cl.
*H04N 19/117* (2014.01)
*H04N 19/132* (2014.01)
*H04N 19/159* (2014.01)
*H04N 19/176* (2014.01)
*H04N 19/82* (2014.01)

(52) U.S. Cl.
CPC ......... *H04N 19/159* (2014.11); *H04N 19/176* (2014.11); *H04N 19/82* (2014.11)

(58) Field of Classification Search
CPC ...... H04N 19/82; H04N 19/109; H04N 19/11; H04N 19/137; H04N 19/593
See application file for complete search history.

(56) References Cited

U.S. PATENT DOCUMENTS

| | | | | |
|---|---|---|---|---|
| 9,716,894 | B2* | 7/2017 | Joshi | H04N 19/467 |
| 10,136,140 | B2* | 11/2018 | Li | H04N 19/56 |
| 10,142,627 | B2* | 11/2018 | Zhao | H04N 19/593 |
| 10,142,655 | B2* | 11/2018 | Lin | H04N 19/593 |
| 10,171,819 | B2* | 1/2019 | Ramamurthy | H04N 19/147 |
| 10,200,713 | B2* | 2/2019 | Pang | H04N 19/61 |
| 10,218,975 | B2* | 2/2019 | Chien | H04N 19/176 |
| 10,306,265 | B2* | 5/2019 | Liu | H04N 19/597 |
| 10,397,612 | B2* | 8/2019 | Chen | H04N 19/593 |
| 10,477,210 | B2* | 11/2019 | Hinz | H04N 19/503 |
| 10,531,084 | B2* | 1/2020 | Yoo | H04N 19/107 |
| 10,659,812 | B2* | 5/2020 | Jin | H04N 19/176 |
| 10,681,351 | B2* | 6/2020 | Huang | H04N 19/174 |
| 10,742,973 | B2* | 8/2020 | Park | H04N 19/17 |
| 10,904,567 | B2* | 1/2021 | Kang | H04N 19/18 |
| 11,082,688 | B2* | 8/2021 | Yu | H04N 19/583 |
| 11,128,861 | B2* | 9/2021 | Ko | H04N 19/184 |
| 11,212,553 | B2* | 12/2021 | Ko | H04N 19/182 |
| 11,336,899 | B2* | 5/2022 | Jun | H04N 19/13 |
| 11,363,293 | B2* | 6/2022 | Ye | H04N 19/103 |
| 11,405,620 | B2* | 8/2022 | Jun | H04N 19/159 |
| 11,445,173 | B2* | 9/2022 | Tsai | H04N 19/132 |
| 11,451,791 | B2* | 9/2022 | Kim | H04N 19/105 |
| 11,616,987 | B2* | 3/2023 | Jeong | H04N 19/172 375/240.29 |
| 2014/0334542 | A1 | 11/2014 | Lee et al. | |
| 2016/0227244 | A1* | 8/2016 | Rosewarne | H04N 19/70 |
| 2017/0085917 | A1* | 3/2017 | Hannuksela | H04N 19/136 |
| 2018/0091825 | A1 | 3/2018 | Zhao et al. | |
| 2018/0176595 | A1* | 6/2018 | Park | H04N 19/11 |
| 2018/0199062 | A1* | 7/2018 | Zhang | H04N 19/59 |
| 2018/0213224 | A1 | 7/2018 | Son et al. | |
| 2018/0324441 | A1* | 11/2018 | Lim | H04N 19/17 |
| 2020/0021801 | A1 | 1/2020 | Jeong et al. | |
| 2020/0359014 | A1 | 11/2020 | Piao et al. | |
| 2022/0116613 | A1 | 4/2022 | Choi et al. | |

FOREIGN PATENT DOCUMENTS

| | | |
|---|---|---|
| KR | 10-2018-0080114 A | 7/2018 |
| KR | 10-2018-0086094 A | 7/2018 |
| KR | 10-2019-0038530 A | 4/2019 |
| KR | 10-2019-0068517 A | 6/2019 |
| KR | 10-2232246 B1 | 3/2021 |

OTHER PUBLICATIONS

Kiho Choi et al., "[EVC] Suggested improvements for EVC WD", Shape the Future with Innovation and Intellegence, 2019, 14 pages.
Communication dated Mar. 16, 2023 by the European Patent Office for EP Patent Application No. 20826177.6.
Korean Office Action, dated Oct. 26, 2022 issued by the Korean Patent Office, in App No. 10-2022-0060424.
Communication dated Sep. 17, 2020, issued by the International Searching Authority in counterpart International Application No. PCT/KR2020/007995 (PCT/ISA/220, 210, 237).
Communication dated Sep. 21, 2020, issued by the Korean Intellectual Property Office in Korean Patent Application No. 10-2020-0075277.
Van der Auwera et al., "Description of Core Experiment 3: Intra Prediction and Mode Coding," JVET-J1023_r2, Joint Video Experts Team (JVET) of ITU-T SG 16 WP 3 and ISO/IEC JTC 1/SC 29/WG 11, published on Jun. 21, 2018, total 49 pages.
Chen et al., "Algorithm description for Versatile Video Coding and Test Model 5 (VTM 5)," JVET-N1002-v2, Joint Video Experts Team (JVET) of ITU-T SG 16 WP 3 and ISO/IEC JTC 1/SC 29/WG 11, published on Jun. 11, 2019, total 79 pages.
Communication dated Dec. 19, 2020, issued by the Korean Intellectual Property Office in Korean Patent Application No. 10-2020-0075277.
Communication dated Sep. 17, 2021, issued by the Korean Intellectual Property Office in Korean Patent Application No. 10-2021-0036241.
Communication dated Feb. 17, 2022, issued by the Korean Intellectual Property Office in Korean Patent Application No. 10-2021-0182214.
Communication issued Dec. 9, 2023 by the Intellectual Property Office of India in Indian Patent Application No. 202247001305.

* cited by examiner

FIG. 3D

```
if (IS_AVAIL(avail_cu, AVAIL_UP_LE)) //availability check of top-left pixel
{
    copy(up - 1, src - s_src - 1, cuw * sizeof(pel)); // store value of top-left pixel in buffer
}
else
{
    up[-1] = 1 << (BIT_DEPTH - 1); // store a default value in buffer
}
for (i = 0; i < (scuw + scuh); i++)   // upper reference // process for filling in upper reference buffer
{
    int is_avail = (y_scu > 0) && (x_scu + i < w_scu);
    if (is_avail && MCU_GET_COD(map_scu[scup - w_scu + i])) // availability check for each predetermined unit
    {
        copy(up + i * unit_size, src - s_src + i * unit_size, unit_size * sizeof(pel)); // when available, store pixel value in buffer
    }
    else
    {
        evc_mset_16b(up + i * unit_size, up[i * unit_size - 1], unit_size);   // when unavailable, pad directly previous pixel value
    }
}
up[-2] = left[0]; // when reference in left direction with respect to current block in upper reference is used,
                  substitute value by reference value in more adjacent left direction
(pixel value of original location may be used, or value of up[-1] may be padded and used)
```

FIG. 16

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

VIDEO ENCODING METHOD AND DEVICE, AND VIDEO DECODING METHOD AND DEVICE

CROSS-REFERENCE TO RELATED APPLICATIONS

This application is a Continuation Application of International Application PCT/KR2020/007995 filed on Jun. 19, 2020, which claims benefit of priority from U.S. Provisional Application U.S. 62/864,815 filed on Jun. 21, 2019, the disclosures of which are incorporated herein in their entireties by reference.

BACKGROUND

1. Field

The present disclosure relates to a method and an apparatus according to one or more embodiments that may be capable of encoding or decoding an image using various shapes of coding units included in the image. A method and apparatus according to one or more embodiments may include an intra prediction method and apparatus.

2. Description of the Related Art

As hardware capable of reproducing and storing high-resolution or high-quality image content has been developed and has become widely popular, a coder/decoder (codec) capable of efficiently encoding and/or decoding high-resolution and/or high-quality image content is in high demand. In some scenarios, encoded image content may be decoded prior to being reproduced. Typically, methods of effectively compressing high-resolution or high-quality image content may be implemented. For example, an efficient image compression method may be implemented by a process of processing an image, which is to be encoded, by a predetermined method.

Various data units may be used to compress an image, and there may be an inclusion relationship between the data units. A data unit to be used to compress an image may be split by various methods, and the image may be encoded or decoded by determining an optimized data unit according to characteristics of the image. There exists a need for further improvements in encoding and decoding of images. Improvements are presented herein. These improvements may also be applicable to other encoding/decoding technologies and the standards that employ these technologies.

SUMMARY

An example embodiment of the present disclosure includes an image decoding method comprising, when a prediction mode of a current block is an intra mode, determining a sample value of an upper left reference sample of the current block by identifying an availability of the upper left reference sample of the current block. The image decoding method further comprising sequentially searching for a reference sample of at least one reference line from among a left reference line, an upper reference line, and a right reference line of the current block in a direction away from the upper left reference sample except for the upper left reference sample and determining a sample value of remaining reference samples of the current block except for the upper left reference sample by identifying an availability of the searched reference sample. The image decoding method further comprising obtaining a prediction block of the current block by performing intra prediction on the current block, based on the determined sample value of the upper left reference sample of the current block and the determined sample value of the remaining reference samples except for the upper left reference sample. The image decoding method further comprising obtaining residual data of the current block from a bitstream and obtaining a residual block of the current block including a coefficient of the current block by inversely quantizing and inversely transforming the residual data of the current block. The image decoding method further comprising obtaining a reconstruction block of the current block based on the prediction block of the current block and the residual block of the current block. The determining of the sample value of the upper left reference sample of the current block comprising, when the upper left reference sample is identified to be available, determining a reconstructed sample value with respect to the upper left reference sample as the sample value of the upper left reference sample. The determining of the sample value of the upper left reference sample of the current block further comprising, when the upper left reference sample is identified to be not available, determining a value based on a bit depth of a sample as the sample value of the upper left reference sample. The determining of the sample value of the remaining reference samples of the current block except for the upper left reference sample comprising, when a reference sample in a current search location is identified to be not available, determining a value based on a bit depth of a sample or a sample value of a reference sample in a directly previous search location as a sample value of the reference sample in the current search location. The determining of the sample value of the remaining reference samples of the current block except for the upper left reference sample further comprising, when the reference sample in the current search location is identified to be available, determining a reconstructed sample value with respect to the reference sample in the current search location as the sample value of the reference sample in the current search location.

In another example embodiment of the present disclosure, the determining of the sample value of the remaining reference samples of the current block except for the upper left reference sample may comprise, when identifying an availability of the reference sample in the current search location from among the reference samples except for the upper left reference sample, when it is identified that intra prediction is performed by not using a reference sample reconstructed according to an inter-mode and using only a reference sample reconstructed according to an intra mode, identifying the reference sample in the current search location to be not available, when a prediction mode of a reference block including the reference sample in the current search location is an inter-mode.

In another example embodiment of the present disclosure, the determining of the sample value of the remaining reference samples of the current block except for the upper left reference sample may comprise, when identifying an availability of the reference sample in the current search location from among the reference samples except for the upper left reference sample, identifying the reference sample in the current search location to be not available, when the reference sample in the current search location is located outside a picture, is included in a different slice from the current block, or is included in a different tile from the current block.

In another example embodiment of the present disclosure, the obtaining of the prediction block of the current block may comprise, when an intra prediction mode of the current block is a direct current (DC) mode, identifying an availability of a left neighboring region and a right neighboring region of the current block, and, based on the identified availability of the left neighboring region and the right neighboring region of the current block, obtaining a prediction sample value of the samples in the current block using a sample of the determined at least one reference line from among the left reference line, the upper reference line, and the right reference line of the current block.

In another example embodiment of the present disclosure, the obtaining of the prediction sample value of the samples in the current block may comprise, when the left neighboring region is identified to be available and the right neighboring region is identified to be not available, obtaining the prediction sample value of the samples in the current block, based on an average value of sample values of reference samples of the determined left reference line and sample values of reference samples of the determined upper reference line.

In another example embodiment of the present disclosure, the obtaining of the prediction sample value of the samples in the current block may comprise, when the right neighboring region is identified to be available and the left neighboring region is identified to be not available, obtaining the prediction sample value of the samples in the current block, based on an average value of sample values of samples of the determined upper reference line and sample values of samples of the determined right reference line.

In another example embodiment of the present disclosure, the obtaining of the prediction sample value of the samples in the current block may comprise, when the right neighboring region and the left neighboring region are identified to be available, obtaining the prediction sample value of the samples in the current block, based on an average value of sample values of reference samples of the determined upper reference line and sample values of reference samples of the determined right reference line.

In another example embodiment of the present disclosure, when a coordinate value of a sample of an upper left corner of the current block is (0,0), a coordinate value of the upper left reference sample of the current block may be (−1,−1).

In another example embodiment of the present disclosure, the obtaining of the prediction block of the current block may comprise, when an intra prediction mode of the current block is an angular mode, performing filtering using an N-tap interpolation filter (N is a natural number greater than 1) using sample values of a first reference sample of the reference line and a neighboring sample, the first reference sample and the neighboring sample contacting an extension line from a current sample in the current block in an intra prediction direction indicated by the angular mode or a direction opposite to the intra prediction direction, and, based on a result of the filtering, obtaining a prediction sample value of the current sample, wherein the sample value of the neighboring sample may be a sample value of a coordinate modified by clipping a coordinate of the neighboring sample, and, when a coordinate value of a sample of an upper left corner of the current block is (0,0), a lower limit of a range of the clipping may be −1, and an upper limit of the range of the clipping may be a value based on at least one of a height and a width of the current block.

In another example embodiment of the present disclosure, a search direction of the upper reference line may be a right direction from the upper left reference sample, a search direction of the left reference line may be a lower direction from the upper left reference sample, and a search direction of the right reference line may be a lower direction from an upper right reference sample of the current block, and, when a coordinate value of a sample of an upper left corner of the current block is (0,0), an x-axis coordinate value of the upper right reference sample of the current block may be a width of the current block, and a y-axis coordinate value may be −1.

In another example embodiment of the present disclosure, the image decoding method may further comprise obtaining one or more coding units by hierarchically splitting a current image based on a split shape mode, wherein one of the one or more coding units may be the current block, and the split shape mode may be based on a split type including one of a quad split, a binary split, and a tri split.

In another example embodiment of the present disclosure, when a split direction of a first coding unit is a vertical direction, a decoding order of a left second coding unit and a right second coding unit split according to the split direction may be determined in the order of the left second coding unit then the right second coding unit or in the order of the right second coding unit then the left second coding unit.

In another example embodiment of the present disclosure, the value based on the bit depth of the sample may be a median value in a range of a sample value indicated by the bit depth of the sample.

Another example embodiment of the present disclosure includes an image decoding apparatus comprising at least one processor configured to, when a prediction mode of a current block is an intra mode, determine a sample value of an upper left reference sample of the current block by identifying an availability of the upper left reference sample of the current block. The at least one processor is further configured to sequentially search for a reference sample of at least one reference line from among a left reference line, an upper reference line, and a right reference line of the current block in a direction away from the upper left reference sample except for the upper left reference sample and determine a sample value of remaining reference samples of the current block except for the upper left reference sample by identifying an availability of the searched reference sample. The at least one processor is further configured to obtain a prediction block of the current block by performing intra prediction on the current block, based on the determined sample value of the upper left reference sample of the current block and the determined sample value of the remaining reference samples except for the upper left reference sample. The at least one processor is further configured to obtain residual data of the current block from a bitstream and obtain a residual block of the current block including a coefficient of the current block by inversely quantizing and inversely transforming the residual data of the current block. The at least one processor is further configured to obtain a reconstruction block of the current block based on the prediction block of the current block and the residual block of the current block. The at least one processor is further configured, when the at least one processor determines the sample value of the upper left reference sample of the current block, to, when the upper left reference sample is identified to be available, determine a reconstructed sample value with respect to the upper left reference sample as the sample value of the upper left reference sample. The at least one processor is further configured, when the at least one processor determines the sample value of the upper left reference sample of the current block, to, when the upper left reference sample is identified to be not available, determine a value based on a bit depth of a sample as the sample value of the upper left reference sample. The at least one processor is further configured, when the at least one processor determines the sample value of the remaining reference samples of the current block except for the upper left reference sample, to, when a reference sample in a current search location is identified to be not available, determine a value based on a bit depth of a sample or a sample value of a reference sample in a directly previous search location as a sample value of the reference sample in the current search location. The at least one processor is further configured, when the at least one processor determines the sample value of the remaining reference samples of the current block except for the upper left reference sample, to, when the reference sample in the current search location is identified to be available, determine a reconstructed sample value with respect to the reference sample in the current search location as the sample value of the reference sample in the current search location.

Another example embodiment of the present disclosure includes an image encoding method comprising, when a prediction mode of a current block is an intra mode, determining a sample value of an upper left reference sample of the current block by identifying an availability of the upper left reference sample of the current block. The image encoding method further comprising sequentially searching for a reference sample of at least one reference line from among a left reference line, an upper reference line, and a right reference line of the current block in a direction away from the upper left reference sample except for the upper left reference sample and determining a sample value of remaining reference samples of the current block except for the upper left reference sample by identifying an availability of the searched reference sample. The image encoding method further comprising obtaining a prediction block of the current block by performing intra prediction on the current block, based on the determined sample value of the upper left reference sample of the current block and the determined sample value of the remaining reference samples except for the upper left reference sample. The image encoding method further comprising generating a residual block including a coefficient of the current block based on the prediction block of the current block and generating a transform coefficient of the current block by transforming and quantizing the residual block. The image encoding method further comprising generating a bitstream including information about the transform coefficient of the current block. The determining of the sample value of the upper left reference sample of the current block comprising, when the upper left reference sample is identified to be available, determining a reconstructed sample value with respect to the upper left reference sample as the sample value of the upper left reference sample. The determining of the sample value of the upper left reference sample of the current block further comprising, when the upper left reference sample is identified to be not available, determining a value based on a bit depth of a sample as the sample value of the upper left reference sample. The determining of the sample value of the remaining reference samples of the current block except for the upper left reference sample comprising, when a reference sample in a current search location is identified to be not available, determining a value based on a bit depth of a sample or a sample value of a reference sample in a directly previous search location as a sample value of the reference sample in the current search location. The determining of the sample value of the remaining reference samples of the current block except for the upper left reference sample further comprising, when the reference sample in the current search location is identified to be available, determining a reconstructed sample value with respect to the reference sample in the current search location as the sample value of the reference sample in the current search location.

Another example embodiment of the present disclosure includes an image decoding method comprising determining, when a current prediction mode of a current block is an intra mode, a first sample value of an upper left reference sample of the current block by identifying a first availability of the upper left reference sample of the current block. The image decoding method may further comprise sequentially searching, in a direction away from the upper left reference sample of the current block, for a searched reference sample of at least one reference line from a plurality of reference lines, except for the upper left reference sample. The plurality of reference lines may comprise a left reference line of the current block, an upper reference line of the current block, and a right reference line of the current block. The image decoding method may further comprise determining a second sample value of remaining reference samples of the current block, except for the upper left reference sample, by identifying a second availability of the searched reference sample. The image decoding method may further comprise performing intra prediction on the current block to obtain a prediction block of the current block, based on the first sample value of the upper left reference sample of the current block and the second sample value of the remaining reference samples of the current block, except for the upper left reference sample. The image decoding method may further comprise obtaining, from a bitstream, residual data of the current block. The image decoding method may further comprise obtaining a residual block of the current block including a coefficient of the current block by inversely quantizing and inversely transforming the residual data of the current block. The image decoding method may further comprise obtaining a reconstruction block of the current block, based on the prediction block of the current block and the residual block of the current block. The determining of the first sample value of the upper left reference sample of the current block may comprise determining, when the upper left reference sample has been identified to be available, a first reconstructed sample value with respect to the upper left reference sample as the first sample value of the upper left reference sample. Alternatively or additionally, the determining of the first sample value of the upper left reference sample of the current block may further comprise determining, when the upper left reference sample has been identified to be not available, a first value based on a first bit depth of a first sample as the first sample value of the upper left reference sample. The determining of the second sample value of the remaining reference samples of the current block, except for the upper left reference sample, may comprise determining, when a current reference sample in a current search location has been identified to be not available, a second value based on a second bit depth of a second sample or a previous sample value of a previous reference sample in a directly previous search location as a current sample value of the current reference sample in the current search location. Alternatively or additionally, the determining of the second sample value of the remaining reference samples of the current block, except for the upper left reference sample, may further comprise determining, when the current reference sample in the current search location has been identified to be available, a second reconstructed sample value with respect to the current reference sample in the current search location as the current sample value of the current reference sample in the current search location.

Another example embodiment of the present disclosure includes an image decoding apparatus, comprising a memory and at least one processor communicatively coupled to the memory. The at least one processor may be configured to determine, when a current prediction mode of a current block is an intra mode, a first sample value of an upper left reference sample of the current block by identifying a first availability of the upper left reference sample of the current block. The at least one processor may be further configured to sequentially search, in a direction away from the upper left reference sample of the current block, for a searched reference sample of at least one reference line from a plurality of reference lines, except for the upper left reference sample. The plurality of reference lines comprising a left reference line of the current block, an upper reference line of the current block, and a right reference line of the current block. The at least one processor may be further configured to determine a second sample value of remaining reference samples of the current block, except for the upper left reference sample, by identifying a second availability of the searched reference sample. The at least one processor may be further configured to perform intra prediction on the current block to obtain a prediction block of the current block, based on the first sample value of the upper left reference sample of the current block and the second sample value of the remaining reference samples of the current block, except for the upper left reference sample. The at least one processor may be further configured to obtain, from a bitstream, residual data of the current block. The at least one processor may be further configured to obtain a residual block of the current block including a coefficient of the current block by inversely quantizing and inversely transforming the residual data of the current block. The at least one processor may be further configured to obtain a reconstruction block of the current block, based on the prediction block of the current block and the residual block of the current block. The at least one processor may be further configured, when the at least one processor determines the first sample value of the upper left reference sample of the current block, to determine, when the upper left reference sample has been identified to be available, a first reconstructed sample value with respect to the upper left reference sample as the first sample value of the upper left reference sample. The at least one processor may be further configured, when the at least one processor determines the first sample value of the upper left reference sample of the current block, to determine, when the upper left reference sample has been identified to be not available, a first value based on a first bit depth of a first sample as the first sample value of the upper left reference sample. The at least one processor may be further configured, when the at least one processor determines the second sample value of the remaining reference samples of the current block, except for the upper left reference sample, to determine, when a current reference sample in a current search location has been identified to be not available, a second value based on a second bit depth of a second sample or a previous sample value of a previous reference sample in a directly previous search location as a current sample value of the current reference sample in the current search location. The at least one processor may be further configured, when the at least one processor determines the second sample value of the remaining reference samples of the current block, except for the upper left reference sample, to determine, when the current reference sample in the current search location has been identified to be available, a second reconstructed sample value with respect to the current reference sample in the current search location as the current sample value of the current reference sample in the current search location.

Another example embodiment of the present disclosure includes an image encoding method comprising determining, when a prediction mode of a current block is an intra mode, a first sample value of an upper left reference sample of the current block by identifying a first availability of the upper left reference sample of the current block. The image encoding method may further comprise sequentially searching, in a direction away from the upper left reference sample of the current block, for a searched reference sample of at least one reference line from a plurality of reference lines, except for the upper left reference sample. The plurality of reference lines comprising a left reference line of the current block, an upper reference line of the current block, and a right reference line of the current block. The image encoding method may further comprise determining a second sample value of remaining reference samples of the current block, except for the upper left reference sample, by identifying a second availability of the searched reference sample. The image encoding method may further comprise performing intra prediction on the current block to obtain a prediction block of the current block, based on the first sample value of the upper left reference sample of the current block and the second sample value of the remaining reference samples, except for the upper left reference sample. The image encoding method may further comprise generating, based on the prediction block of the current block, a residual block comprising a current coefficient of the current block. The image encoding method may further comprise generating a transform coefficient of the current block by transforming and quantizing the residual block. The image encoding method may further comprise generating a bitstream comprising information about the transform coefficient of the current block. The determining of the first sample value of the upper left reference sample of the current block may comprise determining, when the upper left reference sample has been identified to be available, a first reconstructed sample value with respect to the upper left reference sample as the first sample value of the upper left reference sample. Alternatively or additionally, the determining of the first sample value of the upper left reference sample of the current block may further comprise determining, when the upper left reference sample has been identified to be not available, a first value based on a first bit depth of a first sample as the first sample value of the upper left reference sample. The determining of the second sample value of the remaining reference samples of the current block, except for the upper left reference sample, may comprise determining, when a current reference sample in a current search location has been identified to be not available, a second value based on a second bit depth of a second sample or a previous sample value of a previous reference sample in a directly previous search location as a current sample value of the current reference sample in the current search location. Alternatively or additionally, the determining of the second sample value of the remaining reference samples of the current block, except for the upper left reference sample, may further comprise determining, when the current reference sample in the current search location is identified to be available, a second reconstructed sample value with respect to the current reference sample in the current search location as the current sample value of the current reference sample in the current search location.

Another example embodiment of the present disclosure includes a computer program for performing the image decoding method and/or the image encoding methods according to one or more embodiments of the present disclosure. The computer program may be recorded on a computer-readable recording medium.

BRIEF DESCRIPTION OF DRAWINGS

FIG. 3D illustrates example pseudo code realizing an operation, performed by an image decoding apparatus, for configuring an upper reference line buffer, according to various embodiments of the present disclosure.

FIG. 16 illustrates an example process for determining a depth of a coding unit when a shape and size of the coding unit change, when the coding unit is recursively split such that a plurality of coding units are determined, according to various embodiments of the present disclosure.

DETAILED DESCRIPTION OF EXEMPLARY EMBODIMENTS

Figure 1A:
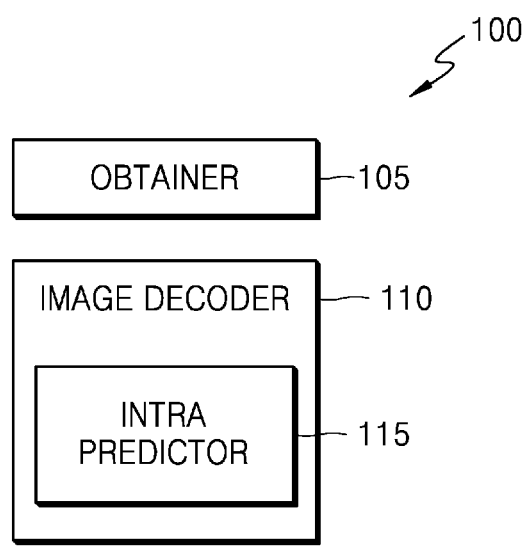
FIG. 1A is a block diagram of an image decoding apparatus, according to various embodiments of the present disclosure.

Advantages and features of embodiments of the disclosure set forth herein and methods of achieving them will be apparent from the following description of embodiments of the disclosure in conjunction with the accompanying drawings. However, the disclosure is not limited to embodiments of the disclosure set forth herein and may be embodied in many different forms. The embodiments of the disclosure are merely provided so that the disclosure may be thorough and complete and may convey the scope of the disclosure to one of ordinary skill in the art.

The terms used herein will be briefly described and then embodiments of the disclosure set forth herein will be described in detail.

In the present specification, general terms that have been widely used nowadays are selected, if or when possible, in consideration of functions of the disclosure, but non-general terms may be selected according to the intentions of technicians in the art, precedents, new technologies, or the like. Some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the disclosure.

As used herein, the singular forms "a", "an" and "the" are intended to include the plural forms as well, unless the context clearly indicates otherwise.

It will be understood that when an element is referred to as "including" another element, the element may further include other elements unless mentioned otherwise. Further, expressions such as "at least one of a, b, and c" should be understood as including only a, only b, only c, both a and b, both a and c, both b and c, all of a, b, and c, or other variations of thereof.

The term "unit" used herein should be understood as software or a hardware component which performs predetermined functions. However, the term "unit" is not limited to software or hardware. The term "unit" may be configured to be stored in an addressable storage medium or to reproduce one or more processors. As such, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Functions provided in components and "units" may be combined to a small number of components and "units" or may be divided into sub-components and "sub-units".

According to some embodiments of the disclosure, the "unit" may be implemented with a processor and a memory. The term "processor" should be interpreted broadly to include a general-purpose processor, a central processing unit (CPU), a microprocessor, a digital signal processor (DSP), a controller, a microcontroller, a state machine, and the like. In some circumstances, a "processor" may refer to an application-specific integrated circuit (ASIC), a programmable logic device (PLD), a field programmable gate array (FPGA), and the like. The term "processor" may refer to a combination of processing devices, e.g., a combination of a DSP and a microprocessor, a combination of a plurality of microprocessors, a combination of one or more microprocessors in combination with a DSP core, or a combination of any other configurations.

The term "memory" should be interpreted broadly to include any electronic component capable of storing electronic information. The term "memory" may refer to various types of processor-readable media such as random access memory (RAM), read-only memory (ROM), non-volatile RAM (NVRAM), programmable ROM (PROM), erase-programmable ROM (EPROM), electrical erasable PROM (EEPROM), flash memory, a magnetic or optical data storage device, registers, and the like. If or when a processor is capable of reading information from and/or writing information to a memory, the memory may be referred to as being in electronic communication with the processor. A memory integrated in a processor is in electronic communication with the processor.

The term "image", if or when used herein, should be understood to include a static image such as a still image of a video, and a moving picture (e.g., a dynamic image) which may be a video.

The term "sample", if or when used herein, may refer to data allocated to a sampling position of an image (e.g., data to be processed). For example, samples may be pixel values in a spatial domain, and transform coefficients in a transform domain. A unit including at least one such sample may be defined as a block. Hereinafter, embodiments of the disclosure will be described in detail with reference to the accompanying drawings, so that the embodiments of the disclosure may be easily implemented by one of ordinary skill in the art. Additionally, parts not related to the descriptions may be omitted in the drawings to clearly describe the disclosure.

Hereinafter, image encoding and/or decoding apparatus and methods, according to various embodiments, will be described in detail with reference to FIGS. 1 through 19.

Exemplary methods of determining a data unit of an image according to various embodiments will be described with reference to FIGS. 6 through 19.

Hereinafter, image encoding and/or decoding methods and apparatus for performing intra prediction in an efficient manner, in consideration of identification of an availability of a neighboring reference sample, according to various embodiments of the disclosure, are described in detail with reference to FIGS. 1A through 5B.

FIG. 1A is a block diagram of an image decoding apparatus, according to various embodiments of the present disclosure.

An image decoding apparatus 100, according to various embodiments, may include an obtainer 105 and an image decoder 110.

The obtainer 105 and/or the image decoder 110 may include at least one processor (not shown). Alternatively or additionally, the obtainer 105 and/or the image decoder 110 may include a memory (not shown) storing instructions to be executed by the at least one processor.

In some embodiments, the image decoder 110 may be implemented as separate hardware from the obtainer 105. Alternatively or additionally, the image decoder 110 may include the obtainer 105.

In some embodiments, the image decoder 110 may include an intra predictor 115. Alternatively or additionally, the image decoder 110 may be implemented as separate hardware from the intra predictor 115.

In some embodiments, the intra predictor 115 may be configured to obtain a prediction block of a current block by performing intra prediction on the current block using a reference sample included in a neighboring region of the current block.

In some embodiments, the image decoder 110 may be configured to obtain a reconstruction block of the current block based on the prediction block of the current block, which may have been obtained by the intra predictor 115.

In some embodiments, if or when a prediction mode of the current block is an intra mode, the intra predictor 115 may be configured to identify an availability of an upper left reference sample of the current block and may be further configured to determine a sample value of the upper left reference sample of the current block. For example, the intra predictor 115 may perform the identifying and the determining operations to determine a sample value of a reference sample used for intra prediction of the current block. In some embodiments, the sample value of the reference sample determined for the intra prediction of the current block may be stored in a reference buffer. In some embodiments, the reference buffer may be configured to have a one-dimensionally arranged shape. For example, the intra predictor 115 may determine the sample value of the reference sample and may configure the reference buffer based on the determined sample value of the reference sample. That is, the intra predictor 115 may determine the sample value of the reference sample and may store the determined sample value of the reference sample in a corresponding location in the reference buffer.

Alternatively or additionally, marking may be performed on the reference sample stored in the reference buffer. For example, a first reference sample stored in the reference buffer may be marked as "available for intra prediction" or as "not available for intra prediction". In some embodiments, the intra predictor 115 may perform intra prediction on the current block using a sample that may have been marked as "available for intra prediction," from among reference samples stored in the reference buffer.

Hereinafter, according to various embodiments, an example method is described in further detail, by which the intra predictor 115 may determine the sample value of the reference sample, store the determined sample value in the reference buffer, perform marking on the stored sample, and perform intra prediction based on the stored sample.

In some embodiments, if or when an upper left reference sample is identified to be available, the intra predictor 115 may determine a sample value reconstructed with respect to the upper left reference sample as a sample value of the upper left reference sample. In other embodiments, a coordinate value of the upper left reference sample may be (−1, −1), if or when a coordinate value of an upper left corner sample of the current block is (0, 0). That is, the upper left reference sample may denote a pixel directly adjacent to an upper left side of the upper left corner sample of the current block.

In other optional or additional embodiments, if or when the upper left reference sample is identified to be not available, the intra predictor 115 may determine a default value, such as zero (0) and/or a value based on a bit depth of a sample, as the sample value of the upper left reference sample. For example, the default value based on the bit depth of the sample may be a median value or a maximum value in a range of the sample value indicated by the bit depth of the sample. That is, if or when the bit depth of the sample is 8, the default value may be the median value (e.g., 128 or 127) of the range of the sample value (e.g., 0-255) indicated by the 8-bit sample depth. Alternatively or additionally, the default value may be the maximum value (e.g., 255) of the range of the sample value (e.g., 0-255) indicated by the 8-bit sample depth. In other optional or additional embodiments, if or when the upper left reference sample is identified to be not available, the intra predictor 115 may determine a default value, such as a median value, a maximum value, and/or a minimum value of the bit depth of the sample, indicated with respect to each of luma and chroma, if or when a tool, such as an adaptive bit depth, is applied, as the sample value of the upper left reference sample. For example, if or when the bit depth of the sample indicated with respect to each of luma and chroma is N, the median value of the bit depth may be indicated as the value of one (1) bitwise left-shifted N−1 times (i.e., 1<<(N−1)), where N is an integer greater than zero. That is, if or when N is 10 (i.e., the bit depth of the same is 10 bits), the median value may be 512.

The intra predictor 115 may be further configured to identify whether or not a reference sample in a current location is available. In some embodiments, if or when the current location is outside a picture, the intra predictor 115 may identify that a reference sample in the corresponding location is not available. Alternatively or additionally, the intra predictor 115 may identify that the reference sample in the corresponding location is available if or when the current location is inside the picture. In other embodiments, if or when the current location is included in a different slice from the current block, the intra predictor 115 may identify that a reference sample in the corresponding location is not available. Alternatively or additionally, the intra predictor 115 may identify that the reference sample in the corresponding location is available if or when the current location is included in the same slice as the current block.

In other optional or additional embodiments, if or when the current location is included in a different tile from the current block, the intra predictor 115 may identify that a reference sample in the corresponding location is not available. Alternatively or additionally, the intra predictor 115 may identify that the reference sample in the corresponding location is available if or when the current location is included in the same tile as the current block.

In other optional or additional embodiments, if or when the current location is on a different side from the current block based on a virtual boundary (e.g., if or when the current location is on a different side from the current block based on a boundary of viewports in a 360-degree image and/or is located in a different flexible tile from the current block based on a boundary of the flexible tiles having the boundary inside a coding tree unit (CTU) or a largest coding unit), the intra predictor 115 may identify that a reference sample in the corresponding location is not available. Alternatively or additionally, the intra predictor 115 may identify that the reference sample in the corresponding location is available if or when the previous conditions are not met. In some embodiments, flexible tiles may refer to a plurality of tiles split from an image that may have different sizes from each other. Alternatively or additionally, if or when the flexible tiles are used, a boundary between the flexible tiles may be inside a CTU.

In other embodiments, if or when the constrained intra prediction (CIP) is identified as being used, the intra predictor 115 may identify that a reference sample in a corresponding location is not available, if or when the corresponding location is encoded in an inter-mode. Alternatively or additionally, the reference sample in the corresponding location may be identified to be available if or when the corresponding location is encoded in an intra mode. That is, the CIP may denote that, with respect to intra prediction of a current block, if or when a neighboring block is encoded in an inter-mode, intra prediction is performed by not using a sample of the corresponding neighboring block encoded in the inter-mode and using only a sample of a neighboring block encoded in an intra mode, in order to prevent error propagation. In some embodiments, a CIP activation flag may be obtained from a bitstream, and/or whether or not the CIP is used may be identified based on the corresponding CIP activation flag. Alternatively or additionally, a prediction mode of the neighboring block may be identified based on prediction mode information of the neighboring block (e.g., a neighboring coding unit including a reference sample in the corresponding location) obtained from the bitstream.

In some embodiments, if or when there is a reconstructed sample with respect to a current location, the intra predictor 115 may identify that a reference sample in the corresponding location is available.

The intra predictor 115 may be further configured to identify an availability of a reference sample in a corresponding location by combining various conditions described above.

In some embodiments, the intra predictor 115 may search for a reference sample of at least one reference line of a left reference line of the current block, an upper reference line of the current block, and a right reference line of the current block sequentially in a direction away from the upper left reference sample, except for the upper left reference sample. Alternatively or additionally, the intra predictor 115 may determine a sample value of remaining reference samples, except for the upper left reference sample of the current block, by identifying an availability of the searched reference sample.

In other optional or additional embodiments, the reference line may denote a row or a column including a plurality of reference samples. For example, the reference line may denote a row or a column directly adjacent to a corner row or a corner column of the current block. For another example, the reference line may denote a column directly adjacent to a left side of a left corner column of the current block. For another example, the reference line may denote a row directly adjacent to an upper side of an upper corner row. For another example, the reference line may denote a column directly adjacent to a right side of a right corner column. In other optional or additional embodiments, a length of the reference line may be greater than a height or a width of the current block. In some embodiments, samples which are not directly adjacent to the current block may be referred to according to a prediction direction. Accordingly, the length of the reference line may be greater than the height or the width of the current block.

For example, the length of the reference line may be a value obtained by summing the height and the width of the current block, but is not limited thereto and may have various values.

In another example, if or when a coordinate value of an upper left corner of the current block is (0, 0), an x-axis coordinate of a reference sample included in the left reference line of the current block may be −1, a y-axis coordinate may be one in a range from −1 (or 0) to a value obtained by subtracting 1 from the value obtained by summing the height and the width of the current block. Alternatively or additionally, a y-axis coordinate of a reference sample included in the upper reference line of the current block may be −1, and an x-axis coordinate may be one in a range from −1 (or 0) to the value obtained by subtracting 1 from the value obtained by summing the height and the width of the current block. In some embodiments, an x-axis coordinate of a reference sample included in the right reference line of the current block may be the width of the current block, and a y-axis coordinate may be one in a range from −1 (or 0) to the value obtained by subtracting 1 from the value obtained by summing the height and the width of the current block.

In some embodiments, a search direction of the upper reference line may be a right direction from the upper left reference sample, a search direction of the left reference line may be a lower direction from the upper left reference sample, and a search direction of the right reference line may be a lower direction from an upper right reference sample of the current block. In other optional or additional embodiments, if or when a coordinate value of a sample of the upper left corner of the current block is (0, 0), an x-axis coordinate of an upper right reference sample of the current block may be the width of the current block, and a y-axis coordinate may be −1.

In some embodiments, if or when a reference sample in a current search location is identified to be not available, the intra predictor 115 may determine a default value or a sample value of a reference sample in a directly previous search location, as a sample value of the reference sample in the current search location. For example, the default value may be determined in a similar manner as described above. That is, the default value may be a value based on a bit depth of a sample such as a median value or a maximum value of a range of a sample value indicated by the bit depth of the sample.

In other optional or additional embodiments, if or when the reference sample in the current search location is identified to be available, the intra predictor 115 may determine a reconstructed sample value with respect to the reference sample in the current search location, as the sample value of the reference sample in the current search location.

In other optional or additional embodiments, if or when the intra predictor 115 identifies an availability of a reference sample in a current search location from among the reference samples, except for the upper left reference sample, and/or if or when the intra prediction (e.g., CIP) is identified as being performed by not using a reference sample reconstructed in an inter-mode and using only a reference sample reconstructed in an intra mode, the intra predictor 115 may identify that the reference sample in the current search location is not available, if or when a prediction mode of a reference block including the reference sample in the current search location corresponds to the inter-mode. Alternatively or additionally, if or when the intra predictor 115 identifies an availability of a reference sample in a current search location from among the reference samples, except for the upper left reference sample, the intra predictor 115 may determine that the reference sample in the current search location is not available, if or when the reference sample in the current search location is outside a picture, and/or is included in a different slice from the current block, and/or is included in a different tile from the current block, and/or is located on a different side from the current block based on a virtual boundary.

In some embodiments, if or when the intra predictor 115 identifies an availability of a reference sample in a current search location from among the reference samples, except for the upper left reference sample, the intra predictor 115 may identify that the reference sample in the current search location is not available, if or when there is a reconstructed sample value with respect to the reference sample in the current search location.

In other optional or additional embodiments, the intra predictor 115 may be configured to identify the availability of the reference sample in the current search location by combining various conditions described above.

In some embodiments, the intra predictor 115 may obtain the prediction block of the current block by performing intra prediction on the current block based on the determined sample value of the upper left reference sample of the current block and the determined sample value of the reference samples, except for the upper left reference sample. In other embodiments, the determined sample value of the upper left reference sample of the current block and the determined sample value of the reference samples, except for the upper left reference sample, may be stored in a reference buffer, and all of the reference samples stored in the reference buffer may be marked as being "available for intra prediction."

Consequently, if or when the intra predictor 115 performs intra prediction using the reference sample stored in the reference buffer, the intra predictor 115 may not additionally identify an availability of the reference sample stored in the reference buffer and may use all of the reference samples stored in the reference buffer to perform intra prediction. That is, after the sample value of the upper left reference sample, stored in the reference buffer, is determined as a reliable value, the intra predictor 115 may sequentially search for the remaining reference samples, except for the upper left reference sample, and may determine the sample value of the remaining reference samples as a reliable value, without consideration as to the availability of the reference sample in the current search location. That is, all of the reference samples stored in the reference buffer may be determined to be available for intra prediction, and as such, intra prediction may be performed by freely using all of the reference samples stored in the reference buffer.

However, the disclosure is not limited thereto. For example, if or when all of the reference samples stored in the reference buffer are marked as available, one or more reference samples in a predetermined location may have a possibility that sample values thereof may not be appropriately derived so as to be used for intra prediction. As such, whether or not the reference samples stored in the reference buffer may be used for intra prediction may be additionally identified, according to necessity.

Continuing to refer to FIG. 1A, the image decoder 110 may be configured to determine at least one coding unit by hierarchically splitting a current image. For example, the image decoder 110 may determine the at least one coding unit by hierarchically splitting the current image based on a split shape mode of the current image. In some embodiments, the split shape mode may indicate at least one of whether or not to split, a split direction, and a split type. For example, the split type may indicate one of a binary split, a tri split, and a quad split. In other optional or additional embodiments, the obtainer 105 may obtain information about the split shape mode of the current image, and the image decoder 110 may determine the at least one coding unit by hierarchically splitting the current image based on the obtained information about split shape mode of the current image. That is, the current block on which the intra predictor 115 performs intra prediction may be one of the determined at least one coding unit.

In some embodiments, if or when a split direction of a first coding unit is a vertical direction, the image decoder 110 may determine a decoding order of a left second coding unit and a right second coding unit split according to the split direction. For example, the image decoder 110 may determine the decoding order to be the left second coding unit followed by the right second coding unit. Alternatively or additionally, the image decoder 110 may determine the decoding order to be the right second coding unit followed by the left second coding unit. In some embodiments, a method of determining whether to determine an encoding and/or a decoding order of the split right and left coding units as a forward direction or a backward direction may be referred to as a split unit coding order (SUCO) method.

In some embodiments, if or when the SUCO method is not applied, the image decoder 110 may determine the decoding order of the second coding unit to start with the left second coding unit followed by the right second coding unit (e.g., a forward direction). Alternatively or additionally, if or when the SUCO method is applied, the image decoder 110 may determine the decoding order of the second coding unit to start with the left second coding unit followed by the right second coding unit (e.g., the forward direction). Alternatively or additionally, the image decoder 110 may determine, if or when the SUCO method is applied, the decoding order of the second coding unit to start with right second coding unit followed by the left second coding unit (e.g., a backward direction). One or more embodiments relating to the SUCO method will be described with reference to FIG. 5A.

In other embodiments, by taking into account the decoding order of a coding unit, if or when the SUCO method is applied, the reference sample that may be used for intra prediction may not be limited to a left neighboring region and an upper neighboring region and may further include a right neighboring region. Alternatively or additionally, the left neighboring region and the right neighboring region may not be available, and as such, the intra predictor 115 may be configured to identify an availability of the left neighboring region and the right neighboring region by considering a decoding order and may perform intra prediction on the current block by considering the availability of the left neighboring region and the right neighboring region.

For example, if or when the reference buffer is configured as described above, if or when an intra prediction mode of the current block is a direct current (DC) mode, the sample value of the reference sample of the left, upper, and/or right reference lines of the current block, stored in the reference buffer, may be defined. That is, the intra predictor 115 may perform intra prediction on the current block without additionally identifying the availability. In some embodiments, if or when the intra prediction mode of the current block is a DC mode, the intra predictor 115 may determine a prediction sample value of a sample in the current block using an average value of the reference samples of the defined directions (e.g., left, upper, and right directions).

In other embodiments, if or when a SUCO method is applied, the intra predictor 115 may identify a condition according to the SUCO method. The condition according to the SUCO method will be described in detail with reference to FIG. 5B. For example, the identification of the condition according to the SUCO method may correspond to the identification of the availability of the left neighboring region and the upper neighboring region of the current block.

In some embodiments, the intra predictor 115 may be configured to obtain a prediction sample value of samples in the current block using a sample of at least one reference line of the left reference line of the current block, the upper reference line of the current block, and the right reference line of the current block, based on the availability of the left neighboring region of the current block and the right neighboring region of the current block. For example, the intra predictor 115 may identify one of various conditions (e.g., LR_00, LR_01, LR_10, and LR_11 of FIG. 5B) according to the SUCO method. Alternatively or additionally, the intra predictor 115 may obtain, based on the identified condition according to the SUCO method, the prediction sample value of the sample in the current block using the sample of the at least one reference line of the left reference line of the current block, the upper reference line of the current block, and the right reference line of the current block.

In other optional or additional embodiments, if or when the left neighboring region is identified to be available and the right neighboring region is identified to be not available, the intra predictor 115 may obtain the prediction sample value of the samples in the current block, based on an average value of sample values of reference samples of the left reference line and sample values of reference samples of the upper reference line. For example, if or when the condition according to the SUCO method is LR_10 (i.e., the left reference line is available and the right reference line is not available), the intra predictor 115 may obtain the prediction sample value of the samples in the current block, based on the average value of the sample values of the reference samples of the left reference line and the sample values of the reference samples of the upper reference line.

In other optional or additional embodiments, if or when the left neighboring region of the current block is identified to be not available, and the right neighboring region is identified to be available, the intra predictor 115 may obtain the prediction sample value of the samples in the current block, based on an average value of sample values of reference samples of the right reference line and the sample values of the reference samples of the upper reference line. For example, if or when the condition according to the SUCO method is LR_01 (i.e., the left reference line is not available and the right reference line is available), the intra predictor 115 may obtain the prediction sample value of the samples in the current block, based on the average value of the sample values of the reference samples of the right reference line and the sample values of the reference samples of the upper reference line.

In other optional or additional embodiments, if or when the left neighboring region of the current block is identified to be available, and the right neighboring region is identified to be available, the intra predictor 115 may obtain the prediction sample value of the samples in the current block, based on an average value of the sample values of the reference samples of the left reference line, the sample values of the reference samples of the right reference line, and the sample values of the reference samples of the upper reference line. For example, if or when the condition according to the SUCO method is LR_11 (i.e., the left reference line is available and the right reference line is available), the intra predictor 115 may obtain the prediction sample value of the samples in the current block, based on the average value of the sample values of the reference samples of the left reference line, the sample values of the reference samples of the right reference line, and the sample values of the reference samples of the upper reference line.

In other optional or additional embodiments, if or when the left neighboring region of the current block is identified to be not available, and the right neighboring region is identified to be not available, the intra predictor 115 may obtain the prediction sample value of the samples in the current block, based on an average value of the sample values of the reference samples of the upper reference line. For example, if or when the condition according to the SUCO method is LR_00 (i.e., the left reference line is not available and the right reference line is not available), the intra predictor 115 may obtain the prediction sample value of the samples in the current block, based on the average value of the sample values of the reference samples of the upper reference line.

However, the disclosure is not limited thereto. For example, if or when the condition according to the SUCO method is LR_00, the intra predictor 115 may obtain the prediction sample value of the samples in the current block, based on the average value of the sample values of the reference samples of the left reference line and the sample values of the reference samples of the upper reference line.

As described above, if or when the intra prediction mode is the DC mode, the intra predictor 115 may obtain the prediction sample value of the sample in the current block using the sample of the at least one reference line of the left reference line of the current block, the upper reference line of the current block, and the right reference line of the current block, based on the availability of the left neighboring region and the right neighboring region of the current block. However, the disclosure is not limited thereto. For example, the prediction sample value of the sample in the current block may be obtained using the sample of the determined at least one reference line of the left reference line of the current block, the upper reference line of the current block, and the right reference line of the current block, without consideration as to the availability of the neighboring regions of the current block.

Alternatively or additionally, if or when the intra prediction mode is the DC mode, the intra predictor 115 may obtain the prediction sample value of the sample in the current block using the sample of the at least one reference line of the left reference line of the current block, the upper reference line of the current block, and the right reference line of the current block, based on the availability of the left neighboring region and the availability of the right neighboring region, and/or the availability of the upper neighboring region.

Hereinafter, a method, performed by the image decoding apparatus 100, of signaling a chroma intra prediction mode in an efficient manner, is described, according to some embodiments.

The chroma intra prediction mode may include a total of five modes (e.g., two direct modes (DM), a DC mode, a vertical mode, and a horizontal mode. In some embodiments, the direct mode (which may be referred to as the DM or the DM mode) may denote an intra prediction mode using a luma intra prediction mode. Alternatively or additionally, the DM may denote an intra prediction mode using the chroma intra prediction mode. If or when an intra prediction mode indicated by the DM overlaps the remaining four modes, a mode of the four modes, the mode overlapping the intra prediction mode indicated by the DM, may be replaced by another mode, and/or one bit may be saved via truncated binarization. In some embodiments, dependency may occur with respect to the DM, and an additional context model may be needed. Hereinafter, a simple method of signaling the chroma intra prediction mode is described.

If or when, the number of candidates of the chroma intra prediction mode is maintained as five, the DM may be selected as an intra prediction mode the same as the remaining candidates of the intra prediction mode, overlapping may be permitted. In some embodiments, information about whether or not the chroma intra prediction mode is the DM may be context-based binary arithmetic that may be coded as a 1-bit flag. If or when the chroma intra prediction mode is not the DM, the remaining four candidates of the intra prediction mode may be encoded as 2 bits by fixed length coding (FLC).

In some embodiments, the obtainer 105 may obtain, from a bitstream, the 1-bit flag indicating whether or not the chroma intra prediction mode is the DM, and may identify whether or not the chroma intra prediction mode is the DM, based on a value of the information about whether or not the chroma intra prediction mode is the DM, the information being obtained by performing context model-based binary arithmetic decoding. For example, if or when performing the context model-based binary arithmetic decoding, one context model may be used.

If or when the chroma intra prediction mode of the current block is identified as not being the DM, the obtainer 105 may obtain, from the bitstream, 2-bit information about the chroma intra prediction mode, may determine a value thereof by inversely binarizing the 2-bit information according to the FLC, and may obtain the chroma intra prediction mode corresponding to the value. As such, the dependency with respect to the DM may be eliminated, various comparison operations may be reduced, and without using an additional context model, the chroma intra prediction mode may be signaled in a simple way.

The intra predictor 115 may perform intra prediction using a reference sample apart from and not directly contacting the current block. For example, if or when a coordinate value of an upper left corner of the current block is (0, 0), a reference sample having a coordinate value of (−2, −1), (−1, −2), (a width of the current block, −2), or the like may be used. In some embodiments, a length of a left reference line buffer and an upper reference line buffer may be extended according to an intra prediction method and/or an intra prediction mode. The intra predictor 115 may increase the length of the reference line buffer, identify an availability of a reference sample, and determine a reconstructed sample value with respect to the corresponding reference sample according to the availability of the reference sample, as a sample value of the reference sample. If or when the reference sample is not available, the sample value of the reference sample may be determined as a default value or a sample value of other available reference samples. In some embodiments, the determined sample value of the reference sample may be stored in the reference line buffer.

A method of using a sample value of a reference line buffer in another direction closer to the current block or determining a corresponding reference sample without changing a length of the reference line buffer will be described below with reference to FIGS. 3B and 3C.

If or when the intra prediction mode is an angular mode, the intra predictor 115 may perform intra prediction on a current sample in the current block using a sample value of a plurality of reference samples needed for an N-tap interpolation filter and filtering. That is, the intra predictor 115 may obtain a prediction sample value of the current sample in the current block, by performing the filtering using the N-tap interpolation filter on a reference sample crossing an extension line in an intra prediction direction (and/or the opposite direction) from the current sample, and a reference sample neighboring the reference sample formerly mentioned. In some embodiments, a method, performed by the intra predictor 115, of determining a sample value of a reference sample to be used for intra prediction, if or when the reference sample crossing the extension line in the intra prediction direction (and/or the opposite direction) from the current sample is located around a corner of the current block, will be described below with reference to FIGS. 4A through 4G.

The obtainer 105 may obtain residual data of the current block from a bitstream. In some embodiments, the residual data may include information about a transform coefficient of the current block.

In some embodiments, the image decoder 110 may be configured to inversely quantize and inversely transform the residual data of the current block to obtain a residual block of the current block, including a coefficient of the current block.

In some embodiments, the image decoder 110 may be configured to obtain a reconstruction block of the current block based on the prediction block of the current block and the residual block of the current block. For example, the image decoder 110 may obtain a reconstruction sample value of a current sample in the reconstruction block by summing a prediction sample value of a current sample in the prediction block with a residual sample value of a current sample in the residual block and may obtain the reconstruction block of the current block based on the reconstruction sample value.

Figure 1B:
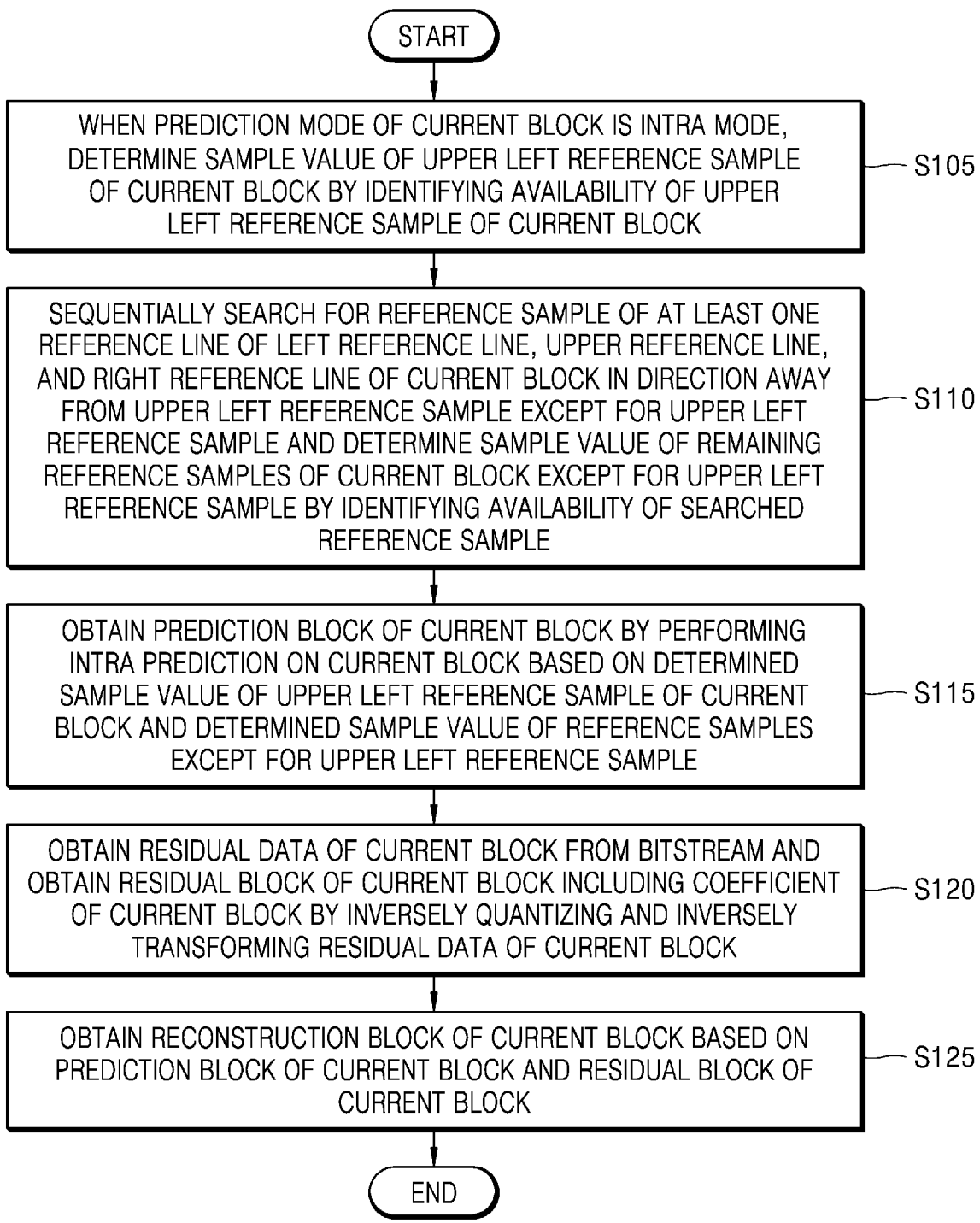
FIG. 1B is a flowchart of an image decoding method, according to various embodiments of the present disclosure.

FIG. 1B is a flowchart of an image decoding method, according to various embodiments of the present disclosure.

In operation S105, if or when a prediction mode of a current block is an intra mode, the image decoding apparatus 100 may determine a sample value of an upper left reference sample of the current block by identifying an availability of the upper left reference sample of the current block. For example, if or when the upper left reference sample is identified to be available, the image decoding apparatus 100 may determine a reconstructed sample value with respect to the upper left reference sample, as the sample value of the upper left reference sample. Alternatively or additionally, if or when the upper left reference sample is identified to be not available, the image decoding apparatus 100 may determine a value based on a bit depth of a sample as the sample value of the upper left reference sample.

In operation S110, the image decoding apparatus 100 may search for a reference sample of at least one reference line of a left reference line of the current block, an upper reference line of the current block, and a right reference line of the current block sequentially in a direction away from the upper left reference sample, except for the upper left reference sample of the current block, and may determine a sample value of remaining reference samples, except for the upper left reference sample of the current block, by identifying an availability of the searched reference sample. For example, if or when a reference sample in a current search location is identified to be not available, the image decoding apparatus 100 may determine a value based on a bit depth of a sample or a sample value of a reference sample in a directly previous search location, as a sample value of the reference sample in the current search location.

Alternatively or additionally, if or when the reference sample in the current search location is identified to be available, the image decoding apparatus 100 may determine a reconstructed sample value with respect to the reference sample in the current search location, as the sample value of the reference sample in the current search location.

In operation S115, the image decoding apparatus 100 may obtain a prediction block of the current block by performing intra prediction on the current block, based on the determined sample value of the upper left reference sample of the current block and the determined sample value of the remaining reference samples, except for the upper left reference sample.

In operation S120, the image decoding apparatus 100 may obtain residual data of the current block from a bitstream and may obtain a residual block of the current block including a coefficient of the current block by inversely quantizing and inversely transforming the residual data of the current block.

In operation S125, the image decoding apparatus 100 may obtain a reconstruction block of the current block based on the prediction block of the current block and the residual block of the current block.

Figure 1C:
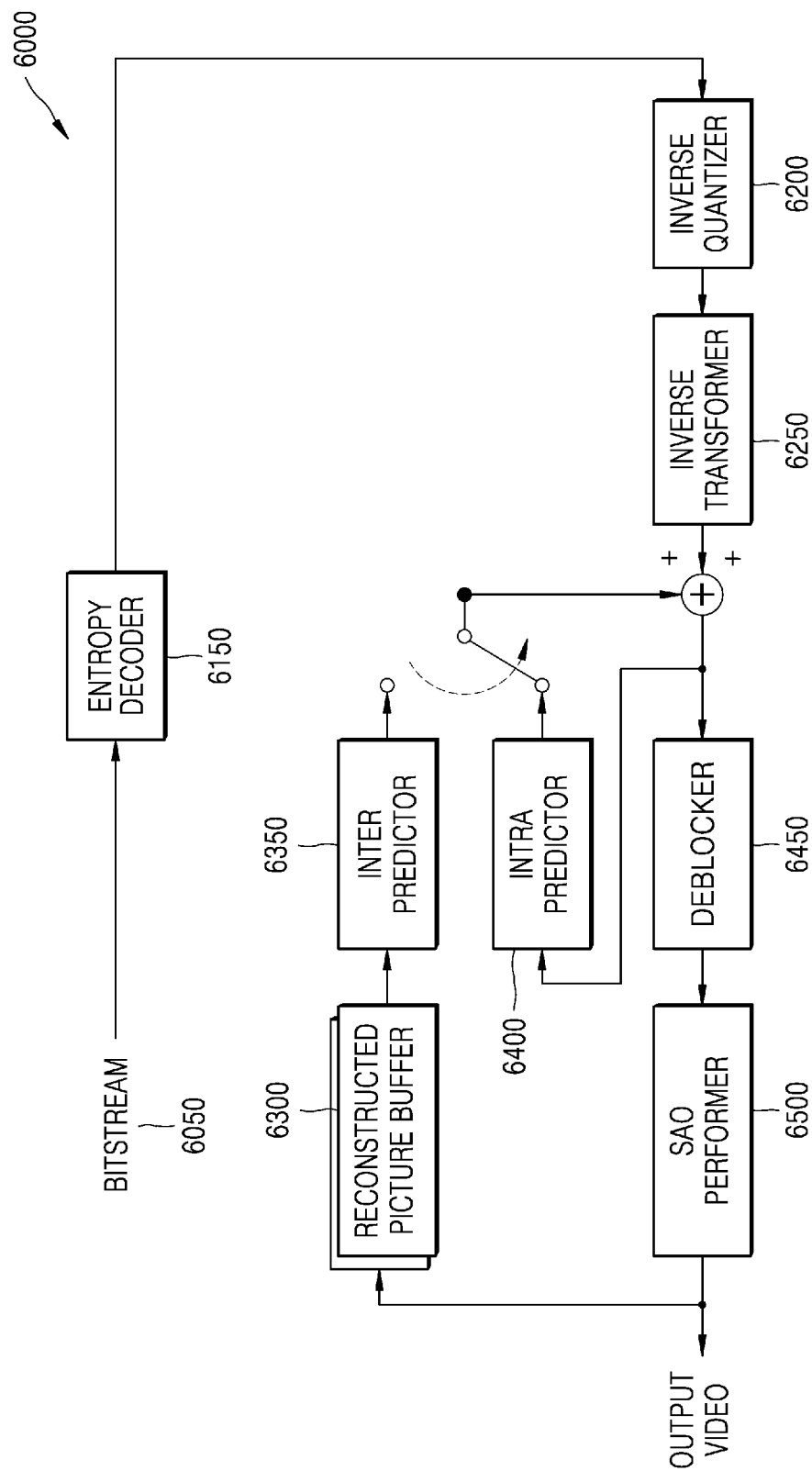
FIG. 1C is a block diagram of an image decoder, according to various embodiments of the present disclosure.

FIG. 1C is a block diagram of an image decoder 6000 according to various embodiments.

The image decoder 6000 according to various embodiments may perform operations performed by the obtainer 105 and the image decoder 110 of the image decoding apparatus 100, as discussed in reference to FIG. 1A, to decode image data.

Referring to FIG. 1C, an entropy decoder 6150 may parse, from a bitstream 6050, encoded image data to be decoded, and encoding information necessary for decoding. The encoded image data may comprise a quantized transform coefficient. In some embodiments, an inverse quantizer 6200 and/or an inverse transformer 6250 may reconstruct residue data from the quantized transform coefficient.

In some embodiments, an intra predictor 6400 may perform intra prediction on each one of the blocks (e.g., the reconstruction block of the current block, prediction block of the current block, and/or the residual block). In other embodiments, an inter predictor 6350 may perform inter prediction on each one of the blocks using a reference image obtained from a reconstructed picture buffer 6300. In other optional or additional embodiments, prediction data with respect to each one of the blocks generated by the intra predictor 6400 and/or the inter predictor 6350 may be added to the residue data to reconstruct data of a spatial domain for the block of a current image. Alternatively or additionally, a deblocker 6450 and a sample adaptive offset (SAO) performer 6500 may perform loop filtering on the reconstructed data of the spatial domain to generate a filtered reconstructed image as an output. In some embodiments, the filtered reconstructed images generated by the SAO performer 6500 may be stored in the reconstructed picture buffer 6300. Alternatively or additionally, reconstructed images stored in the reconstructed picture buffer 6300 may be output as a reference image.

For the obtainer 105 and the image decoder 110 of the image decoding apparatus 100 to decode image data, the operations of the image decoder 6000 may be performed on one or more components of the image decoder 600, according to various embodiments of the present disclosure.

For example, an operation of the intra predictor 6400 may correspond to an operation of the intra predictor 115.

Figure 2A:
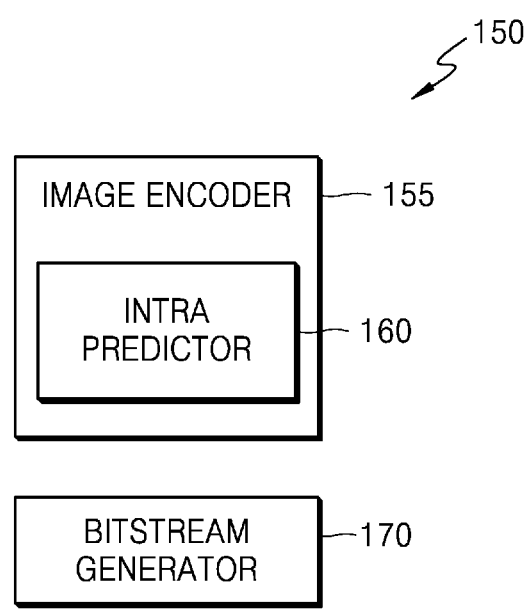
FIG. 2A is a block diagram of an image encoding apparatus, according to various embodiments of the present disclosure.

FIG. 2A is a block diagram of an image encoding apparatus according to various embodiments of the present disclosure.

An image encoding apparatus 150 according to various embodiments may include an image encoder 155 and a bitstream generator 170.

The image encoder 155 and the bitstream generator 170 may include at least one processor (not shown). Alternatively or additionally, the image encoder 155 and the bitstream generator 170 may include a memory (not shown) storing instructions to be executed by the at least one processor. In some embodiments, the image encoder 155 may be implemented as separate hardware from the bitstream generator 170. Alternatively or additionally, the image encoder 155 may include the bitstream generator 170.

In some embodiments, the image encoder 155 may be configured to determine at least one coding unit by hierarchically splitting a current image. For example, the image encoder 155 may determine the at least one coding unit by hierarchically splitting the current image based on a split shape mode of the current image. A current block on which an intra predictor 160 may perform intra prediction may be one of the determined at least one coding unit.

In some embodiments, the split shape mode may indicate at least one of whether or not to split, a split direction, and a split type. For example, the split type may indicate one of a binary split, a tri split, and a quad split.

In some embodiments the image encoder 155 may encode information about the split shape mode of the current image. Alternatively or additionally, the bitstream generator 170 may generate a bitstream including the encoded information about the split shape mode of the current image.

In some embodiments, the image encoder 155 may include the intra predictor 160. In other embodiments, the image encoder 155 and the intra predictor 160 may be implemented as separate hardware from each other.

In some embodiments, the intra predictor 160 may obtain a prediction block of the current block by performing intra prediction on the current block using a reference sample included in a neighboring region of the current block.

If or when a prediction mode of the current block is an intra mode, the intra predictor 160 may determine a sample value of an upper left reference sample of the current block by identifying an availability of the upper left reference sample of the current block. For example, the intra predictor 160 may perform the identifying and the determining operations to determine a sample value of a reference sample used for intra prediction of the current block. In some embodiments, the sample value of the reference sample determined for the intra prediction of the current block may be stored in a reference buffer. In other embodiments, the reference buffer may have a one-dimensionally arranged shape. That is, the intra predictor 160 may determine the sample value of the reference sample and may configure the reference buffer based on the determined sample value of the reference sample. Alternatively or additionally, marking may be performed on the reference sample stored in the reference buffer. For example, a first reference sample stored in the reference buffer may be marked as "available for intra prediction" or as "not available for intra prediction". In some embodiments, the intra predictor 160 may perform intra prediction on the current block using a sample that may be marked as "available for intra prediction," from among reference samples stored in the reference buffer.

If or when an upper left reference sample is identified as being available, the intra predictor 160 may determine a sample value reconstructed with respect to the upper left reference sample as a sample value of the upper left reference sample. For example, a coordinate value of the upper left reference sample may be (−1, −1), if or when a coordinate value of an upper left corner sample of the current block is (0, 0). That is, the upper left reference sample may denote a pixel directly adjacent to an upper left side of the upper left corner sample of the current block.

If or when the upper left reference sample is identified as being not available, the intra predictor 160 may determine a default value, such as zero (0) and/or a value based on a bit depth of a sample, as the sample value of the upper left reference sample. For example, the default value based on the bit depth of the sample may be a median value or a maximum value in a range of the sample value indicated by the bit depth of the sample. That is, if or when the bit depth of the sample is 8, the default value may be the median value (e.g., 128 or 127) of the range of the sample value (e.g., 0-255) indicated by the 8-bit sample depth. Alternatively or additionally, the default value may be the maximum value (e.g., 255) of the range of the sample value (e.g., 0-255) indicated by the 8-bit sample depth.

In other optional or additional embodiments, if or when the upper left reference sample is identified as not available, the intra predictor 160 may determine a default value, such as a median value of a color scale, as the sample value of the upper left reference sample.

The intra predictor 160 may be further configured to identify whether or not a reference sample in a current location is available. In some embodiments, if or when the current location is outside a picture, the intra predictor 160 may identify that a reference sample in the corresponding location is not available. Alternatively or additionally, the intra predictor 160 may identify that the reference sample in the corresponding location is available if or when the current location is inside the picture. In other embodiments, if or when the current location is included in a different slice from the current block, the intra predictor 160 may identify that a reference sample in the corresponding location is not available. Alternatively or additionally, the intra predictor 160 may identify that the reference sample in the corresponding location is available if or when the current location is included in the same slice as the current block.

In other optional or additional embodiments, if or when the current location is included in a different tile from the current block, the intra predictor 160 may identify that a reference sample in the corresponding location is not available. Alternatively or additionally, the intra predictor 160 may identify that the reference sample in the corresponding location is available if or when the current location is included in the same tile as the current block.

In other optional or additional embodiments, if or when a predetermined location is on a different side from the current block based on a virtual boundary (e.g., if or when the predetermined location belongs to a different viewport from the current block based on a boundary of viewports in a 360-degree image and/or is located in a different flexible tile from the current block based on a boundary of the flexible tiles having the boundary inside a CTU or a largest coding unit), the intra predictor 160 may identify that a reference sample in the corresponding location is not available. Alternatively or additionally, the intra predictor 160 may identify that the reference sample in the corresponding location is available if or when the previous conditions are not met.

If or when the CIP is identified as being used, the intra predictor 160 may identify that a reference sample in a corresponding location is not available, if or when the corresponding location is encoded in an inter-mode. Alternatively or additionally, if or when the corresponding location is encoded in an intra mode, the reference sample in the corresponding location may be identified to be available. For example, the CIP may denote that, with respect to intra prediction of a current block, if or when a neighboring block is encoded in an inter-mode, intra prediction may be performed by not using a sample of the corresponding neighboring block encoded in the inter-mode and using only a sample of a neighboring block encoded in an intra mode, as such, error propagation may be prevented. Whether or not the CIP is used may be identified, a CIP activation flag may be generated based on whether or not the CIP is used and stored in a bitstream.

After a prediction mode of a neighboring block (e.g., a neighboring coding unit including a reference sample in a corresponding location) is identified, information about the prediction mode of the neighboring block may be generated based on the identified prediction mode, and the information may be included in the bitstream.

If or when the intra predictor 160 identifies an availability of a reference sample in a current search location from among reference samples, except for the upper left reference sample, the intra predictor 160 may identify that the reference sample in the current search location is not available, if or when there is a reconstructed sample value with respect to the reference sample in the current search location.

In some embodiments, the intra predictor 160 may identify the availability of the reference sample in the current search location by combining various conditions described above.

The intra predictor 160 may search for a reference sample of at least one reference line of a left reference line of the current block, an upper reference line of the current block, and a right reference line of the current block sequentially in a direction away from the upper left reference sample, except for the upper left reference sample. The intra predictor 160 may determine a sample value of remaining reference samples, except for the upper left reference sample of the current block, by identifying an availability of the searched reference sample.

For example, if or when a coordinate value of an upper left corner of the current block is (0, 0), an x-axis coordinate of a reference sample included in the left reference line of the current block may be −1, a y-axis coordinate may be one in a range from −1 to a value obtained by subtracting 1 from a value obtained by summing a height and a width of the current block. Alternatively or additionally, a y-axis coordinate of a reference sample included in the upper reference line of the current block may be −1, and an x-axis coordinate may be one in a range from −1 to the value obtained by subtracting 1 from the value obtained by summing the height and the width of the current block. In some embodiments, an x-axis coordinate of a reference sample included in the right reference line of the current block may be the width of the current block, and a y-axis coordinate may be one in a range from −1 to the value obtained by subtracting 1 from the value obtained by summing the height and the width of the current block.

In some embodiments, a search direction of the upper reference line may be a right direction from the upper left reference sample, a search direction of the left reference line may be a lower direction from the upper left reference sample, and a search direction of the right reference line may be a lower direction from an upper right reference sample of the current block. In other optional or additional embodiments, if or when a coordinate value of a sample of the upper left corner of the current block is (0, 0), an x-axis coordinate of an upper right reference sample of the current block may be the width of the current block, and a y-axis coordinate may be −1.

In some embodiments, if or when a reference sample in a current search location is identified to be not available, the intra predictor 160 may determine a default value or a sample value of a reference sample in a directly previous search location, as a sample value of the reference sample in the current search location. For example, the default value may be determined in a similar manner as described above. That is, the default value may be a value based on a bit depth of a sample, such as a median value or a maximum value of a range of a sample value indicated by the bit depth of the sample.

In other optional or additional embodiments, if or when the reference sample in the current search location is identified to be available, the intra predictor 160 may determine a reconstructed sample value with respect to the reference sample in the current search location, as the sample value of the reference sample in the current search location.

In other optional or additional embodiments, if or when the intra predictor 160 identifies an availability of a reference sample in a current search location from among the reference samples, except for the upper left reference sample, and/or if or when the intra prediction is identified as being performed by not using a reference sample reconstructed in an inter-mode and using only a reference sample reconstructed in an intra mode, the intra predictor 115 may identify that the reference sample in the current search location is not available, if or when a prediction mode of a reference block including the reference sample in the current search location corresponds to the inter-mode. Alternatively or additionally, if or when the intra predictor 160 identifies an availability of a reference sample in a current search location from among the reference samples, except for the upper left reference sample, the intra predictor 160 may determine that the reference sample in the current search location is not available, if or when the reference sample in the current search location is outside a picture, and/or is included in a different slice from the current block, and/or is included in a different tile from the current block, and/or is located on a different side from the current block based on a virtual boundary.

In some embodiments, if or when the intra predictor 160 identifies an availability of a reference sample in a current search location from among the reference samples, except for the upper left reference sample, the intra predictor 160 may identify that the reference sample in the current search location is not available, if or when there is a reconstructed sample value with respect to the reference sample in the current search location.

In other optional or additional embodiments, the intra predictor 160 may be configured to identify the availability of the reference sample in the current search location by combining various conditions described above.

In some embodiments, the intra predictor 160 may obtain the prediction block of the current block by performing intra prediction on the current block based on the determined sample value of the upper left reference sample of the current block and the determined sample value of the reference samples, except for the upper left reference sample. In some embodiments, the determined sample value of the upper left reference sample of the current block and the determined sample value of the reference samples, except for the upper left reference sample, may be stored in a reference buffer, and all of the reference samples stored in the reference buffer may be marked as being "available for intra prediction."

That is, if or when the intra predictor 160 performs intra prediction using the reference sample stored in the reference buffer, the intra predictor 160 may not additionally identify an availability of the reference sample stored in the reference buffer and may use all of the reference samples stored in the reference buffer to perform intra prediction. That is, after the sample value of the upper left reference sample to be stored in the reference buffer is determined, the intra predictor 160 may sequentially search for the remaining reference samples, except for the upper left reference sample, and may determine the sample value of the remaining reference samples, without consideration as to the availability of the reference sample in the current search location. As such, all of the reference samples stored in the reference buffer may be determined to be available for intra prediction, and intra prediction may be performed by freely using all of the reference samples stored in the reference buffer. However, the disclosure is not limited thereto. For example, if or when all of the reference samples stored in the reference buffer are marked as available, reference samples in a predetermined location may have a possibility that sample values thereof may not be appropriately derived so as to be used for intra prediction. As such, whether or not the reference samples stored in the reference buffer may be used for intra prediction may be additionally identified, according to necessity.

Continuing to refer to FIG. 2A, if or when a split direction of a first coding unit is a vertical direction, the image encoder 155 may determine an encoding order of a left second coding unit and a right second coding unit split according to the split direction. For example, the image encoder 155 may determine the encoding order to be the left second coding unit followed by the right second coding unit. Alternatively or additionally, the image encoder 155 may determine the encoding order to be the right second coding unit followed by the left second coding unit. In some embodiments, if or when the SUCO method is not applied, the image encoder 155 may determine the encoding order of the second coding unit to start with the left second coding unit followed by the right second coding unit (e.g., a forward direction). Alternatively or additionally, if or when the SUCO method is applied, the image encoder 155 may determine the encoding order of the second coding unit to start with the left second coding unit followed by the right second coding unit (e.g., the forward direction). Alternatively or additionally, the image encoder 155 may determine, if or when the SUCO method is applied, the encoding order to start with the right second coding unit followed by the left second coding unit (e.g., a backward direction). A detailed aspect about the SUCO method will be described below with reference to FIG. 5B.

In other embodiments, by taking into account the encoding order of a coding unit if or when the SUCO method is applied, the reference sample that may be used for intra prediction may not be limited to a left neighboring region and an upper neighboring region and may further include a right neighboring region. Alternatively or additionally, the left neighboring region and the right neighboring region may not be available, and the intra predictor 160 may be configured to identify an availability of the left neighboring region and the right neighboring region by considering a decoding order and may be further configured to perform intra prediction on the current block by considering the availability of the neighboring region.

For example, if or when the reference buffer is configured as described above if or when an intra prediction mode of the current block is a DC mode, the sample value of the reference sample of the left, upper, and/or right reference lines of the current block, stored in the reference buffer, may be defined. That is, the intra predictor 115 may perform intra prediction on the current block without additionally identifying the availability. In some embodiments, if or when the intra prediction mode of the current block is a DC mode, the intra predictor 160 may determine a prediction sample value of a sample in the current block using an average value of the reference samples of the defined directions (e.g., left, upper, and/or right directions).

In other embodiments, if or when a SUCO method is applied, the intra predictor 160 may identify a condition according to the SUCO method, and the condition according to the SUCO method will be described in detail with reference to FIG. 5B. For example, the identification of the condition according to the SUCO method may correspond to the identification of the availability of the left neighboring region and the upper neighboring region of the current block.

In some embodiments, the intra predictor 160 may be configured to obtain a prediction sample value of samples in the current block using a sample of at least one reference line of the left reference line of the current block, the upper reference line of the current block, and the right reference line of the current block, based on the availability of the left neighboring region and the right neighboring region of the current block. For example, the intra predictor 160 may identify one of various conditions (e.g., LR_00, LR_01, LR_10, and LR_11 of FIG. 5B) according to the SUCO method. Alternatively or additionally, the intra predictor 160 may obtain, based on the identified condition according to the SUCO method, the prediction sample value of the sample in the current block using the sample of the at least one reference line of the left reference line of the current block, the upper reference line of the current block, and the right reference line of the current block.

In other optional or additional embodiments, if or when the left neighboring region is identified to be available, and the right neighboring region is identified to be not available, the intra predictor 160 may obtain the prediction sample value of the samples in the current block, based on an average value of sample values of reference samples of the left reference line and sample values of reference samples of the upper reference line. For example, if or when the condition according to the SUCO method is LR_10 (i.e., the left reference line is available and the right reference line is not available), the intra predictor 160 may obtain the prediction sample value of the samples in the current block, based on the average value of the sample values of the reference samples of the left reference line and the sample values of the reference samples of the upper reference line.

In other optional or additional embodiments, if or when the left neighboring region of the current block is identified to be not available, and the right neighboring region is identified to be available, the intra predictor 160 may obtain the prediction sample value of the samples in the current block, based on an average value of sample values of reference samples of the right reference line and the sample values of the reference samples of the upper reference line. For example, if or when the condition according to the SUCO method is LR_01 (i.e., the left reference line is not available and the right reference line is available), the intra predictor 160 may obtain the prediction sample value of the samples in the current block, based on the average value of the sample values of the reference samples of the right reference line and the sample values of the reference samples of the upper reference line.

In other optional or additional embodiments, if or when the left neighboring region of the current block is identified to be available, and the right neighboring region is identified to be available, the intra predictor 160 may obtain the prediction sample value of the samples in the current block, based on an average value of the sample values of the reference samples of the left reference line, the sample values of the reference samples of the right reference line, and the sample values of the reference samples of the upper reference line. For example, if or when the condition according to the SUCO method is LR_11 (i.e., the left reference line is available and the right reference line is available), the intra predictor 160 may obtain the prediction sample value of the samples in the current block, based on the average value of the sample values of the reference samples of the left reference line, the sample values of the reference samples of the right reference line, and the sample values of the reference samples of the upper reference line.

In other optional or additional embodiments, if or when the left neighboring region of the current block is identified to be not available, and the right neighboring region is identified to be not available, the intra predictor 160 may obtain the prediction sample value of the samples in the current block, based on an average value of the sample values of the reference samples of the upper reference line. For example, if or when the condition according to the SUCO method is LR_00 (i.e., the left reference line is not available and the right reference line is not available), the intra predictor 160 may obtain the prediction sample value of the samples in the current block, based on the average value of the sample values of the reference samples of the upper reference line.

However, the disclosure is not limited thereto. For example, if or when the condition according to the SUCO method is LR_00, the intra predictor 160 may obtain the prediction sample value of the samples in the current block, based on the average value of the sample values of the reference samples of the left reference line and the sample values of the reference samples of the upper reference line.

As described above, if or when the intra prediction mode is the DC mode, the intra predictor 160 may obtain the prediction sample value of the sample in the current block using the sample of the at least one reference line of the left reference line of the current block, the upper reference line of the current block, and the right reference line of the current block, based on the availability of the left neighboring region and the right neighboring region of the current block. However, the disclosure is not limited thereto. For example, the prediction sample value of the sample in the current block may be obtained using the sample of the determined at least one reference line of the left reference line of the current block, the upper reference line of the current block, and the right reference line of the current block, without consideration as to the availability of the neighboring regions of the current block.

Alternatively or additionally, if or when the intra prediction mode is the DC mode, the intra predictor 160 may obtain the prediction sample value of the sample in the current block using the sample of the at least one reference line of the left reference line of the current block, the upper reference line of the current block, and the right reference line of the current block, based on the availability of the left neighboring region and the availability of the upper neighboring region, and/or on the availability of the right neighboring region.

Hereinafter, a method, performed by the image encoding apparatus 150, of signaling a chroma intra prediction mode in an efficient manner, is described, according to some embodiments.

The chroma intra prediction mode may include a total of five modes (e.g., two DM modes, a DC mode, a vertical mode, and a horizontal mode). In some embodiments, the DM may denote an intra prediction mode using a luma intra prediction mode. Alternatively or additionally, the DM may denote an intra prediction mode using the chroma intra prediction mode. If or when an intra prediction mode indicated by the DM overlaps the remaining four modes, a mode of the four modes, the mode overlapping the intra prediction mode indicated by the DM, may be replaced by another mode, or one bit may be saved via truncated binarization. In some embodiments, dependency may occur with respect to the DM, and an additional context model may be needed. Hereinafter, a simple method of signaling the chroma intra prediction mode is described.

If or when, the number of candidates of the chroma intra prediction mode is maintained as five, the DM may be selected as an intra prediction mode the same as the remaining candidates of the intra prediction mode, overlapping may be permitted. In some embodiments, information about whether or not the chroma intra prediction mode is the DM may be context-based binary arithmetic that may be coded as a 1-bit flag. If or when the chroma intra prediction mode is not the DM, the remaining four candidates of the intra prediction mode may be encoded as 2 bits by FLC.

In some embodiments, the image encoder 155 may perform context model-based binary arithmetic coding on the 1-bit flag indicating whether or not the chroma intra prediction mode is the DM. If or when the chroma intra prediction mode of the current block is not the DM, the image encoder 155 may binarize 2-bit information about the chroma intra prediction mode according to the FLC. The bitstream generator 170 may generate a bitstream including at least one of the 1-bit flag indicating whether or not the chroma intra prediction mode is the binary arithmetic coded DM and the 2-bit information about the chroma intra prediction mode.

As such, the dependency with respect to the DM may be eliminated, various comparison operations may be reduced, and without using an additional context model, the chroma intra prediction mode may be signaled in a simple way.

The image encoding apparatus 150 may generate a bin to signal the chroma intra prediction mode according to a pseudo code below.

[Pseudo Code]

```
if(chroma mode == DM mode)
{
    evce_sbac_encode_bin(1, sbac, sbac->ctx.intra_dir + 2, bs);
// 1 bit coding in the case of the DM mode (one context model)
}
else
{
    evce_sbac_encode_bin(0, sbac, sbac->ctx.intra_dir + 2, bs);
// flag 1 bit indicating a non-DM mode
    chroma mode = chroma mode - 1;
// adjust the rest mode index except for the DM mode as 0 to 3
    sbac_encode_bin_ep(chroma mode / 2, sbac, bs); // FLC on the value of 0-3 as 2 bits
    sbac_encode_bin_ep(chroma mode % 2, sbac, bs); // FLC on the value of 0-3 as 2 bits
}
```

The intra predictor 160 may perform intra prediction using a reference sample apart from and not directly contacting the current block. For example, if or when a coordinate value of an upper left corner of the current block is (0, 0), a reference sample having a coordinate value of (−2, −1), (−1, −2), (a width of the current block, −2), or the like may be used. In some embodiments, a length of a left reference line buffer and an upper reference line buffer may be extended according to an intra prediction method and/or an intra prediction mode. The intra predictor 160 may increase the length of the reference line buffer, may identify an availability of a reference sample, and may determine a reconstructed sample value with respect to the corresponding reference sample according to the availability of the reference sample, as a sample value of the reference sample. If or when the reference sample is not available, the sample value of the reference sample may be determined as a default value and/or a sample value of other available reference samples. In some embodiments, the determined sample value of the reference sample may be stored in the reference line buffer.

A method of using a sample value of a reference line buffer in another direction closer to the current block or determining a corresponding reference sample without changing a length of the reference line buffer will be described below with reference to FIGS. 3B and 3C.

If or when the intra prediction mode is an angular mode, the intra predictor 160 may perform intra prediction on a current sample in the current block using a sample value of a plurality of reference samples needed for an N-tap interpolation filter and filtering. That is, the intra predictor 160 may obtain a prediction sample value of the current sample in the current block, by performing the filtering using the N-tap interpolation filter on a reference sample crossing an extension line in an intra prediction direction (and/or the opposite direction) from the current sample, and a reference sample neighboring the reference sample formerly mentioned. In some embodiments, a method, performed by the intra predictor 160, of determining a sample value of a reference sample to be used for intra prediction, if or when the reference sample crossing the extension line in the intra prediction direction (and/or the opposite direction) from the current sample is located around a corner of the current block, will be described below with reference to FIGS. 4A through 4G.

In some embodiments, the image encoder 155 may be configured to generate a residual block including a coefficient of the current block, based on a prediction block of the current block. The image encoder 155 may obtain a residual sample value (e.g., a coefficient value) of a current sample in the residual block of the current block by subtracting an original sample value of a current sample in an original block of the current block and a prediction sample value of a current sample in the prediction block of the current block and may generate the residual block of the current block based on the residual sample value of the current sample.

In some embodiments, the image encoder 155 may generate at least one transform coefficient of the current block by transforming and quantizing the residual block of the current block.

In some embodiments, the bitstream generator 170 may generate a bitstream including information about the transform coefficient of the current block.

Figure 2B:
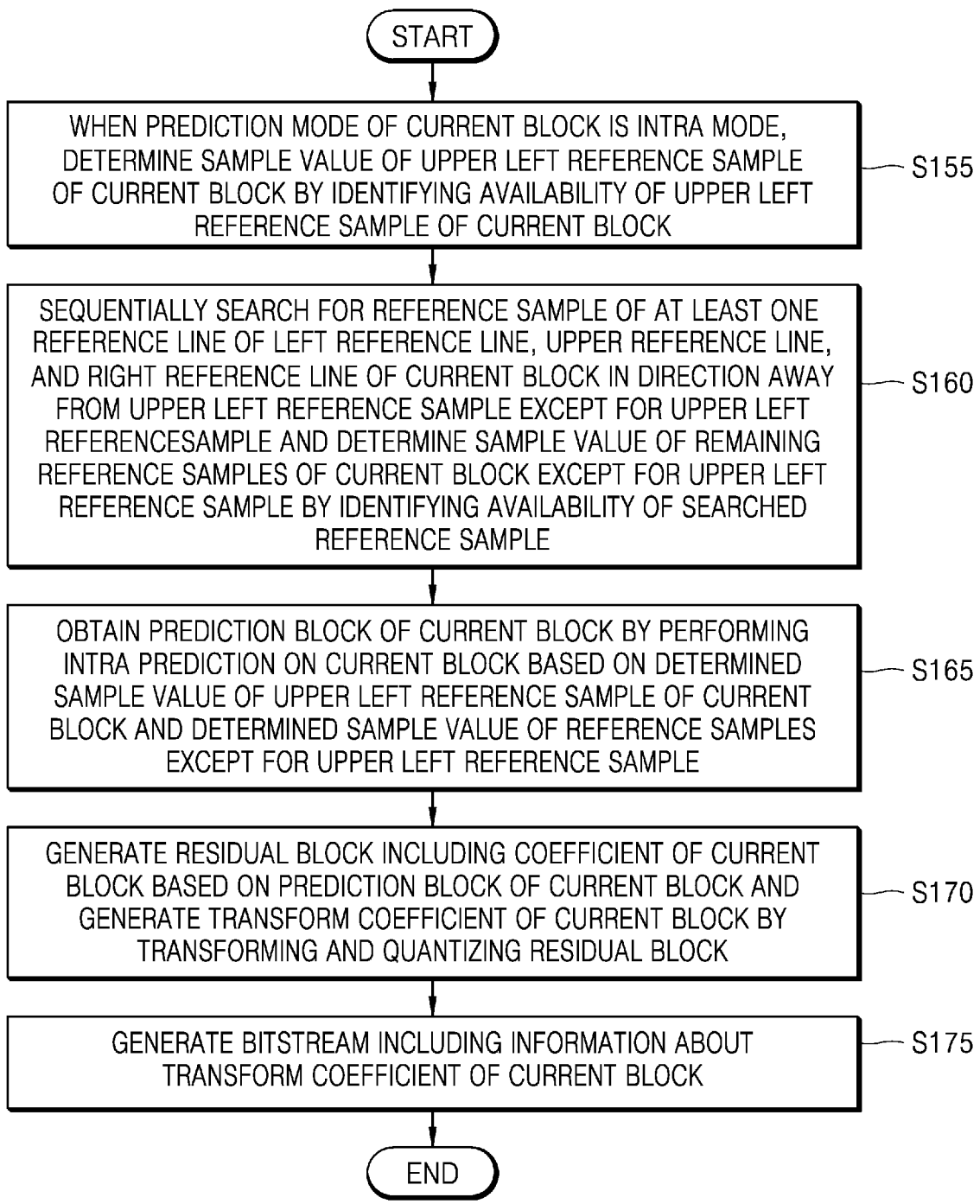
FIG. 2B is a flowchart of an image encoding method, according to various embodiments of the present disclosure.

FIG. 2B is a flowchart of an image encoding method according to various embodiments of the present disclosure.

In operation S155, if or when a prediction mode of a current block is an intra mode, the image encoding apparatus 150 may determine a sample value of an upper left reference sample of the current block by identifying an availability of the upper left reference sample of the current block. For example, if or when the upper left reference sample is identified to be available, the image encoding apparatus 150 may determine a reconstructed sample value with respect to the upper left reference sample, as the sample value of the upper left reference sample. Alternatively or additionally, if or when the upper left reference sample is identified to be not available, the image encoding apparatus 150 may determine a value based on a bit depth of a sample as the sample value of the upper left reference sample.

In operation S160, the image encoding apparatus 150 may search for a reference sample of at least one reference line of a left reference line of the current block, an upper reference line of the current block, and a right reference line of the current block sequentially in a direction away from the upper left reference sample, except for the upper left reference sample, and may determine a sample value of remaining reference samples, except for the upper left reference sample of the current block, by identifying an availability of the searched reference sample. For example, if or when a reference sample in a current search location is identified to be not available, the image encoding apparatus 150 may determine a value based on a bit depth of a sample or a sample value of a reference sample in a directly previous search location, as a sample value of the reference sample in the current search location.

Alternatively or additionally, if or when the reference sample in the current search location is identified to be available, the image encoding apparatus 150 may determine a reconstructed sample value with respect to the reference sample in the current search location, as the sample value of the reference sample in the current search location.

In operation S165, the image encoding apparatus 150 may obtain a prediction block of the current block by performing intra prediction on the current block, based on the determined sample value of the upper left reference sample of the current block and the determined sample value of the remaining reference samples, except for the upper left reference sample.

In operation S170, the image encoding apparatus 150 may generate a residual block including a coefficient of the current block, based on the prediction block of the current block, and may generate a transform coefficient of the current block by transforming and quantizing the residual block.

In operation S175, the image encoding apparatus 150 may generate a bitstream including information about the transform coefficient of the current block.

Figure 2C:
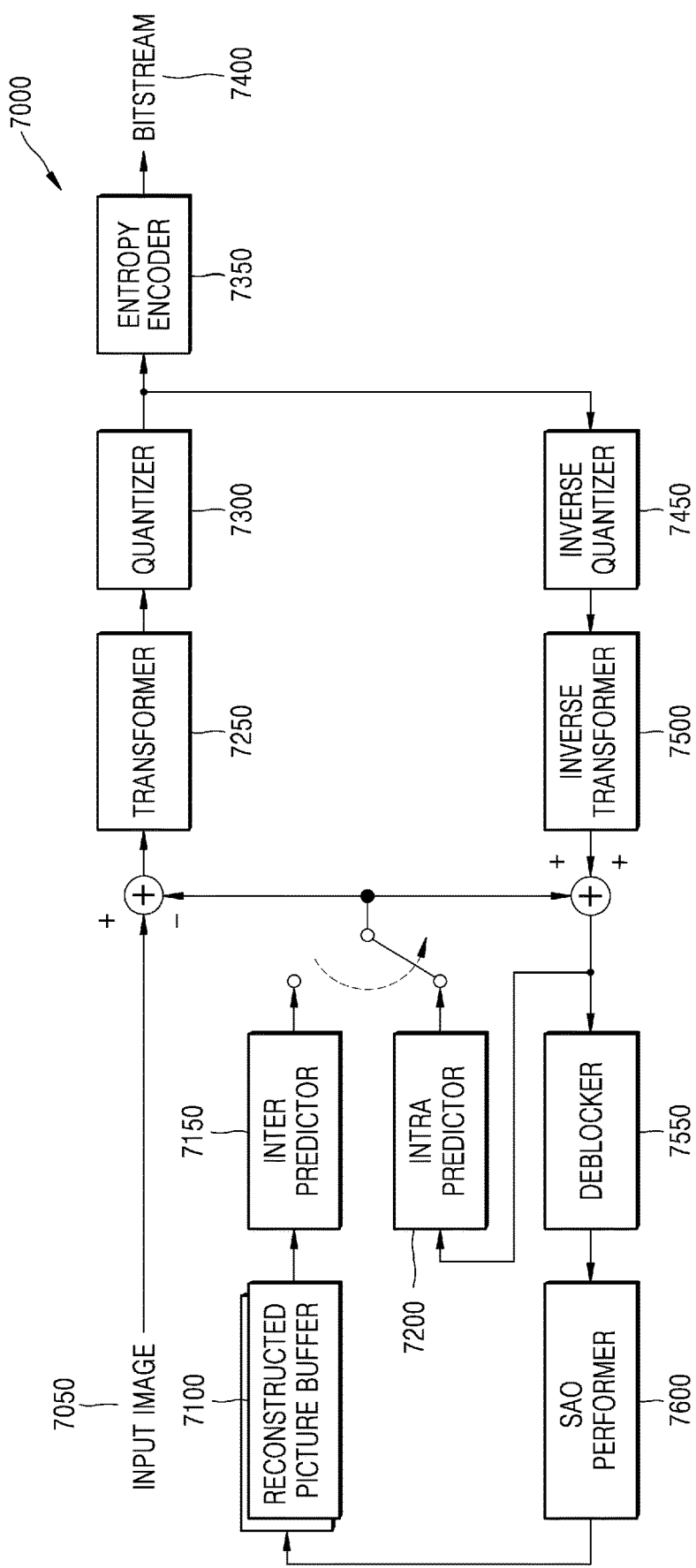
FIG. 2C is a block diagram of an image encoder, according to various embodiments of the present disclosure.

FIG. 2C is a block diagram of an image encoder according to various embodiments.

An image encoder 7000 according to various embodiments may perform operations performed by the image encoder 155 and the bitstream generator 170 of the image encoding apparatus 150, as discussed in reference to FIG. 2A, to encode image data.

That is, an intra predictor 7200 may perform intra prediction on each one of blocks of a current image 7050. In other embodiments, an inter predictor 7150 may perform inter prediction on each one of the blocks using the current image 7050 and a reference image obtained from a reconstructed picture buffer 7100.

In other optional or additional embodiments, residue data may be generated by subtracting prediction data with respect to each block from data with respect to a block to be encoded in the current image 7050, wherein the prediction data is output from the intra predictor 7200 and/or the inter predictor 7150. Alternatively or additionally, a transformer 7250 and/or a quantizer 7300 may output a quantized transform coefficient of each block by performing transformation and quantization on the residue data. In some embodiments, an inverse quantizer 7450 and/or an inverse transformer 7500 may reconstruct residue data of a spatial domain by performing inverse quantization and inverse transformation on the quantized transform coefficient. The reconstructed residue data of the spatial domain may be added to the prediction data for each block that is output from the intra predictor 7200 and/or the inter predictor 7150, and, as such, may be reconstructed as data of the spatial domain for the block of the current image 7050. In some embodiments, a deblocker 7550 and/or an SAO performer 7600 may generate a filtered reconstructed image by performing inloop filtering on the reconstructed data of the spatial domain. The generated reconstructed image may be stored in the reconstructed picture buffer 7100. Reconstructed images stored in the reconstructed picture buffer 7100 may be used as a reference image for inter prediction with respect to another image. In some embodiments, an entropy encoder 7350 may entropy encode the quantized transform coefficient, and the entropy encoded coefficient may be output as a bitstream 7400.

To implement the image encoder 7000 according to various embodiments in the image encoding apparatus 150, the operations of the image encoder 7000 according to various embodiments may be performed on one of more components of the image encoder 7000. For example, an operation of the intra predictor 7200 may correspond to an operation of the intra predictor 160.

Figure 3A:
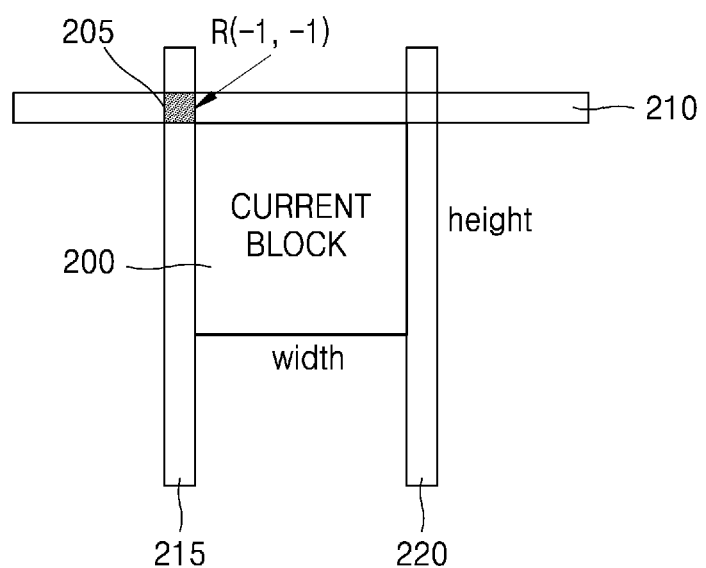
FIG. 3A is a diagram illustrating an example process, performed by an image decoding apparatus, for determining a sample value of a reference sample to be stored in a reference buffer for intra prediction, according to various embodiments of the present disclosure.

FIG. 3A is a diagram for describing a process in which the image decoding apparatus 100 may determine a sample value of a reference sample to be stored in a reference buffer for intra prediction, according to some embodiments.

If or when the image decoding apparatus 100 generates the reference buffer, the image decoding apparatus 100 may define an initial value of a predetermined location, and, according to a predetermined data unit based on the predetermined location, may store a sample value of a reference sample in the buffer by identifying an availability of the reference sample. In some embodiments, the predetermined data unit may be defined as a pixel unit, a unit based on a smallest coding unit, or the like. For example, a size (a height and a width) of the smallest coding unit may be 4, and a size of the unit based on the smallest coding unit may be 1×4 or 4×1 according to a direction in which a data unit is searched for. If or when a reference sample in a next search location of the location with respect to which the initial value is defined is identified as being available, the image decoding apparatus 100 may store a reconstructed sample value in a location of the reference buffer, the location corresponding to the reference sample. If or when the reference sample in the next search location of the location with respect to which the initial value is defined is identified as being not available, the image decoding apparatus 100 may store the defined initial value in a location of the reference buffer, the location corresponding to the reference sample. Similarly, a reference sample value of a reference sample in a next search location of the next search location may be stored in a corresponding location of the reference sample.

Referring to FIG. 3A, if or when a coordinate of an upper left corner of a current block is (0, 0), and R(x, y) denotes a reference sample located at a coordinate (x, y), an upper left reference sample 205 of the current block may be defined as R (−1, −1).

In some embodiments, the image decoding apparatus 100 may identify an availability of the upper left reference sample 205. For example, if or when the image decoding apparatus 100 identifies the upper left reference sample 205 to be available, the image decoding apparatus 100 may determine an available value (e.g., a reconstructed value) as a sample value of the upper left reference sample 205 and may store the corresponding sample value in the reference buffer. Alternatively or additionally, if or when the image decoding apparatus 100 identifies the upper left reference sample 205 to be not available, a default value may be filled in the reference buffer. In some embodiments, the default value may be zero (0), a median value of a color scale, or a median value or a maximum value in a range of a sample value indicated by a sample bit depth, but is not limited thereto.

After the sample value of the upper left reference sample 205 has been determined (and/or stored in the reference buffer), the image decoding apparatus 100 may sequentially identify an availability of each predetermined data unit of reference buffers of a left reference line 215, an upper reference line 210, and a right reference line 220. Alternatively or additionally, if or when the predetermined data unit of the reference buffers of the left reference line 210, the upper reference line 215, and the right reference line 220 is identified to be available, the image decoding apparatus 100 may store a reconstructed sample value of the data unit in the reference buffer. Alternatively or additionally, if or when the predetermined data unit is identified to be not available (e.g., if or when the data unit is not coded, GIP is performed, and/or the data unit is coded in an inter prediction mode), the image decoding apparatus 100 may fill in a pixel of a current data unit with a default value, fill in the pixel of the current data by padding a last value stored in the buffer, and/or store a sample value of a previous data unit in the reference buffer.

In some embodiments, the image decoding apparatus 100 may identify an availability of the reference sample before determining a sample value thereof to be stored in the reference buffer, and the availability may be identified according to the conditions below.

For example, the image decoding apparatus 100 may identify the availability of the reference sample by identifying whether or not CIP is applied and by identifying a prediction mode. If or when the CIP is applied, and a prediction mode of a neighboring block including the reference sample is an inter prediction mode, the image decoding apparatus 100 may identify that the reference sample is not available. Alternatively or additionally, if or when the CIP is not applied, the image decoding apparatus 100 may not identify the prediction mode of the neighboring block including the reference sample. That is, the image decoding apparatus 100 may not identify the availability, based on the prediction mode.

In some embodiments, if or when a location of the reference sample is outside a picture, the image decoding apparatus 100 may identify that the corresponding reference sample is not available. Alternatively or additionally, if or when the location of the reference sample is inside the picture, the image decoding apparatus 100 may identify that the corresponding reference sample is available.

In other embodiments, if or when a location of the reference sample is included in a different slice from the current block 200, the image decoding apparatus 100 may identify the corresponding reference sample to be not available. Alternatively or additionally, if or when the location of the reference sample is included in the same slice as the current block 200, the image decoding apparatus 100 may identify the corresponding reference sample to be available.

In other optional or additional embodiments, if or when a location of the reference sample is included in a different tile from the current block 200, the image decoding apparatus 100 may identify the corresponding reference sample to be not available. Alternatively or additionally, if or when the location of the reference sample is included in the same tile as the current block 200, the image decoding apparatus 100 may identify the corresponding reference sample to be available.

In other optional or additional embodiments, if or when a location of the reference sample is included in a different tile from the current block 200, the image decoding apparatus 100 may identify the corresponding reference sample to be not available. Alternatively or additionally, if or when the location of the reference sample is included in the same tile as the current block 200, the image decoding apparatus 100 may identify the corresponding reference sample to be available.

In other optional or additional embodiments, if or when a location of the reference sample is on a different side from the current block 200, based on a virtual boundary, the image decoding apparatus 100 may identify the corresponding reference sample to be not available. For example, the virtual boundary may be a boundary of viewport areas in a 360-degree image or a boundary of flexible tiles (e.g., the boundary may be located inside a largest coding unit). Alternatively or additionally, if or when the reference sample is located on the same side as the current block based on the virtual boundary, the image decoding apparatus 100 may identify the corresponding reference sample to be available.

In other optional or additional embodiments, if or when the CIP is to be used, the image decoding apparatus 100 may identify a corresponding reference sample to be not available. Alternatively or additionally, if or when a location of the reference sample is coded in an intra mode, the image decoding apparatus 100 may identify the corresponding reference sample to be available, if or when the location of the reference sample is coded in an inter-mode.

In some embodiments, the image decoding apparatus 100 may identify whether a reference sample is reconstructed according to a decoding order, and based on whether or not the reference sample is reconstructed, may identify whether or not the corresponding reference sample is available.

In some embodiments, the image decoding apparatus 100 may identify the availability of the reference sample using various combinations of the conditions described above.

As described above in reference to FIG. 3A, an example method is described, according to which the image decoding apparatus 100 may determine the sample value of the upper left reference sample 205 of the current block 200 by identifying the availability of the upper left reference sample 205, may search for a reference sample of at least one reference line of the left reference line of the current block, the upper reference line of the current block, and the right reference line of the current block sequentially in a direction away from the upper left reference sample 205, and may determine a sample value of remaining reference samples, except for the upper left reference sample of the current block, by identifying an availability of the searched reference sample. However, the disclosure is not limited thereto. It will be understood by one of ordinary skill in the art that a reference sample of a different predetermined location rather than the upper left reference sample 205 may be determined, reference samples may be sequentially searched for in a direction away from the corresponding reference sample, and a sample value of remaining reference samples, except for the reference sample in the predetermined location, may be determined by identifying an availability of the searched reference sample.

Conventionally, an image decoding apparatus may identify an availability of a reference sample in a predetermined location, and then, if or when the reference sample is available, may store, in a reference buffer, information of an upper reference line and a left reference line corresponding to a height and a width of a current block. As such, if or when the availability of the stored reference sample is identified, there is a possibility that there are regions that are not available. Thus, the corresponding conventional image decoding apparatus may be unable to support the use of CIP. Accordingly, a new method of storing a sample value in a reference buffer may be required.

For example, if or when there is no available reference sample in a current location, a conventional image decoding apparatus may fill in the reference buffer with a default value or may fill in the reference buffer with a sample value of a nearest location (e.g., a first value or a last value of a block for which there is information) by searching for a sample having an available sample value from the location having no available reference sample. As such, a sample having a sample value may not be appropriately used, or until the sample having the available sample value is searched, the current location may have to be stored. Thus, in order to potentially solve these problems, as described above with reference to FIG. 3A, the image decoding apparatus 100 may identify the availability of the upper left reference sample 205 and determine the sample value of the upper left reference sample 205 of the current block. Alternatively or additionally, the image decoding apparatus 100 may search for a reference sample of at least one reference line of the left reference line of the current block, the upper reference line of the current block, and the right reference line of the current block sequentially in a direction away from the upper left reference sample 205 and may determine a sample value of remaining reference samples, except for the upper left reference sample of the current block, by identifying an availability of the searched reference sample. As such, the image decoding apparatus 100 may store, in an efficient manner, the sample values in the reference buffer, and the reference samples stored in the reference buffer may be marked as available for intra prediction. Consequently, the image decoding apparatus 100 may effectively perform intra prediction without additionally marking the availability. Alternatively or additionally, the operation of the image decoding apparatus 100 described above with reference to FIG. 3A may be performed, and based on the sample value stored in the reference buffer based on the performed operation, the image decoding apparatus 100 may support using the CIP.

Figure 3B:
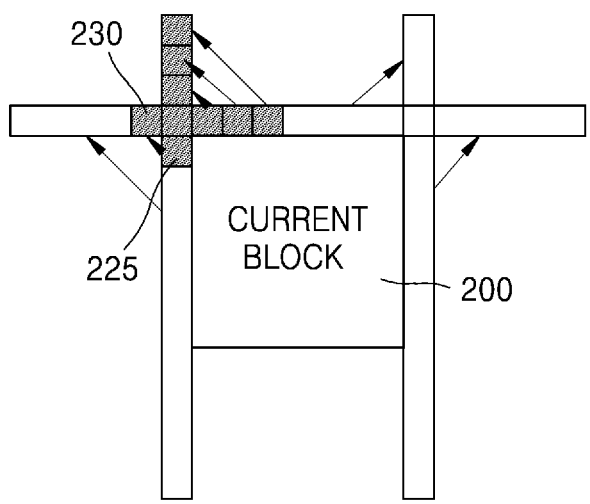
FIG. 3B is a diagram illustrating an example method, performed by an image decoding apparatus, for determining a sample value of a corresponding reference sample (and configuring a reference buffer), when the image decoding apparatus uses the reference sample apart from a current block for intra prediction, according to various embodiments of the present disclosure.

FIG. 3B is a diagram illustrating an example method, performed by the image decoding apparatus 100, for determining a sample value of a corresponding reference sample (and/or configuring a reference buffer), if or when the image decoding apparatus 100 uses the reference sample apart from the current block 200 for intra prediction, according to various embodiments of the present disclosure.

In some embodiments, the image decoding apparatus 100 may separately include a reference buffer of the upper reference line, a reference buffer of the left reference line, and/or a reference buffer of the right reference line. Alternatively or additionally, a length of each buffer may be a sum of a height and a width of the current block. In some embodiments, the image decoding apparatus 100 may increase the length of the reference buffer to determine a sample value of a reference sample previously not used and store the sample value in the reference buffer. For example, the reference buffer of the upper reference line, the reference buffer of the left reference line, and/or the reference buffer of the right reference line may store sample values, such as R(−2, −1), R(−1, −2), R(width, −2), and the like. If or when a reference sample in a corresponding location is available, a reconstructed value may be determined as a sample value of the reference sample in the corresponding location, and the determined sample value of the reference sample in the corresponding location may be stored in the reference buffer. If or when the reference sample in the corresponding location is not available, a default value may be determined as the sample value of the reference sample in the corresponding location, and the determined sample value of the reference sample in the corresponding location may be stored in the reference buffer. According to some embodiments, the length of the reference buffer of the reference line may not be extended and may be extended according to intra prediction.

Referring to FIG. 3B, the image decoding apparatus 100 may substitute the reference sample apart from the current block 200 by a sample value stored in the reference buffer of another reference line.

In some embodiments, the image decoding apparatus 100 may substitute a sample value of a reference sample 230 by a sample value of a reference sample 225. For example, if or when the image decoding apparatus 100 determines the sample value of the reference sample 230, the image decoding apparatus 100 may access the sample value of the reference sample 225 stored in the reference buffer of the left reference line and may determine the sample value of the reference sample 230 as the sample value of the reference sample 225 and store the sample value of the reference sample 225 in the reference buffer of the upper reference line. In some embodiments, a sample value of each sample may be determined (and/or stored in the reference buffer) by having a one-on-one matching manner, but is not limited thereto. In other embodiments, a sample value calculated for a sub-pixel unit according to an intra prediction direction may be determined (and stored in the reference buffer) via N-tap interpolation, where N is a natural number equal to or greater than 2.

Figure 3C:
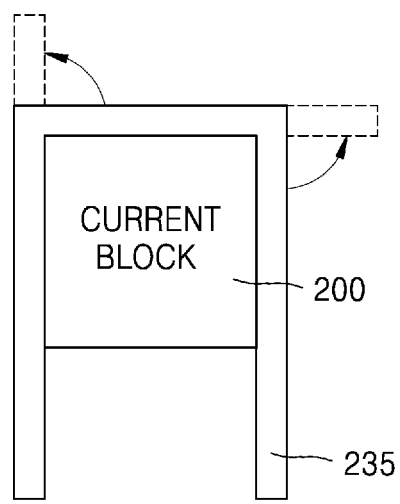
FIG. 3C is a diagram illustrating an example method, performed by an image decoding apparatus, for configuring a single buffer that may determine a sample value of a corresponding reference sample, when the image decoding apparatus uses the reference sample apart from a current block for intra prediction, according to various embodiments of the present disclosure.

FIG. 3C is a diagram illustrating an example method, performed by the image decoding apparatus 100, for configuring a single reference buffer configured to determine a sample value of a corresponding reference sample, if or when the image decoding apparatus 100 uses the reference sample apart from the current block 200 for intra prediction, according to some embodiments.

Referring to FIG. 3C, the image decoding apparatus 100 may store the sample value of the reference sample in a single line buffer 235. That is, as one line is extended in order to determine the sample value of the reference sample apart from the current block 200, a sample value stored in the line buffer 235 may be accessed by continually increasing or decreasing a simple index. For example, the image decoding apparatus 100 may increase one from an index of the line buffer 235 of R(−1, −1) and may determine a sample value of R(0, −1) indicated by a corresponding index as a sample value of R(−2, −1). Alternatively or additionally, the image decoding apparatus 100 may increase one from an index of the line buffer 235 of R(width, −1) and may determine a sample value of R(width, 0) indicated by a corresponding index as a sample value of R(width+1, −1).

In some embodiments, the image decoding apparatus 100 may obtain, by configuring the line buffer 235, an effect that is similar to an effect obtained by separately storing a sample value of a reference sample in the reference buffer of each direction. Alternatively or additionally, if or when the sample value of the reference sample apart from the current block 200 is to be used, the image decoding apparatus 100 may access a sample value of a reference sample in a near location from the current block 200, stored in the line buffer 235, and as such, intra prediction may be effectively performed.

FIG. 3D illustrates an example of pseudo code for implementing an operation performed, by the image decoding apparatus 100, of configuring an upper reference line buffer, according to various embodiments of the present disclosure.

Referring to FIG. 3D, the image decoding apparatus 100 may identify an availability of an upper left reference pixel of a current block, and if or when the upper left reference pixel of the current block is available (e.g., if (IS_AVAIL . . . ) may store a value of the upper left reference pixel in a reference buffer (e.g., copy(up−1, . . . ).

If or when the upper left reference pixel of the current block is not available (e.g., else), the image decoding apparatus 100 may store a default value in the reference buffer (e.g., up[−1] . . . ).

Thereafter, the image decoding apparatus 100 may perform an operation of filling in a reference buffer in an upper direction (e.g., the reference buffer of the upper reference line) as described below.

In some embodiments, the image decoding apparatus 100 may determine a pixel value of a reference pixel in a searched location by performing a search operation in a right direction from the upper left reference pixel. In some embodiments, the image decoding apparatus 100 may check an availability for each predetermined unit, and if or when a predetermined unit is available, the image decoding apparatus 100 may store a pixel value of a pixel of the corresponding unit in the buffer. Alternatively or additionally, if or when the predetermined unit is not available, the image decoding apparatus 100 may fill in the reference buffer by padding a pixel value stored directly previous to a current search location. In some embodiments, the predetermined unit may be defined as a single pixel unit, a plurality of pixel units, a size of a smallest coding unit, or the like.

Alternatively or additionally, the image decoding apparatus 100 may substitute a pixel value up[−2] of R(−2, −1) in a reference buffer in an upper direction with respect to the current block by a pixel value LEFT[0] of R(−1, 0) stored in a reference buffer in a left direction and may store the substituted value in the reference buffer in the upper direction. However, the disclosure is not limited thereto. For example, if or when a pixel of R(−2, −1) is available, a pixel value of the pixel of R(−2, −1) may be stored in the reference buffer in the upper direction. Alternatively or additionally, the pixel value of the pixel of R(−2, −1) may be determined as a pixel value of a pixel up[−1] of R(−1, −1), and the determined pixel value may be stored in the reference buffer in the upper direction. That is, the pixel value of the pixel up[−1] of R(1, −1) may be padded and stored.

FIGS. 4A through 4G are diagrams illustrating an example process, performed by the image decoding apparatus 100, for determining a reference sample (e.g., a pixel) around a corner of the current block 200, if or when the image decoding apparatus 100 performs intra prediction on a current sample in an angular mode, according to various embodiments of the present disclosure.

Referring to FIGS. 4A through 4G, if or when the image decoding apparatus 100 performs intra prediction on the current sample in the angular mode, the image decoding apparatus 100 may obtain a prediction sample value of the current sample using N-tap interpolation (where N is a natural number equal to or greater than 2) with respect to at least two reference samples 250 including a reference sample crossing an extension line of a prediction direction 245 from the current sample and a neighboring reference sample. For example, the image decoding apparatus 100 may use the reference sample around the corner of the current block 200. Hereinafter, a method of determining the reference sample to be used herein is described.

Figure 4A:
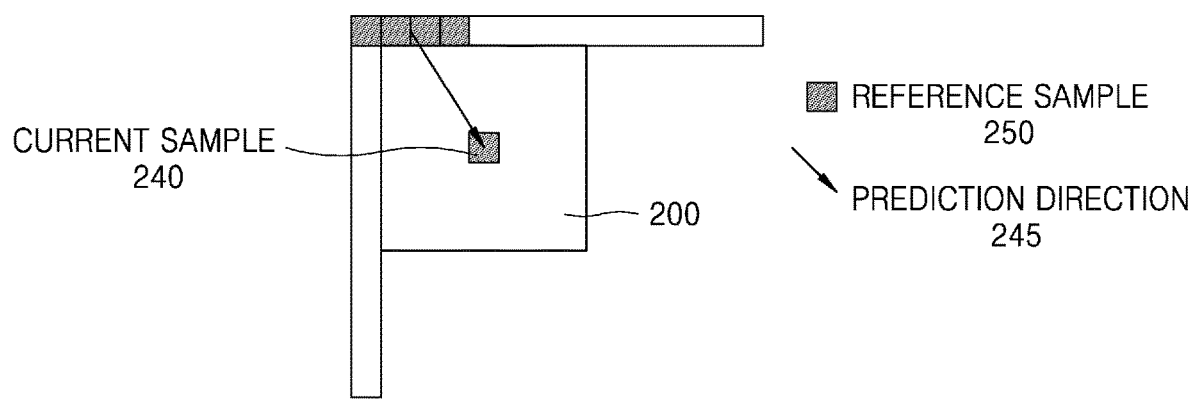
FIGS. 4A through 4G are diagrams illustrating an example process, performed by an image decoding apparatus, for determining a reference sample (e.g., a pixel) around a corner of a current block, when the image decoding apparatus performs intra prediction on a current sample in an angular mode, according to various embodiments of the present disclosure.

Referring to FIG. 4A, the image decoding apparatus 100 may obtain a prediction sample value interpolated using the four reference samples 250 including the reference sample crossing the extension line of the prediction direction 245 from the current sample, as a prediction sample value of a current sample 240.

Figure 4B:
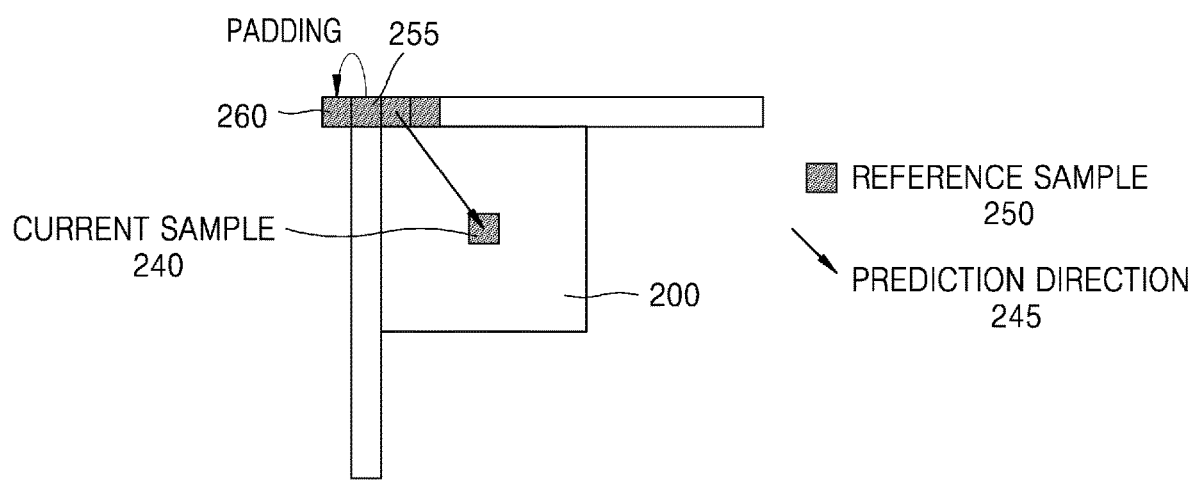

As illustrated in FIG. 4B, if or when a reference sample is located in an upper left corner of the current block 200, the image decoding apparatus 100 may pad a sample value of a reference sample 255 in a location of (−1, −1) based on the location of the upper left corner of the current block and may store a sample value of a reference sample 260 in a location of (−2, −1) in a reference buffer. In some embodiments, the sample value may not be additionally stored in the reference buffer, and a coordinate may be clipped, so as to obtain the same effect as the padding. That is, if or when a lower limit in a clipping range of an x-axis coordinate is set as −1, and if or when a reference sample in a location having an x-axis coordinate of −2 is to be accessed, a reference sample in a location having an x-axis coordinate of −1 may be accessed via coordinate clipping, and as such, the sample value of the reference sample 260 in the location of (−2, −1) may be obtained, if or when the sample value of the reference sample 255 in the location of (−1, −1) is padded.

Figure 4C:
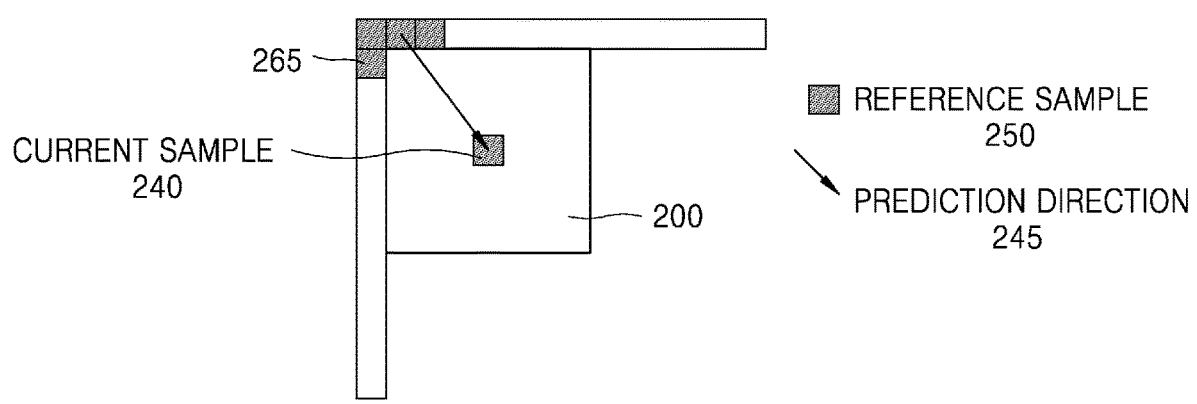

Referring to FIG. 4C, if or when the image decoding apparatus 100 performs intra prediction on the current sample 240 in the prediction direction 245, the image decoding apparatus 100 may use a sample value of a reference sample 265 in a location of (−1, 0) rather than the reference sample 260 in the location of (−2, −1). For example, if or when the reference sample 260 is not available, the sample value of the reference sample 265 may be used. However, the disclosure is not limited thereto. For example, the sample value of the reference sample 265 may be used, without consideration as to the availability of the reference sample 260.

Hereinafter, an example process, performed by the image decoding apparatus 100, for determining a reference sample around an upper right corner of the current block 200, if or when the image decoding apparatus 100 may use a sample value of a reference sample in a right neighboring region, is described.

Figure 4D:
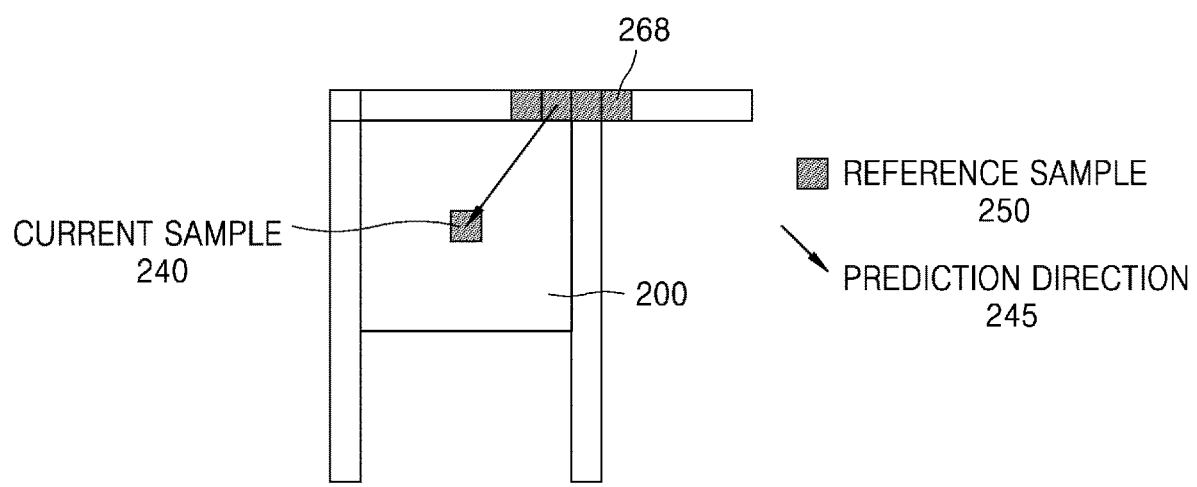

Referring to FIG. 4D, the image decoding apparatus 100 may use a sample value of a reference sample in a location of (Width+1, −1). In some embodiments, if or when a reference sample 268 in the location of (Width+1, −1) is available, the sample value of the reference sample in the corresponding location may be stored in a pixel buffer and may be used for intra prediction of the current sample 240. Alternatively or additionally, similarly to what is described with reference to FIG. 4B, the sample value of the reference sample 268 in the location of (Width+1, −1) may be stored by padding a sample value of a reference sample in a location of (width, −1), or the sample value of the sample in the location of (width, −1) stored in the reference buffer may be accessed via coordinate clipping.

Figure 4E:
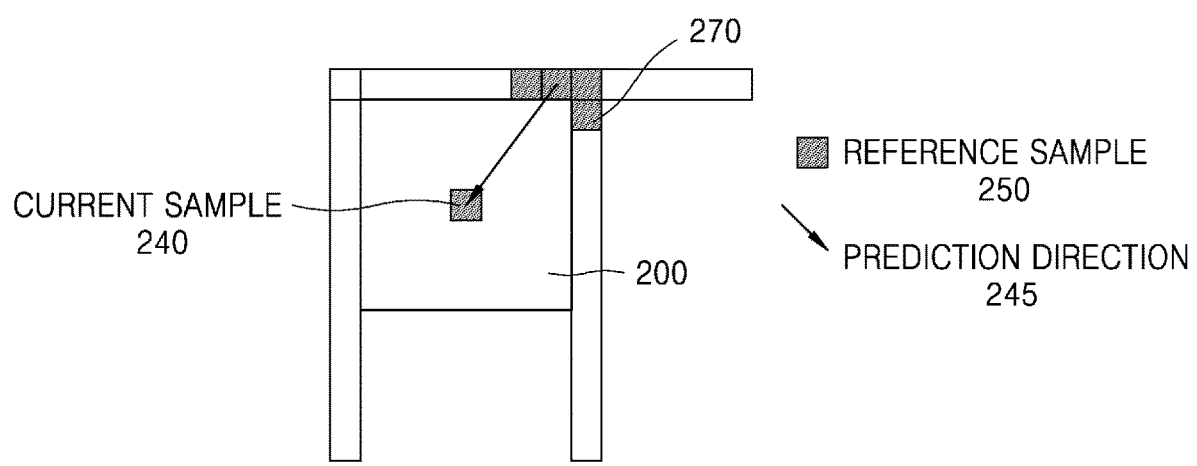

Referring to FIG. 4E, the image decoding apparatus 100 may use a sample value of a reference sample 270, if or when, in the process of performing intra prediction on the current sample 240 according to the prediction direction 245, the reference sample 268 is not available. In some embodiments, the sample value of the reference sample 268 may be substituted by the sample value of the reference sample 270 and may be stored in the reference buffer. Alternatively or additionally, the image decoding apparatus 100 may use the sample value of the reference sample 270, without consideration as to the availability of the reference sample 268.

Figure 4F:
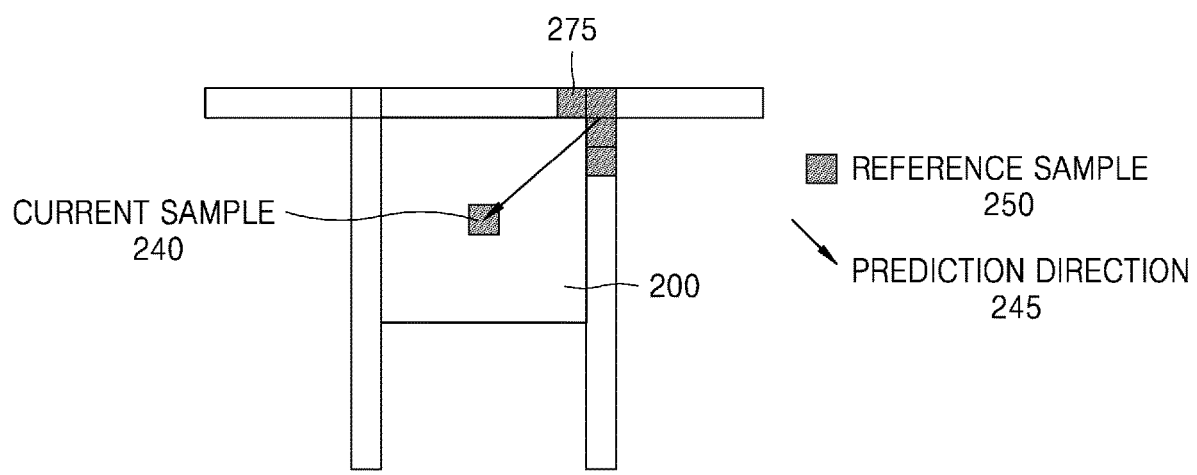

Referring to FIG. 4F, if or when the image decoding apparatus 100 uses a lot of reference samples in a right direction of an upper right corner of the current block 200 if or when performing intra prediction on the current sample 240 according to the prediction direction 245, the image decoding apparatus 100 may use a sample value of a reference sample 275 in a location of (width−1, −1).

Figure 4G:
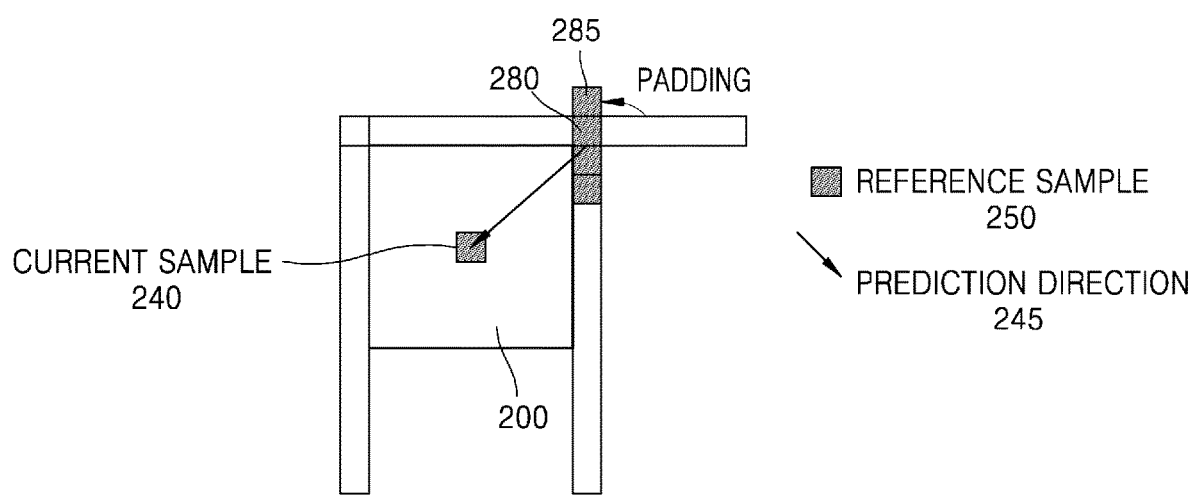

Referring to FIG. 4G, similarly to what is described above with reference to FIG. 4B, the image decoding apparatus 100 may store a pixel value of a reference pixel 285 in a location of (width, −2) by padding a pixel value of a reference pixel 280 in a location of (width, −1) and/or may access a pixel value of a pixel in the location of (width, −1) stored in the reference buffer, via coordinate clipping.

Figure 5A:
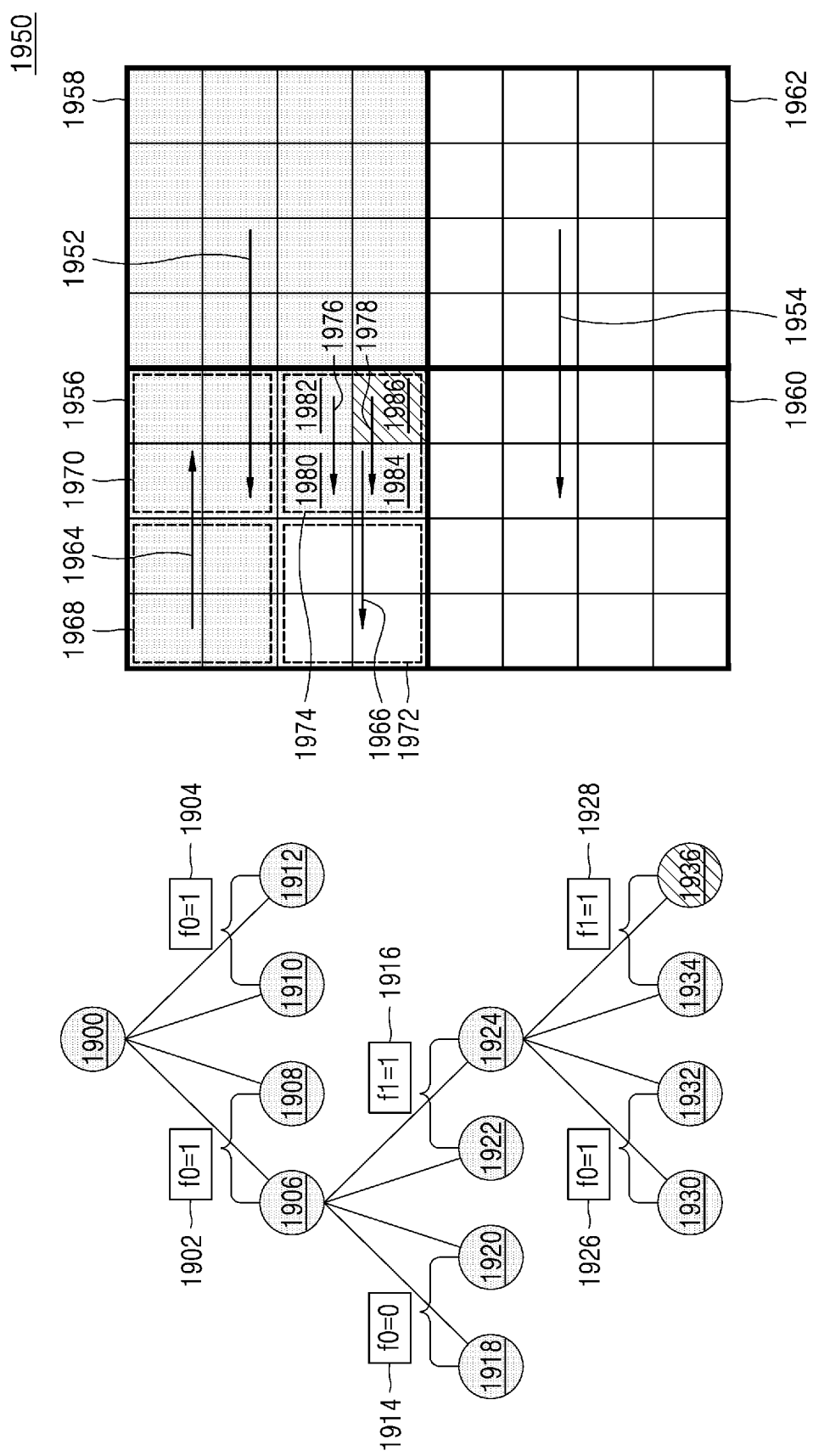
FIG. 5A is a diagram illustrating an example split unit coding order (SUCO) method for determining an encoding (and/or decoding) order between coding units as a forward direction or as a backward direction based on an encoding order flag, and illustrating an example of a right reference line that may be used for intra prediction according to the encoding (and/or decoding decoding) order based on the SUCO method, according to various embodiments of the present disclosure.

FIG. 5A is a diagram illustrating an example SUCO method, according to which an encoding (and/or decoding) order between coding units may be determined as a forward direction and/or a backward direction based on a coding order flag and illustrating a right reference line that may be used for intra prediction according to the encoding (and/or decoding) order based on the example SUCO method.

Referring to FIG. 5A, a largest coding unit 1950 may be split into a plurality of coding units 1956, 1958, 1960, 1962, 1968, 1970, 1972, 1974, 1980, 1982, 1984, and 1986. For example, the largest coding unit 1950 may correspond to an uppermost node 1900 of a tree structure. Alternatively or additionally, the plurality of coding units 1956, 1958, 1960, 1962, 1968, 1970, 1972, 1974, 1980, 1982, 1984, and 1986 may correspond to a plurality of nodes 1906, 1908, 1910, 1912, 1918, 1920, 1922, 1924, 1930, 1932, 1934, and 1936, respectively. In some embodiments, upper coding order flags 1902, 1914, and 1926 and lower coding order flags 1904, 1916, and 1928, indicating a coding order in the tree structure, may respectively correspond to arrows 1952, 1964, and 1976 and arrows 1954, 1966, and 1978.

In some embodiments, the upper coding order flags may indicate the coding order of two upper coding units from among four coding units having the same depth. If or when the upper coding order flag is 0, coding may be performed in a forward direction. Alternatively or additionally, if or when the upper coding order flag is 1, coding may be performed in a backward direction.

In some embodiments, the lower coding order flags may indicate a coding order of two lower coding units from among four coding units having the same depth. In such embodiments, if or when the lower coding order flag is 0, coding may be performed in a forward direction. Alternatively or additionally, if or when the lower coding order flag is 1, coding may be performed in a backward direction.

For example, if or when the upper coding order flag 1914 is 0, the coding order between the coding units 1968 and 1970 may be determined as left to right in the forward direction. Alternatively or additionally, if or when the lower coding order flag 1916 is 1, the coding order between the coding units 1972 and 1974 may be determined as right to left in the backward direction.

According to some embodiments, the upper coding order flag and the lower coding order flag may be configured to have the same value as each other. For example, if or when the upper coding order flag 1902 is determined as 1, the lower coding order flag 1904 corresponding to the upper coding order flag 1902 may also be determined as 1. Consequently, if or when values of the upper coding order flag and the lower coding order flag are determined as one bit, the amount of coding order information may be reduced.

According to some embodiments, the upper coding order flag and the lower coding order flag of a current coding unit may be determined with reference to at least one of the upper coding order flag and the lower coding order flag, applied to a coding unit having a lower depth than the current coding unit. For example, the upper coding order flag 1926 and the lower coding order flag 1928 applied to the coding units 1980, 1982, 1984, and 1986 may be determined based on the lower coding order flag 1916 applied to the coding units 1972 and 1974. As such, the upper coding order flag 1926 and the lower coding order flag 1928 may be determined as the same value as the lower coding order flag 1916. If or when the values of the upper coding order flag and the lower coding order flag are determined from an upper coding unit of the current coding unit, coding order information may not be obtained from a bitstream. As such, the amount of coding order information may be reduced.

In some embodiments, data of samples included in a right neighboring coding unit 1958 decoded previously to a current coding unit 1986 is available, and as such, the image decoding apparatus 100 may perform intra prediction according to some embodiments of the disclosure using the data of the samples (e.g., the right reference line) included in the right neighboring coding unit 1958.

Figure 5B:
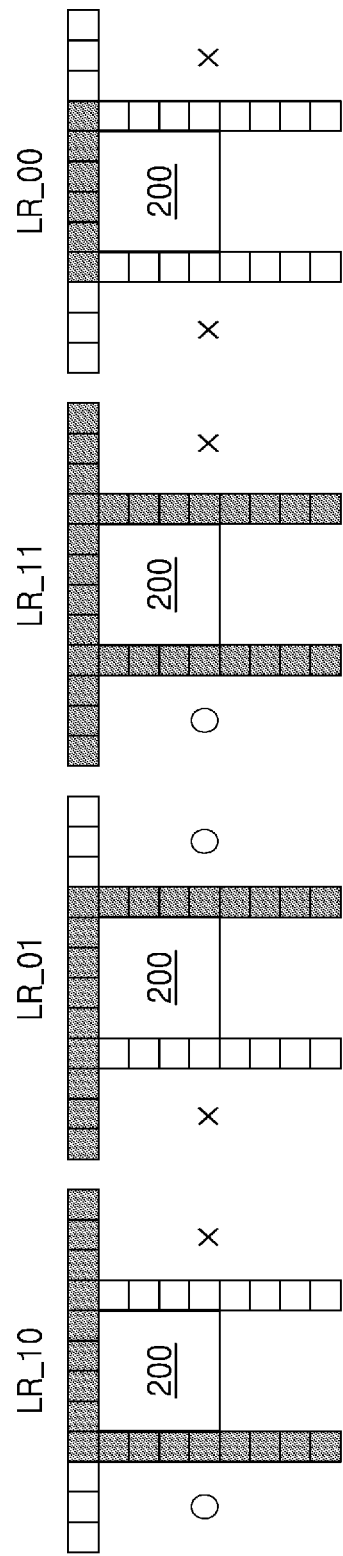
FIG. 5B is a diagram illustrating an example SUCO condition determined based on an availability of a left neighboring region and a right neighboring region, according to a SUCO method and according to various embodiments of the present disclosure.

FIG. 5B is a diagram illustrating an example SUCO condition determined based on an availability of a left neighboring region and a right neighboring region, according to a SUCO method and according to various embodiments of the present disclosure.

Referring to FIG. 5B, as described above with reference to FIG. 5A, according to the encoding/decoding order (e.g., the forward direction or the backward direction) of the coding unit, determined according to the SUCO method, a location of an available reference sample with respect to the current block 200 may be changed. As such, the image decoding apparatus 100 may determine the SUCO condition by identifying the availability by taking into account the decoding order. Referring to FIG. 5B, the SUCO condition may be one of LR_10, LR_01, LR_11, and LR_00. In some embodiments, L/R may denote left/right, and 0/1 may indicate whether there is an available reference sample or not (e.g., a zero (0) may indicate that the reference sample is not available, and a one (1) may indicate that the reference sample is available). In some embodiments, the SUCO condition may be determined by identifying an availability (e.g., whether or not a neighboring block including the corresponding sample is reconstructed) of a sample of a predetermined location (e.g., a directly left sample of an upper left corner sample in a case of a left region and/or a directly right sample of an upper right corner sample) from among neighboring samples of the current block 200, but is not limited thereto.

If or when the image decoding apparatus 100 does not use the SUCO method, SUCO conditions LR_01 and LR_11 may not occur. Alternatively or additionally, if or when the image decoding apparatus 100 uses the SUCO method, SUCO conditions LR_01 and LR_11 may occur, and during intra prediction, there may be a necessity for taking to account a reference sample which may be different from an available reference sample if or when the SUCO method is not used. As such, the image decoding apparatus 100 may appropriately determine the reference sample used for intra prediction by taking into account the SUCO condition, and may efficiently perform intra prediction. This aspect is described above, and thus, is not described in detail.

Hereinafter, splitting of a coding unit will be described in detail according to some embodiments of the present disclosure.

In some embodiments, an image may be split into largest coding units. For example, a size of each largest coding unit may be determined based on information obtained from a bitstream. Alternatively or additionally, a shape of each largest coding unit may be a square shape of the same size. However, the disclosure is not limited thereto. Alternatively or additionally, a largest coding unit may be hierarchically split into coding units based on split shape mode information obtained from the bitstream. In some embodiments, the split shape mode information may include at least one of information indicating whether splitting is to be performed, split direction information, and split type information. In some embodiments, the information indicating whether splitting is to be performed may indicate whether a coding unit is to be split. Alternatively or additionally, the split direction information may indicate whether splitting is to be performed in a horizontal direction or in a vertical direction. In some embodiments, the split type information may indicate whether a coding unit is to be split using one of a binary split, a tri split, and a quad split.

In some embodiments, the split shape mode information may comprise the information indicating whether splitting is to be performed, the split direction information, and the split type information. However, the disclosure is not limited thereto. For example, the image decoding apparatus 100 may obtain, from the bitstream, the split shape mode information as one bin string. The image decoding apparatus 100 may determine whether to split a coding unit, a split direction, and a split type, based on the one bin string.

In some embodiments, the coding unit may be smaller than or the same as the largest coding unit. For example, if or when the split shape mode information indicates that splitting is not to be performed, the coding unit may have the same size as the largest coding unit. If or when the split shape mode information indicates that splitting is to be performed, the largest coding unit may be split into lower-depth coding units. Alternatively or additionally, if or when the split shape mode information about the lower-depth coding units indicates splitting, the lower-depth coding units may be split into smaller coding units. However, the splitting of the image is not limited thereto, and the largest coding unit and the coding unit may not be distinguished. The splitting of the coding unit will be described in more detail with reference to FIGS. 6 through 19.

In some embodiments, the coding unit may be split into prediction units for prediction of the image. Alternatively or additionally, the prediction units may each be equal to or smaller than the coding unit. In other embodiments, the coding unit may be split into transform units for transformation of the image. Alternatively or additionally, the transform units may each be equal to or smaller than the coding unit. In other embodiments, respective shapes and sizes of the transform unit and the prediction unit may not be related to each other. In some embodiments, the coding unit may be distinguished from the prediction unit and the transform unit. Alternatively or additionally, the coding unit, the prediction unit, and the transform unit may be equal to one another. Splitting of the prediction unit and the transform unit may be performed in a similar manner as splitting of the coding unit. The splitting of the coding unit will be described in detail with reference to FIGS. 6 through 19. A current block and a neighboring block of the disclosure may indicate one of the largest coding unit, the coding unit, the prediction unit, and the transform unit. In some embodiments, the current block and/or a current coding unit may refer to a block that is to be decoded or encoded and/or is to be split. In other embodiments, the neighboring block may refer to a block reconstructed before the current block. For example, the neighboring block may be adjacent to the current block spatially and/or temporally. Alternatively or additionally, the neighboring block may be located at one of a lower left side of the current block, a left side of the current block, an upper left side of the current block, an upper side of the current block, an upper right side of the current block, a right side of the current block, and a lower right side of the current block.

Figure 6:
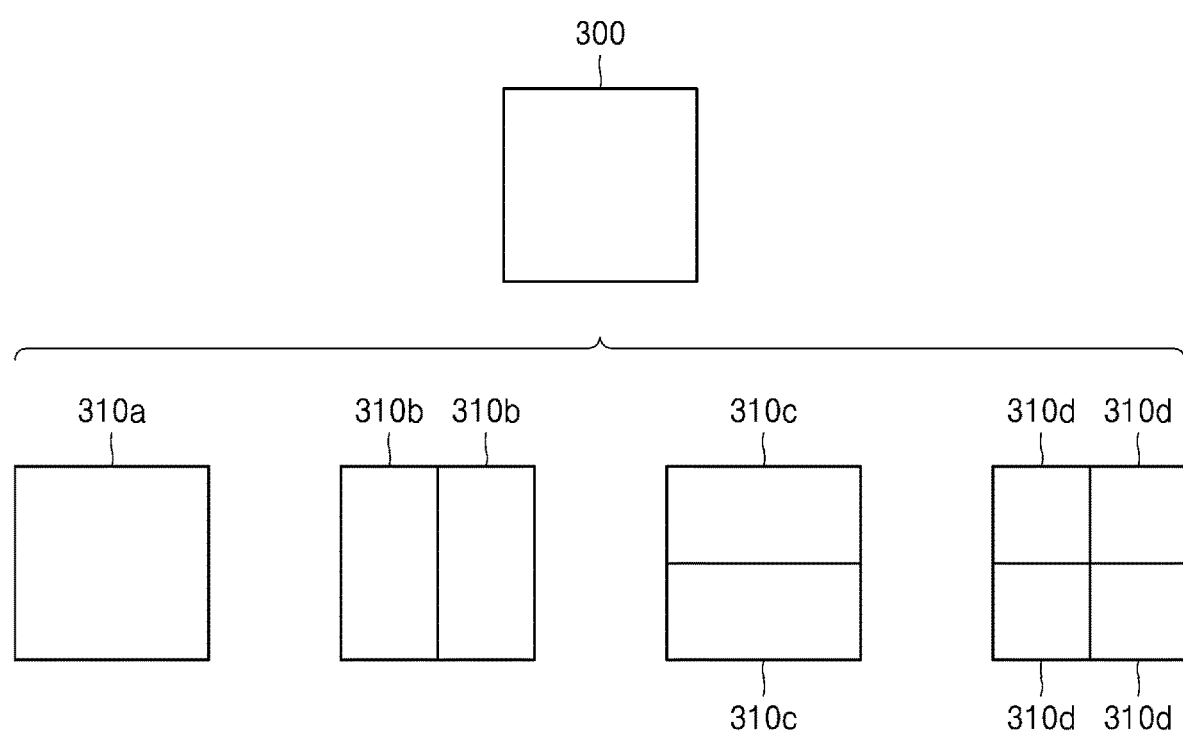
FIG. 6 illustrates an example process, performed by an image decoding apparatus, for determining at least one coding unit by splitting a current coding unit, according to various embodiments of the present disclosure.

FIG. 6 illustrates an example process, performed by the image decoding apparatus 100, for determining at least one coding unit by splitting a current coding unit, according to various embodiments of the present disclosure.

In some embodiments, a block shape may include 4N×4N, 4N×2N, 2N×4N, 4N×N, or N×4N, where N may be a positive integer. Alternatively or additionally, shape information may comprise information indicating at least one of a shape, a direction, a ratio of width and height, and a size of a coding unit.

In some embodiments, the shape of the coding unit may include a square and a non-square. If or when the lengths of the width and height of the coding unit are the same (e.g., if or when the block shape of the coding unit is 4N×4N), the image decoding apparatus 100 may determine the block shape information of the coding unit to be a square. In other embodiments, the image decoding apparatus 100 may determine the shape of the coding unit to be a non-square.

Alternatively or additionally, if or when the lengths of the width and the height of the coding unit are different from each other (e.g., if or when the block shape of the coding unit is 4N×2N, 2N×4N, 4N×N, or N×4N), the image decoding apparatus 100 may determine the block shape information of the coding unit as a non-square shape. If or when the shape of the coding unit is a non-square, the image decoding apparatus 100 may determine the ratio of the width and height in the block shape information of the coding unit to be at least one of 1:2, 2:1, 1:4, 4:1, 1:8, 8:1, and the like. Alternatively or additionally, the image decoding apparatus 100 may determine whether the coding unit is in a horizontal direction or a vertical direction, based on the length of the width and the length of the height of the coding unit. Alternatively or additionally, the image decoding apparatus 100 may determine the size of the coding unit, based on at least one of the length of the width, the length of the height, and/or the area of the coding unit.

According to some embodiments, the image decoding apparatus 100 may determine the shape of the coding unit using the block shape information, and may further determine a splitting method of the coding unit using the split shape mode information. That is, a method of splitting a coding unit, indicated by the split shape mode information, may be determined based on a block shape indicated by the block shape information used by the image decoding apparatus 100.

In some embodiments, the image decoding apparatus 100 may obtain the split shape mode information from a bitstream. However, the disclosure is not limited thereto, and the image decoding apparatus 100 and the image encoding apparatus 150 may obtain pre-agreed (e.g., pre-determined) split shape mode information, based on the block shape information. The image decoding apparatus 100 may obtain the pre-agreed split shape mode information with respect to a largest coding unit and/or a smallest coding unit. For example, the image decoding apparatus 100 may determine split shape mode information with respect to the largest coding unit to be a quad split. Alternatively or additionally, the image decoding apparatus 100 may determine split shape mode information with respect to the smallest coding unit to be "not to perform splitting". For example, the image decoding apparatus 100 may determine the size of the largest coding unit to be 256×256. The image decoding apparatus 100 may determine the pre-agreed split shape mode information to be a quad split. The quad split may be a split shape mode in which the width and the height of the coding unit are both bisected. For example, the image decoding apparatus 100 may obtain a coding unit of a 128×128 size from the largest coding unit of a 256×256 size, based on the split shape mode information. Alternatively or additionally, the image decoding apparatus 100 may determine the size of the smallest coding unit to be 4×4. The image decoding apparatus 100 may obtain split shape mode information indicating "not to perform splitting" with respect to the smallest coding unit.

According to some embodiments, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, and/or whether to split the square coding unit into four coding units, based on the split shape mode information. Referring to FIG. 6, if or when the block shape information of a current coding unit 300 indicates a square shape, the image decoder 110 may not split a coding unit 310a having the same size as the current coding unit 300, based on the split shape mode information indicating not to perform splitting, or may determine coding units 310b, 310c, or 310d split based on the split shape mode information indicating a predetermined splitting method.

Continuing to refer to FIG. 6, according to some embodiments, the image decoding apparatus 100 may determine two coding units 310b obtained by splitting the current coding unit 300 in a vertical direction, based on the split shape mode information indicating to perform splitting in a vertical direction. In other embodiments, the image decoding apparatus 100 may determine two coding units 310c obtained by splitting the current coding unit 300 in a horizontal direction, based on the split shape mode information indicating to perform splitting in a horizontal direction. In other embodiments, the image decoding apparatus 100 may determine four coding units 310d obtained by splitting the current coding unit 300 in vertical and horizontal directions, based on the split shape mode information indicating to perform splitting in vertical and horizontal directions. However, splitting methods of the square coding unit are not limited to the aforementioned methods, and may include various methods that may be indicated by the split shape mode information. Predetermined splitting methods of splitting the square coding unit will be described in detail below in relation to various embodiments.

Figure 7:
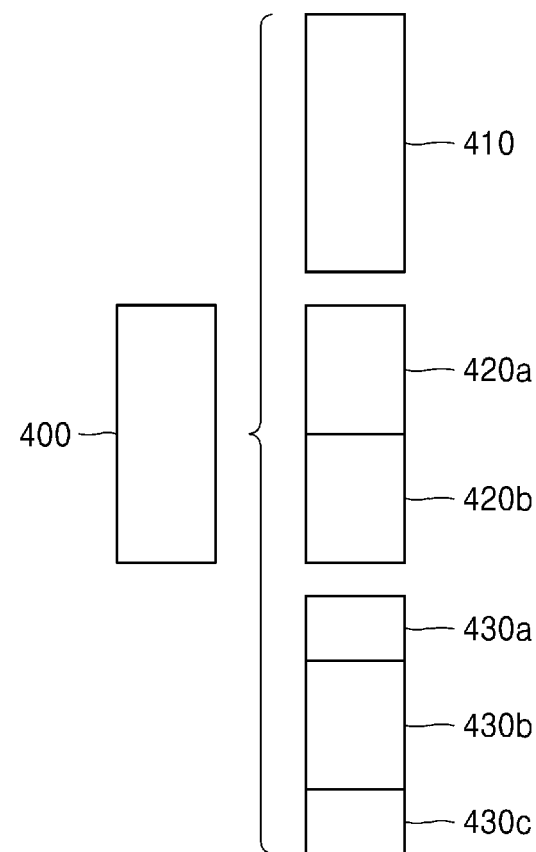
FIG. 7 illustrates an example process, performed by an image decoding apparatus, for determining at least one coding unit by splitting a non-square coding unit, according to various embodiments of the present disclosure.
Figure 7:
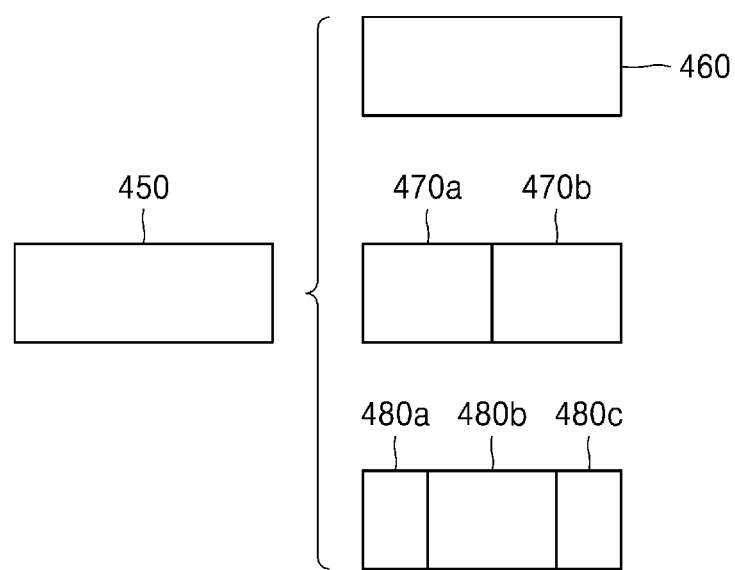

FIG. 7 illustrates an example process, performed by the image decoding apparatus 100, for determining at least one coding unit by splitting a non-square coding unit, according to some embodiments.

According to some embodiments, the image decoding apparatus 100 may use block shape information indicating that a current coding unit has a non-square shape. The image decoding apparatus 100 may determine whether not to split the non-square current coding unit and/or whether to split the non-square current coding unit using a predetermined splitting method, based on split shape mode information. Referring to FIG. 4, if or when the block shape information of a current coding unit 400 and/or 450 indicates a non-square shape, the image decoding apparatus 100 may determine a coding unit 410 and/or 460 having the same size as the current coding unit 400 and/or 450, based on the split shape mode information indicating not to perform splitting, or may determine coding units 420a and 420b, 430a to 430c, 470a and 470b, and/or 480a to 480c split based on the split shape mode information indicating a predetermined splitting method. Predetermined splitting methods of splitting a non-square coding unit will be described in detail below in relation to various embodiments.

According to some embodiments, the image decoding apparatus 100 may determine a splitting method of a coding unit using the split shape mode information. For example, the split shape mode information may indicate the number of one or more coding units generated by splitting a coding unit. Referring to FIG. 7, if or when the split shape mode information indicates to split the current coding unit 400 and/or 450 into two coding units, the image decoding apparatus 100 may determine two coding units 420a and 420b, and/or 470a and 470b included in the current coding unit 400 and/or 450, by splitting the current coding unit 400 and/or 450 based on the split shape mode information.

According to some embodiments, if or when the image decoding apparatus 100 splits the non-square current coding unit 400 and/or 450 based on the split shape mode information, the image decoding apparatus 100 may split the current coding unit, in consideration of the location of a long side of the non-square current coding unit 400 and/or 450. For example, the image decoding apparatus 100 may determine a plurality of coding units by splitting the current coding unit 400 and/or 450 in a direction of splitting the long side of the current coding unit 400 and/or 450 in consideration of the shape of the current coding unit 400 and/or 450.

According to some embodiments, if or when the split shape mode information indicates to split (e.g., tri-split) a coding unit into an odd number of blocks, the image decoding apparatus 100 may determine an odd number of coding units included in the current coding unit 400 and/or 450. For example, if or when the split shape mode information indicates to split the current coding unit 400 and/or 450 into three coding units, the image decoding apparatus 100 may split the current coding unit 400 and/or 450 into three coding units 430a, 430b, and 430c, and/or 480a, 480b, and 480c.

According to some embodiments, a ratio of the width and height of the current coding unit 400 and/or 450 may be 4:1 or 1:4, for example. If or when the ratio of the width and height is 4:1, the block shape information may indicate a horizontal direction if or when the length of the width is greater than the length of the height. If or when the ratio of the width and height is 1:4, the block shape information may indicate a vertical direction based on the length of the width being less than the length of the height. In some embodiments, the image decoding apparatus 100 may determine to split a current coding unit into an odd number of blocks, based on the split shape mode information. Alternatively or additionally, the image decoding apparatus 100 may determine a split direction of the current coding unit 400 and/or 450, based on the block shape information of the current coding unit 400 and/or 450. For example, if or when the current coding unit 400 is in the vertical direction, the image decoding apparatus 100 may determine the coding units 430a to 430c by splitting the current coding unit 400 in the horizontal direction. Alternatively or additionally, if or when the current coding unit 450 is in the horizontal direction, the image decoding apparatus 100 may determine the coding units 480a to 480c by splitting the current coding unit 450 in the vertical direction.

According to some embodiments, the image decoding apparatus 100 may determine the odd number of coding units included in the current coding unit 400 and/or 450, and not all of the determined coding units may have the same size. For example, a predetermined coding unit 430b and/or 480b from among the determined odd number of coding units 430a, 430b, and 430c, and/or 480a, 480b, and 480c may have a size different from a size of the other coding units 430a and 430c, and/or 480a and 480c. That is, coding units which may be determined by splitting the current coding unit 400 and/or 450 may have multiple sizes and, in some cases, all of the odd number of coding units 430a, 430b, and 430c, and/or 480a, 480b, and 480c may have different sizes.

According to some embodiments, if or when the split shape mode information indicates to split a coding unit into the odd number of blocks, the image decoding apparatus 100 may determine the odd number of coding units included in the current coding unit 400 and/or 450. Alternatively or additionally, the image decoding apparatus 100 may place a predetermined restriction on at least one coding unit from among the odd number of coding units generated by splitting the current coding unit 400 and/or 450. Continuing to refer to FIG. 7, the image decoding apparatus 100 may set a decoding process with respect to the coding unit 430b and/or 480b located at the center from among the three coding units 430a, 430b, and 430c and/or 480a, 480b, and 480c generated by splitting the current coding unit 400 and/or 450 to be different from a decoding process with respect to the other coding units 430a and 430c, and/or 480a and 480c. For example, the image decoding apparatus 100 may restrict the coding unit 430b or 480b at the center location not to be further split and/or to be split a predetermined number of times, unlike the other coding units 430a and 430c, and/or 480a and 480c.

Figure 8:
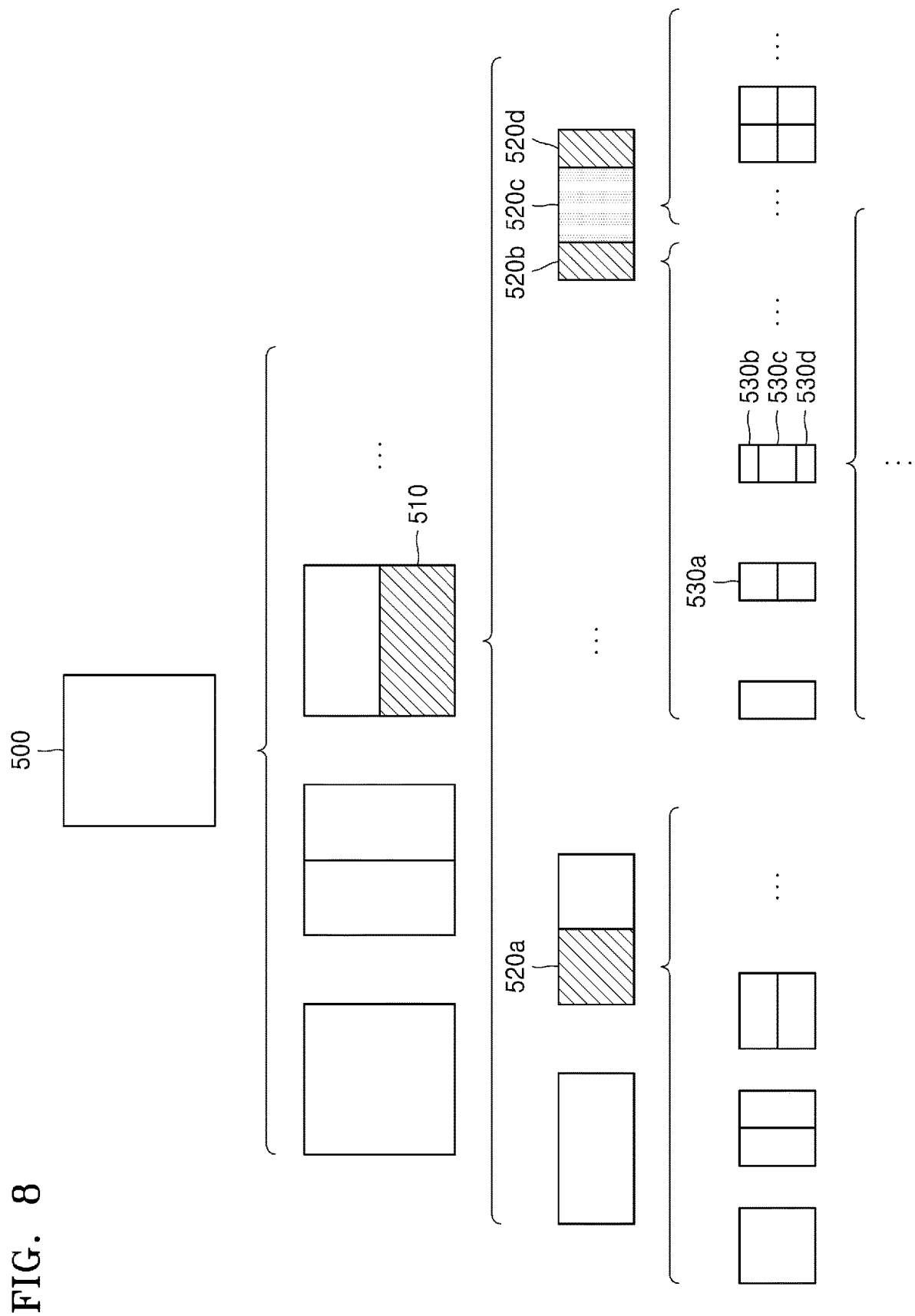
FIG. 8 illustrates an example process, performed by an image decoding apparatus, for splitting a coding unit based on at least one of block shape information and split shape mode information, according to various embodiments of the present disclosure.

FIG. 8 illustrates an example process, performed by the image decoding apparatus 100, for splitting a coding unit based on at least one of block shape information and split shape mode information, according to various embodiments of the present disclosure.

According to some embodiments, the image decoding apparatus 100 may determine to split a square first coding unit 500 into coding units or not to split the square first coding unit 500, based on at least one of the block shape information and the split shape mode information. According to some embodiments, if or when the split shape mode information indicates to split the first coding unit 500 in a horizontal direction, the image decoding apparatus 100 may determine a second coding unit 510 by splitting the first coding unit 500 in the horizontal direction. A first coding unit, a second coding unit, and a third coding unit used according to some embodiments, may be terms used to facilitate understanding of the relationship before and after the coding units are split. For example, the second coding unit may be determined by splitting the first coding unit, and the third coding unit may be determined by splitting the second coding unit. That is, the relationship of the first coding unit, the second coding unit, and the third coding unit may be in compliance with the above descriptions.

According to some embodiments, the image decoding apparatus 100 may determine to split the determined second coding unit 510 into coding units or not to split the determined second coding unit 510, based on at least one of the block shape information and the split shape mode information. Continuing to refer to FIG. 7, the image decoding apparatus 100 may split the non-square second coding unit 510, determined by splitting the first coding unit 500, into one or more third coding units 520a, 520b, 520c, or 520d. Alternatively or additionally, the image decoding apparatus 100 may not split the second coding unit 510, based on at least one of the block shape information and the split shape mode information. In some embodiments, the image decoding apparatus 100 may obtain at least one of the block shape information and the split shape mode information, and the image decoding apparatus 100 may split the first coding unit 500 into a plurality of various-shaped second coding units (e.g., 510) based on the obtained at least one of the block shape information and the split shape mode information. For example, the second coding units 510 may be obtained according to a method of splitting the first coding unit 500 based on the at least one of the block shape information and the split shape mode information. According to some embodiments, if or when the first coding unit 500 is split into the second coding unit 510 based on at least one of block shape information and split shape mode information with respect to the first coding unit 500, the second coding unit 510 may be split into a third coding unit (e.g., 520a, 520b, 520c, and 520d) based on at least one of block shape information and split shape mode information with respect to the second coding unit 510. That is, a coding unit may be recursively split based on at least one of block shape information and split shape mode information with respect to respective coding units. Consequently, a square coding unit may be determined by splitting a non-square coding unit, and a non-square coding unit may be determined by recursively splitting the square coding unit.

Continuing to refer to FIG. 8, a predetermined coding unit from among the odd number of third coding units (e.g., 520b, 520c, and 520d) determined by splitting the non-square second coding unit 510 (e.g., a coding unit at a center location or a square coding unit) may be recursively split. According to some embodiments, the non-square third coding unit 520b from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be split again into a plurality of coding units. For example, the non-square fourth coding unit 530b or 530d may be split into an odd number of coding units again. A method that may be used to recursively split a coding unit will be described below in reference to various embodiments.

According to some embodiments, the image decoding apparatus 100 may split each of the third coding units 520a, or 520b, 520c, and 520d into coding units, based on at least one of block shape information and split shape mode information. Alternatively or additionally, the image decoding apparatus 100 may determine not to split the second coding unit 510 based on at least one of the block shape information and the split shape mode information. According to some embodiments, the image decoding apparatus 100 may split the non-square second coding unit 510 into the odd number of third coding units 520b, 520c, and 520d. The image decoding apparatus 100 may place a predetermined restriction on a predetermined third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a configurable number of times.

Continuing to refer to FIG. 8, the image decoding apparatus 100 may restrict the third coding unit 520c, which may be at the center location from among the odd number of third coding units 520b, 520c, and 520d included in the non-square second coding unit 510, to be no longer split, to be split using a predetermined splitting method (e.g., split into four coding units or split using a splitting method of the second coding unit 510), or to be split a predetermined number of times (e.g., split n times, where n is a natural number greater than zero). However, the restrictions on the third coding unit 520c at the center location are merely according to embodiments, and, as such, may not be interpreted to be limited to the above-described embodiments, and may be interpreted to include various restrictions for decoding the third coding unit 520c at the center location differently from the other third coding units 520b and 520d.

According to some embodiments, the image decoding apparatus 100 may obtain at least one of the block shape information and the split shape mode information, which may be used to split a current coding unit, from a predetermined location in the current coding unit.

Figure 9:
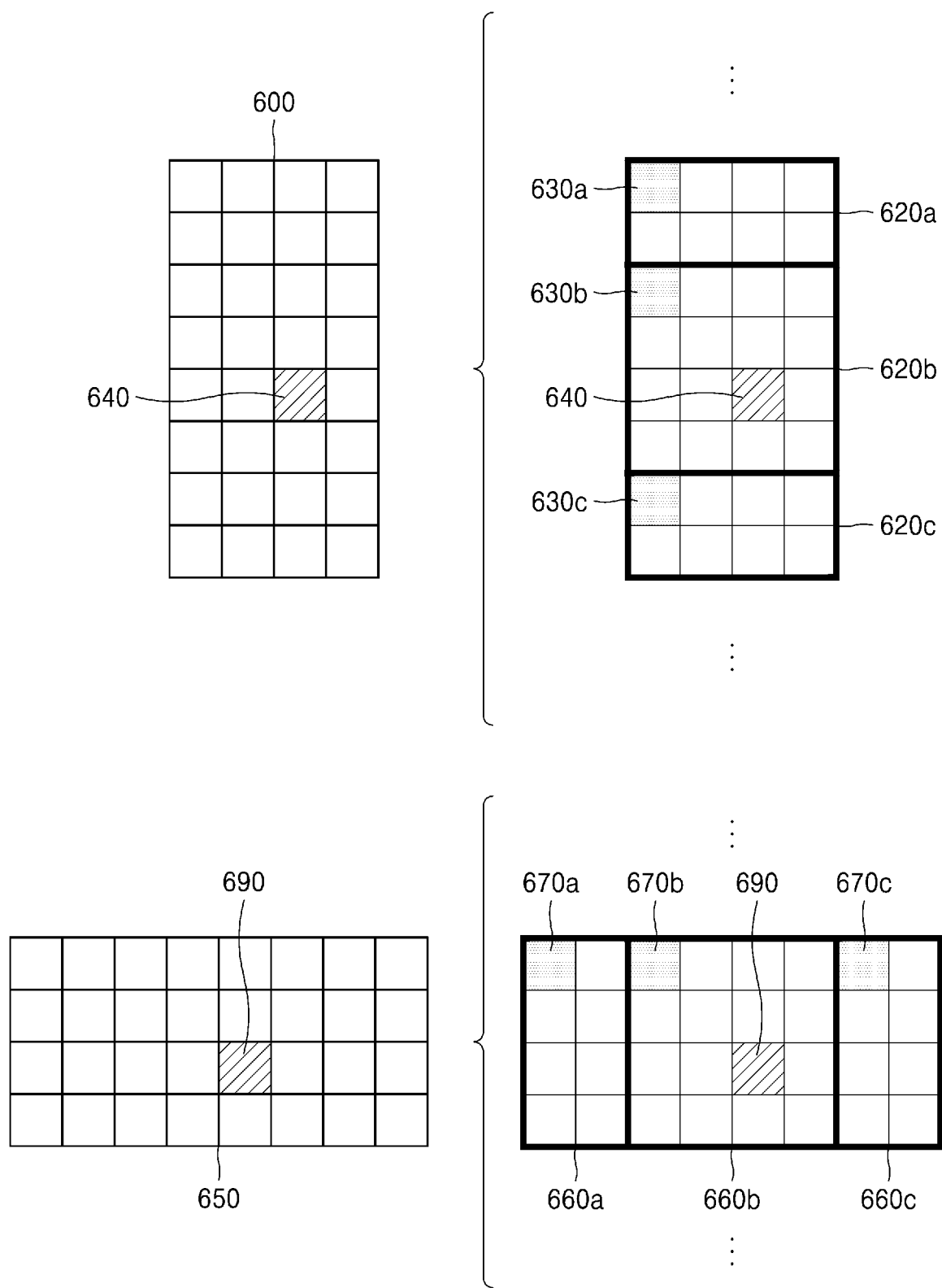
FIG. 9 illustrates an example method, performed by an image decoding apparatus, for determining a predetermined coding unit from among an odd number of coding units, according to various embodiments of the present disclosure.

FIG. 9 illustrates an example method, performed by the image decoding apparatus 100, for determining a predetermined coding unit from among an odd number of coding units, according to various embodiments of the disclosure.

Referring to FIG. 9, at least one of block shape information and split shape mode information about a current coding unit 600 and/or 650 may be obtained from a sample of a predetermined location (e.g., a sample 640 and/or 690 of a center location) from among a plurality of samples included in the current coding unit 600 and/or 650. Alternatively or additionally, the predetermined location in the current coding unit 600, from which at least one of the block shape information and the split shape mode information may be obtained, may not be interpreted to be limited to the center location in FIG. 9, and may be interpreted to include various locations included in the current coding unit 600 (e.g., top, bottom, left, right, upper left, lower left, upper right, and lower right locations). The image decoding apparatus 100 may obtain at least one of the block shape information and the split shape mode information from the predetermined location. Alternatively or additionally, the image decoding apparatus 100 may determine to split or not to split the current coding unit into various-shaped and/or various-sized coding units.

According to some embodiments, if or when the current coding unit is split into a predetermined number of coding units, the image decoding apparatus 100 may select one of the coding units. Various methods may be used to select one of a plurality of coding units, as will be described below in relation to various embodiments.

According to some embodiments, the image decoding apparatus 100 may split the current coding unit into a plurality of coding units, and may determine a coding unit at a predetermined location.

According to some embodiments, the image decoding apparatus 100 may use information indicating locations of the odd number of coding units, to determine a coding unit at a center location from among the odd number of coding units. Referring to FIG. 9, the image decoding apparatus 100 may determine the odd number of coding units 620a, 620b, and 620c and/or the odd number of coding units 660a, 660b, and 660c by splitting the current coding unit 600 and/or the current coding unit 650. The image decoding apparatus 100 may determine the middle coding unit 620b and/or the middle coding unit 660b using information about the locations of the odd number of coding units 620a, 620b, and 620c and/or the odd number of coding units 660a, 660b, and 660c. For example, the image decoding apparatus 100 may determine the coding unit 620b of the center location by determining the locations of the coding units 620a, 620b, and 620c based on information indicating locations of predetermined samples included in the coding units 620a, 620b, and 620c. That is, the image decoding apparatus 100 may determine the coding unit 620b at the center location by determining the locations of the coding units 620a, 620b, and 620c based on information indicating locations of upper left samples 630a, 630b, and 630c of the coding units 620a, 620b, and 620c.

According to some embodiments, the information indicating the locations of the upper left samples 630a, 630b, and 630c, which may be included in the coding units 620a, 620b, and 620c, respectively, may include information about locations or coordinates of the coding units 620a, 620b, and 620c in a picture. According to some embodiments, the information indicating the locations of the upper left samples 630a, 630b, and 630c, which may be included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location using the information about the locations or coordinates of the coding units 620a, 620b, and 620c in the picture, and/or using the information about the widths or heights of the coding units, which correspond to the difference values between the coordinates.

According to some embodiments, information indicating the location of the upper left sample 630a of the upper coding unit 620a may include coordinates (e.g., xa, ya). In other embodiments, information indicating the location of the upper left sample 630b of the middle coding unit 620b may include coordinates (e.g., xb, yb). In other optional or additional embodiments, information indicating the location of the upper left sample 630c of the lower coding unit 620c may include coordinates (e.g., xc, yc). The image decoding apparatus 100 may determine the middle coding unit 620b using the coordinates of the upper left samples 630a, 630b, and 630c which may be included in the coding units 620a, 620b, and 620c, respectively. For example, if or when the coordinates of the upper left samples 630a, 630b, and 630c are sorted in an ascending and/or descending order, the coding unit 620b, including the coordinates (e.g., xb, yb) of the sample 630b, at a center location may be determined as a coding unit at a center location from among the coding units 620a, 620b, and 620c determined by splitting the current coding unit 600. Alternatively or additionally, the coordinates indicating the locations of the upper left samples 630a, 630b, and 630c may include coordinates indicating absolute locations in the picture, and/or may use coordinates (e.g., dxb, dyb) indicating a relative location of the upper left sample 630b of the middle coding unit 620b and coordinates (e.g., dxc, dyc) indicating a relative location of the upper left sample 630c of the lower coding unit 620c with reference to the location of the upper left sample 630a of the upper coding unit 620a. An example method of determining a coding unit at a predetermined location using coordinates of a sample included in the coding unit, as information indicating a location of the sample, may not be interpreted to be limited to the above-described method, and may be interpreted to include various arithmetic methods capable of using the coordinates of the sample.

According to some embodiments, the image decoding apparatus 100 may split the current coding unit 600 into a plurality of coding units 620a, 620b, and 620c, and may select one of the coding units 620a, 620b, and 620c based on a predetermined criterion. For example, the image decoding apparatus 100 may select the coding unit 620b, which may have a size different from that of the others, from among the coding units 620a, 620b, and 620c.

According to some embodiments, the image decoding apparatus 100 may determine the width or height of each of the coding units 620a, 620b, and 620c using the coordinates (xa, ya) indicating the location of the upper left sample 630a of the upper coding unit 620a, the coordinates (xb, yb) indicating the location of the upper left sample 630b of the middle coding unit 620b, and the coordinates (xc, yc) indicating the location of the upper left sample 630c of the lower coding unit 620c. Alternatively or additionally, the image decoding apparatus 100 may determine the respective sizes of the coding units 620a, 620b, and 620c using the coordinates (xa, ya), (xb, yb), and (xc, yc) indicating the locations of the coding units 620a, 620b, and 620c. According to some embodiments, the image decoding apparatus 100 may determine the width of the upper coding unit 620a to be the width of the current coding unit 600. Alternatively or additionally, the image decoding apparatus 100 may determine the height of the upper coding unit 620a to be yb−ya. According to some embodiments, the image decoding apparatus 100 may determine the width of the middle coding unit 620b to be the width of the current coding unit 600. Alternatively or additionally, the image decoding apparatus 100 may determine the height of the middle coding unit 620b to be yc-yb. According to some embodiments, the image decoding apparatus 100 may determine the width and/or height of the lower coding unit 620c using the width and/or height of the current coding unit 600 and/or the widths and/or heights of the upper and/or the middle coding units 620a and/or 620b, respectively. Alternatively or additionally, the image decoding apparatus 100 may determine a coding unit, which may have a size different from that of the others, based on the determined widths and heights of the coding units 620a to 620c. Referring to FIG. 9, the image decoding apparatus 100 may determine the middle coding unit 620b, which may have a size different from the size of the upper and lower coding units 620a and/or 620c, as the coding unit of the predetermined location. In some embodiments, the above-described method, performed by the image decoding apparatus 100, for determining a coding unit having a size different from the size of the other coding units may correspond to an example for determining a coding unit at a predetermined location using the sizes of coding units, which may be determined based on coordinates of samples. That is, various methods for determining a coding unit at a predetermined location by comparing the sizes of coding units, which may be determined based on coordinates of predetermined samples, may be used.

In some embodiments, the image decoding apparatus 100 may determine the width or height of each of the coding units 660a, 660b, and 660c using the coordinates (xd, yd) indicating the location of an upper left sample 670a of the left coding unit 660a, the coordinates (xe, ye) indicating the location of an upper left sample 670b of the middle coding unit 660b, and the coordinates (xf, yf) indicating a location of the upper left sample 670c of the right coding unit 660c. Alternatively or additionally, the image decoding apparatus 100 may determine the respective sizes of the coding units 660a, 660b, and 660c using the coordinates (xd, yd), (xe, ye), and (xf, yf) indicating the locations of the coding units 660a, 660b, and 660c.

According to some embodiments, the image decoding apparatus 100 may determine the width of the left coding unit 660a to be xe−xd. Alternatively or additionally, the image decoding apparatus 100 may determine the height of the left coding unit 660a to be the height of the current coding unit 650. According to some embodiments, the image decoding apparatus 100 may determine the width of the middle coding unit 660b to be xf−xe. Alternatively or additionally, the image decoding apparatus 100 may determine the height of the middle coding unit 660b to be the height of the current coding unit 650. According to some embodiments, the image decoding apparatus 100 may determine the width or height of the right coding unit 660c using the width or height of the current coding unit 650 or the widths or heights of the left and middle coding units 660a and 660b. Alternatively or additionally, the image decoding apparatus 100 may determine a coding unit, which may have a size different from that of the others, based on the determined widths and heights of the coding units 660a to 660c. Referring to FIG. 9, the image decoding apparatus 100 may determine the middle coding unit 660b, which may have a size different from the sizes of the left and right coding units 660a and 660c, as the coding unit of the predetermined location. In some embodiments, the above-described method, performed by the image decoding apparatus 100, for determining a coding unit having a size different from the size of the other coding units may correspond to an example for determining a coding unit at a predetermined location using the sizes of coding units, which may be determined based on coordinates of samples. That is, various methods of determining a coding unit at a predetermined location by comparing the sizes of coding units, which may be determined based on coordinates of predetermined samples, may be used.

However, locations of samples considered to determine locations of coding units are not limited to the above-described upper left locations, and information about predetermined locations of samples included in the coding units may be used.

According to some embodiments, the image decoding apparatus 100 may select a coding unit at a predetermined location from among an odd number of coding units determined by splitting the current coding unit, based on the shape of the current coding unit. For example, if or when the current coding unit has a non-square shape (e.g., a width that greater than a height), the image decoding apparatus 100 may determine the coding unit at the predetermined location in a horizontal direction. That is, the image decoding apparatus 100 may determine one of coding units at different locations in a horizontal direction and place a restriction on the coding unit. If or when the current coding unit has a non-square shape (e.g., a height that is greater than a width), the image decoding apparatus 100 may determine the coding unit at the predetermined location in a vertical direction. That is, the image decoding apparatus 100 may determine one of coding units at different locations in a vertical direction and may place a restriction on the coding unit.

According to some embodiments, the image decoding apparatus 100 may use information indicating respective locations of an even number of coding units, to determine the coding unit at the predetermined location from among the even number of coding units. For example, the image decoding apparatus 100 may determine an even number of coding units by splitting (e.g., bi split or binary split) the current coding unit, and may determine the coding unit at the predetermined location using the information about the locations of the even number of coding units. An operation related thereto may correspond to the operation of determining a coding unit at a predetermined location (e.g., a center location) from among an odd number of coding units, which has been described in reference to FIG. 6, and thus detailed descriptions thereof are not provided herein.

According to some embodiments, if or when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and split shape mode information, which may be stored in a sample included in a middle coding unit, in a splitting process to determine a coding unit at a center location from among the plurality of coding units determined by splitting the current coding unit.

Referring to FIG. 9, the image decoding apparatus 100 may split the current coding unit 600 into the plurality of coding units 620a, 620b, and 620c based on at least one of the block shape information and the split shape mode information, and may determine the coding unit 620b at a center location from among the plurality of the coding units 620a, 620b, and 620c. Alternatively or additionally, the image decoding apparatus 100 may determine the coding unit 620b at the center location, in consideration of a location from which at least one of the block shape information and the split shape mode information is obtained. That is, at least one of block shape information and split shape mode information about the current coding unit 600 may be obtained from the sample 640 at a center location of the current coding unit 600 and, if or when the current coding unit 600 is split into the plurality of coding units 620a, 620b, and 620c based on at least one of the block shape information and the split shape mode information, the coding unit 620b including the sample 640 may be determined as the coding unit at the center location. However, information used to determine the coding unit at the center location is not limited to at least one of block shape information and split shape mode information, and various types of information may be used to determine the coding unit at the center location.

According to some embodiments, predetermined information for identifying the coding unit at the predetermined location may be obtained from a predetermined sample included in a coding unit to be determined. Continuing to refer to FIG. 9, the image decoding apparatus 100 may use at least one of the block shape information and the split shape mode information, which may be obtained from a sample at a predetermined location in the current coding unit 600 (e.g., a sample at a center location of the current coding unit 600), to determine a coding unit at a predetermined location from among the plurality of the coding units 620a, 620b, and 620c determined by splitting the current coding unit 600 (e.g., a coding unit at a center location from among a plurality of split coding units). That is, the image decoding apparatus 100 may determine the sample at the predetermined location based on a block shape of the current coding unit 600, may determine the coding unit 620b including a sample, from which predetermined information (e.g., at least one of the block shape information and the split shape mode information) is obtainable, from among the plurality of coding units 620a, 620b, and 620c determined by splitting the current coding unit 600, and may place a predetermined restriction on the coding unit 620b. Continuing to refer to FIG. 9, according to some embodiments, the image decoding apparatus 100 may determine the sample 640 at the center location of the current coding unit 600 as the sample from which the predetermined information may be obtained, and may place a predetermined restriction on the coding unit 620b including the sample 640, in a decoding operation. However, the location of the sample from which the predetermined information may be obtained is not limited to the above-described location, and may include arbitrary locations of samples included in the coding unit 620b to be determined for a restriction.

According to some embodiments, the location of the sample from which the predetermined information may be obtained may be determined based on the shape of the current coding unit 600. According to some embodiments, the block shape information may indicate whether the current coding unit has a square or non-square shape, and the location of the sample from which the predetermined information may be obtained may be determined based on the shape. For example, the image decoding apparatus 100 may determine a sample located on a boundary for splitting at least one of a width and height of the current coding unit in half, as the sample from which the predetermined information may be obtained, using at least one of information about the width of the current coding unit and information about the height of the current coding unit. For another example, if or when the block shape information of the current coding unit indicates a non-square shape, the image decoding apparatus 100 may determine one of samples adjacent to a boundary for splitting a long side of the current coding unit in half, as the sample from which the predetermined information is obtainable.

According to some embodiments, if or when the current coding unit is split into a plurality of coding units, the image decoding apparatus 100 may use at least one of the block shape information and the split shape mode information so as to determine a coding unit at a predetermined location from among the plurality of coding units. According to some embodiments, the image decoding apparatus 100 may obtain at least one of the block shape information and the split shape mode information from a sample at a predetermined location in a coding unit, and may split the plurality of coding units, which may be generated by splitting the current coding unit, using at least one of the block shape information and the split shape mode information, which may be obtained from the sample of the predetermined location in each of the plurality of coding units. That is, a coding unit may be recursively split based on at least one of the block shape information and the split shape mode information, which may be obtained from the sample at the predetermined location in each coding unit. An operation of recursively splitting a coding unit has been described in reference to FIG. 9, and thus further descriptions thereof will not be provided herein.

According to some embodiments, the image decoding apparatus 100 may determine one or more coding units by splitting the current coding unit, and may determine an order of decoding the one or more coding units, based on a predetermined block (e.g., the current coding unit).

Figure 10:
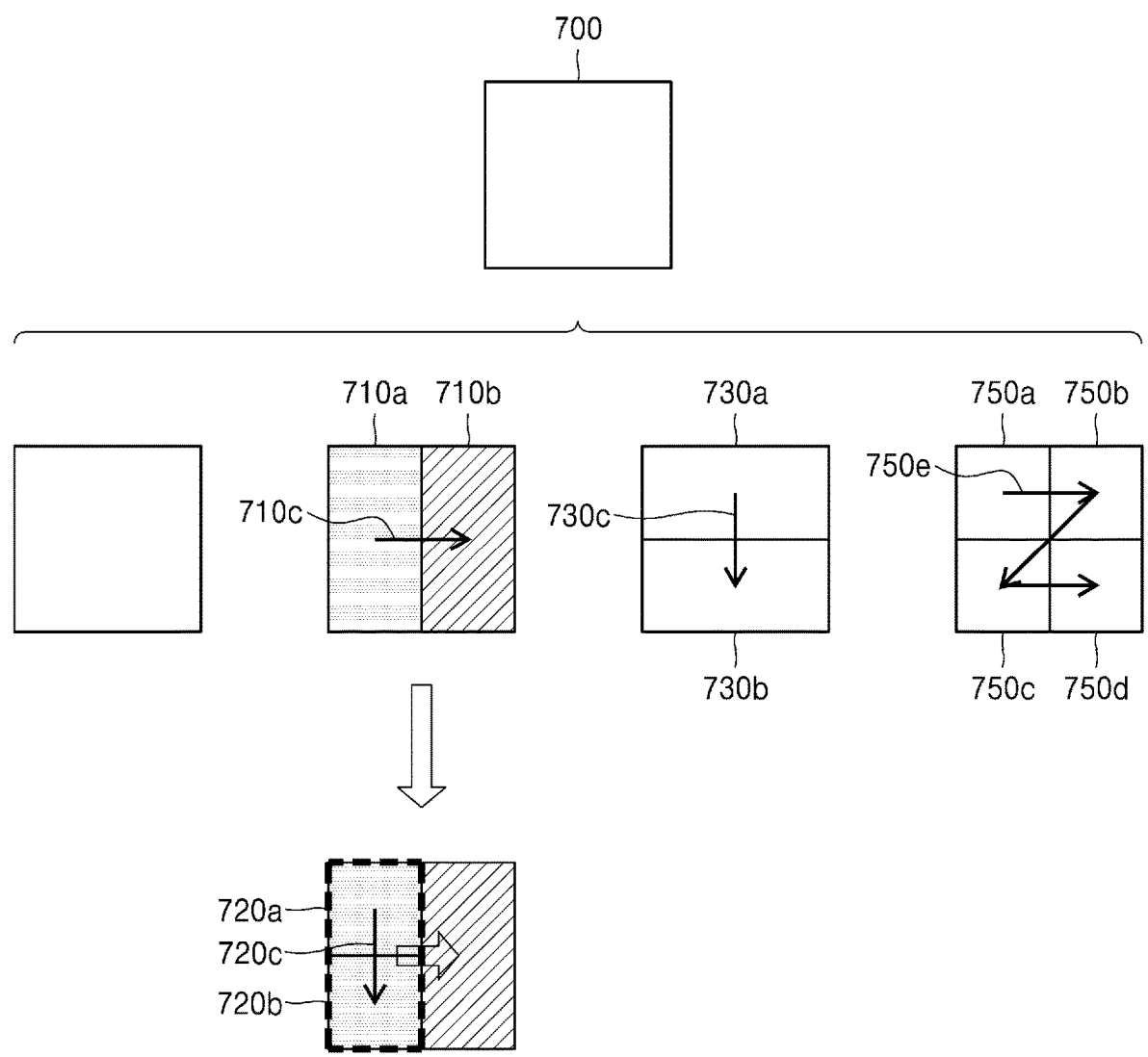
FIG. 10 illustrates an example order of processing a plurality of coding units when an image decoding apparatus determines the plurality of coding units by splitting a current coding unit, according to various embodiments of the present disclosure.

FIG. 10 illustrates an example order of processing a plurality of coding units if or when the image decoding apparatus 100 determines the plurality of coding units by splitting a current coding unit, according to various embodiments of the present disclosure.

According to some embodiments, the image decoding apparatus 100 may determine second coding units 710a and 710b by splitting a first coding unit 700 in a vertical direction, may determine second coding units 730a and 730b by splitting the first coding unit 700 in a horizontal direction, and/or may determine second coding units 750a, 750b, 750c, and 750d by splitting the first coding unit 700 in vertical and horizontal directions, based on at least one of block shape information and split shape mode information.

Referring to FIG. 10, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, in a predetermined order for processing coding units in a row and then processing coding units in a next row (e.g., in a raster scan order or Z-scan order 750e).

According to some embodiments, the image decoding apparatus 100 may recursively split coding units. Continuing to refer to FIG. 10, the image decoding apparatus 100 may determine the plurality of coding units (e.g., 710a and 710b, 730a and 730b, and/or 750a to 750d) by splitting the first coding unit 700, and recursively split each of the determined plurality of coding units 710a and 710b, 730a and 730b, or 750a to 750d. A splitting method of the plurality of coding units 710a and 710b, 730a and 730b, or 750a to 750d may correspond to a splitting method of the first coding unit 700. As such, each of the plurality of coding units 710a and 710b, 730a and 730b, or 750a to 750d may be independently split into a plurality of coding units. Continuing to refer to FIG. 10, the image decoding apparatus 100 may determine the second coding units 710a and 710b by splitting the first coding unit 700 in a vertical direction, and may determine to independently split or not to split each of the second coding units 710a and 710b.

According to some embodiments, the image decoding apparatus 100 may determine third coding units 720a and 720b by splitting the left second coding unit 710a in a horizontal direction, and may not split the right second coding unit 710b.

According to some embodiments, a processing order of coding units may be determined based on an operation of splitting a coding unit. That is, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. If or when the third coding units 720a and 720b are determined by splitting the left second coding unit 710a in a horizontal direction, the third coding units 720a and 720b may be processed in a vertical direction order 720c. If or when the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a predetermined order.

Figure 11:
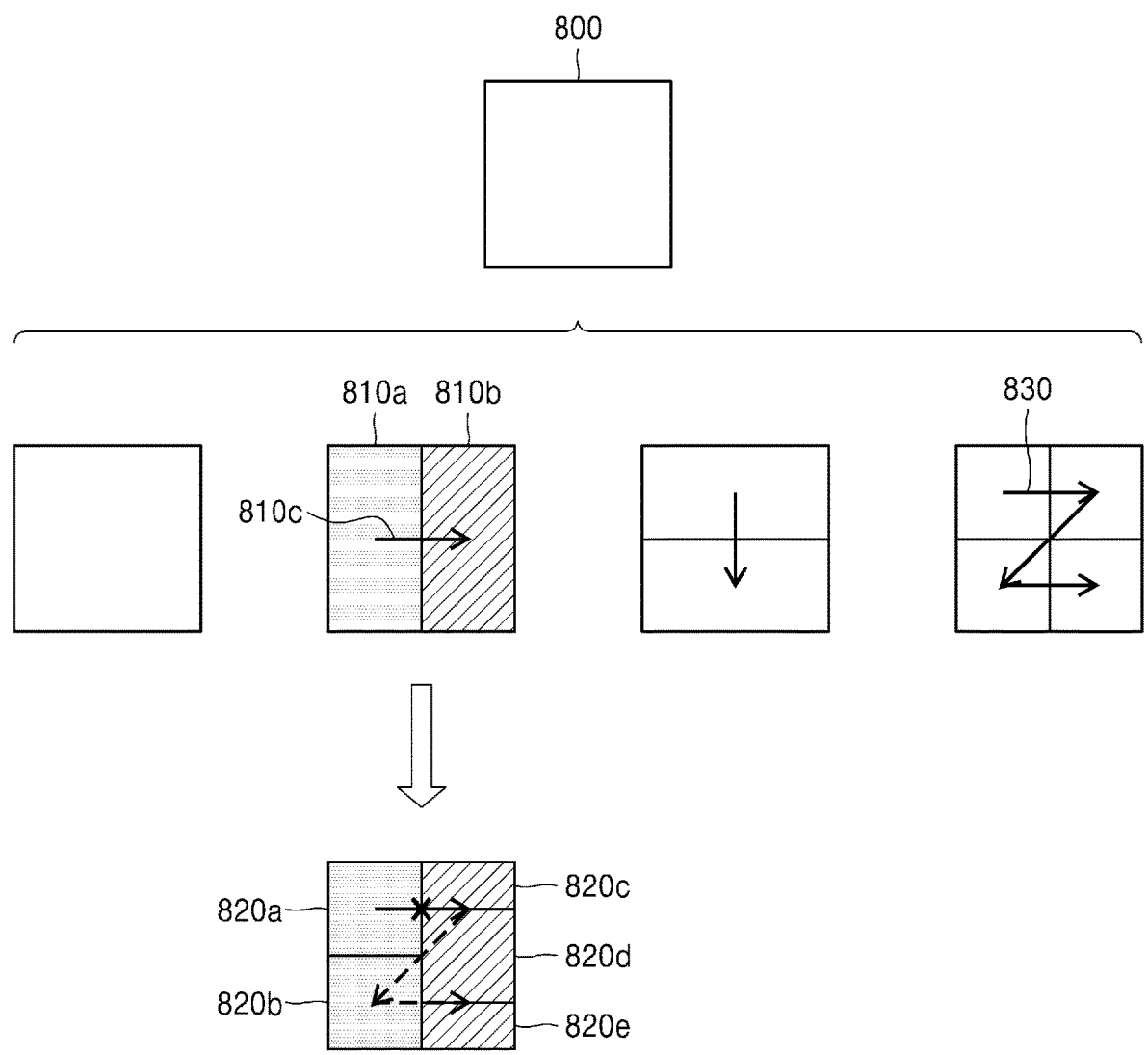
FIG. 11 illustrates an example process, performed by an image decoding apparatus, for determining that a current coding unit is to be split into an odd number of coding units, when the coding units are not processable in a predetermined order, according to various embodiments of the present disclosure.

FIG. 11 illustrates an example process, performed by the image decoding apparatus 100, for determining that a current coding unit is to be split into an odd number of coding units, if or when the coding units are not processable in a predetermined order, according to various embodiments of the present disclosure.

According to some embodiments, the image decoding apparatus 100 may determine that the current coding unit is to be split into an odd number of coding units, based on obtained block shape information and split shape mode information. Referring to FIG. 11, a square first coding unit 800 may be split into non-square second coding units 810a and 810b, and the second coding units 810a and 810b may be independently split into third coding units 820a and 820b, and 820c to 820e. According to some embodiments, the image decoding apparatus 100 may determine the plurality of third coding units 820a and 820b by splitting the left second coding unit 810a in a horizontal direction, and may split the right second coding unit 810b into the odd number of third coding units 820c to 820e.

According to some embodiments, the image decoding apparatus 100 may determine whether any coding unit is split into an odd number of coding units, by determining whether the third coding units (e.g., 820a and 820b, and 820c to 820e) may be processable in a predetermined order. Continuing to refer to FIG. 11, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, or the third coding units 820a and 820b, and 820c, 820d, and 820e is to be split into an odd number of coding units, based on at least one of the block shape information and the split shape mode information. For example, the right second coding unit 810b among the second coding units 810a and 810b may be split into an odd number of third coding units 820c, 820d, and 820e. A processing order of a plurality of coding units included in the first coding unit 800 may be a predetermined order (e.g., a Z-scan order 830), and the image decoding apparatus 100 may determine whether the third coding units 820c, 820d, and 820e, which may be determined by splitting the right second coding unit 810b into an odd number of coding units, satisfy a condition for processing in the predetermined order.

According to some embodiments, the image decoding apparatus 100 may determine whether the third coding units 820a and 820b, and 820c to 820e included in the first coding unit 800 satisfy the condition for processing in the predetermined order, and the condition may relate to whether at least one of a width and height of the second coding units 810a and 810b is split in half along a boundary of the third coding units 820a and 820b, and 820c to 820e. For example, the third coding units 820a and 820b determined if or when the height of the left second coding unit 810a of the non-square shape is split in half may satisfy the condition. If or when, the third coding units 820c to 820e are determined to not satisfy the condition in response to the boundaries of the third coding units 820c to 820e, determined if or when the right second coding unit 810b is split into three coding units, are unable to split the width or height of the right second coding unit 810b in half. If or when the condition is not satisfied as described above, the image decoding apparatus 100 may determine disconnection of a scan order, and may determine that the right second coding unit 810b is split into an odd number of coding units, based on a result of the determination. According to some embodiments, if or when a coding unit is split into an odd number of coding units, the image decoding apparatus 100 may place a predetermined restriction on a coding unit at a predetermined location from among the split coding units. The restriction or the predetermined location has been described above in relation to various embodiments, and thus detailed descriptions thereof will not be provided herein.

Figure 12:
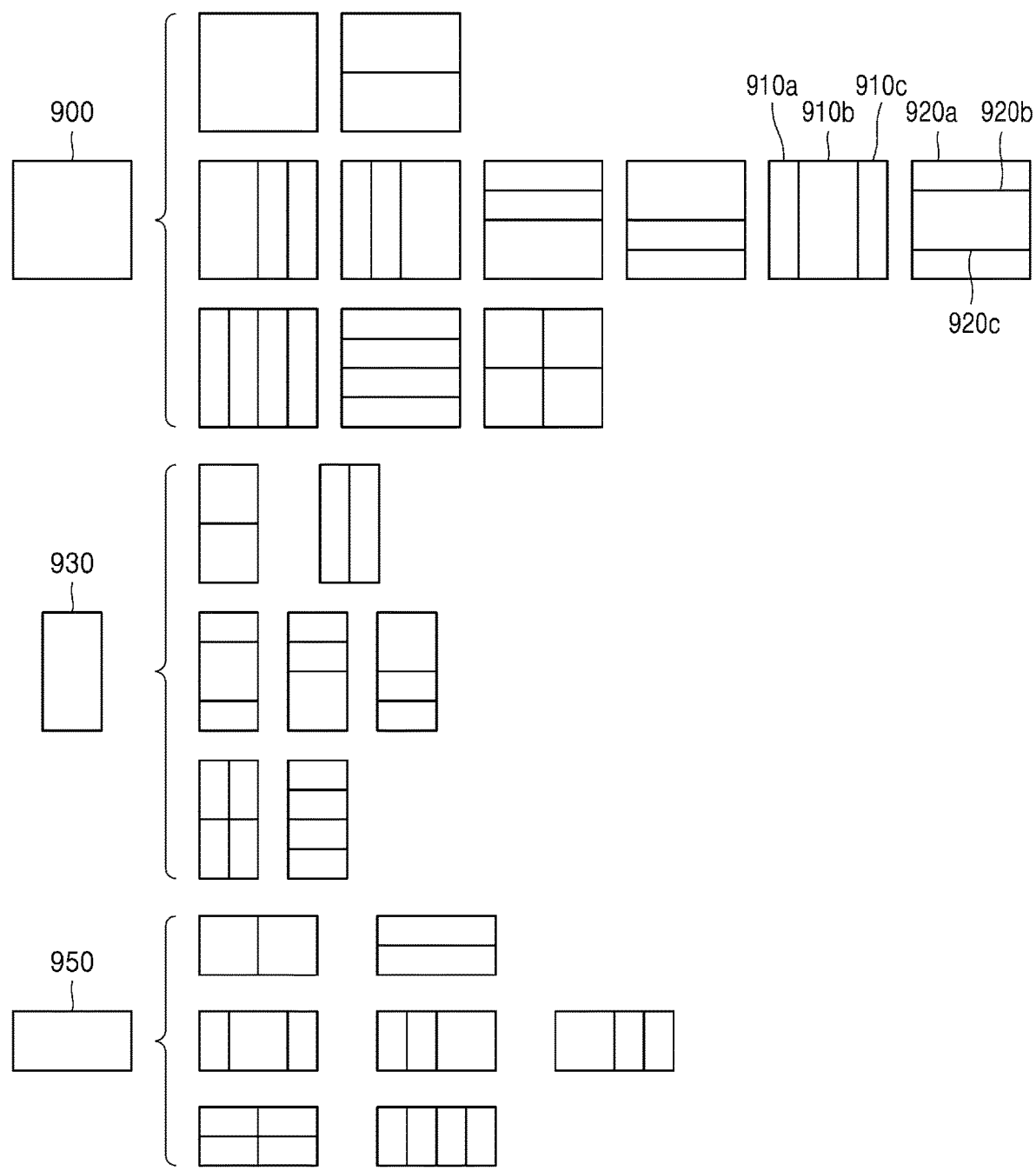
FIG. 12 illustrates an example process, performed by an image decoding apparatus, for determining at least one coding unit by splitting a first coding unit, according to various embodiments of the present disclosure.

FIG. 12 illustrates an example process, performed by the image decoding apparatus 100, for determining at least one coding unit by splitting a first coding unit 900, according to some embodiments.

According to some embodiments, the image decoding apparatus 100 may split the first coding unit 900, based on at least one of block shape information and split shape mode information that is obtained through the obtainer 105. The square first coding unit 900 may be split into four square coding units, or may be split into a plurality of non-square coding units. For example, referring to FIG. 12, if or when the block shape information indicates that the first coding unit 900 is a square and the split shape mode information indicates to split the first coding unit 900 into non-square coding units, the image decoding apparatus 100 may split the first coding unit 900 into a plurality of non-square coding units. That is, if or when the split shape mode information indicates to determine an odd number of coding units by splitting the first coding unit 900 in a horizontal direction or a vertical direction, the image decoding apparatus 100 may split the square first coding unit 900 into an odd number of coding units (e.g., second coding units 910a, 910b, and 910c) determined by splitting the square first coding unit 900 in a vertical direction or second coding units 920a, 920b, and 920c determined by splitting the square first coding unit 900 in a horizontal direction.

According to some embodiments, the image decoding apparatus 100 may determine whether the second coding units 910a, 910b, 910c, 920a, 920b, and 920c included in the first coding unit 900 satisfy a condition for processing in a predetermined order, and the condition may relate to whether at least one of a width and height of the first coding unit 900 is split in half along a boundary of the second coding units 910a, 910b, 910c, 920a, 920b, and 920c. Referring to FIG. 12, if or when boundaries of the second coding units 910a, 910b, and 910c determined by splitting the square first coding unit 900 in a vertical direction do not split the width of the first coding unit 900 in half, the first coding unit 900 may be determined to not satisfy the condition for processing in the predetermined order. Alternatively or additionally, if or when boundaries of the second coding units 920a, 920b, and 920c determined by splitting the square first coding unit 900 in a horizontal direction do not split the width (and/or height) of the first coding unit 900 in half, the first coding unit 900 may be determined to not satisfy the condition for processing in the predetermined order. If or when the condition is not satisfied as described above, the image decoding apparatus 100 may determine disconnection of a scan order, and may determine that the first coding unit 900 is to be split into an odd number of coding units, based on a result of the decision. According to some embodiments, if or when a coding unit is split into an odd number of coding units, the image decoding apparatus 100 may place a predetermined restriction on a coding unit at a predetermined location from among the split coding units. The restriction or the predetermined location has been described above in relation to various embodiments, and thus detailed descriptions thereof will not be provided herein.

According to some embodiments, the image decoding apparatus 100 may determine various-shaped coding units by splitting a first coding unit.

Referring to FIG. 12, the image decoding apparatus 100 may split the square first coding unit 900 or a non-square first coding unit 930 or 950 into various-shaped coding units.

Figure 13:
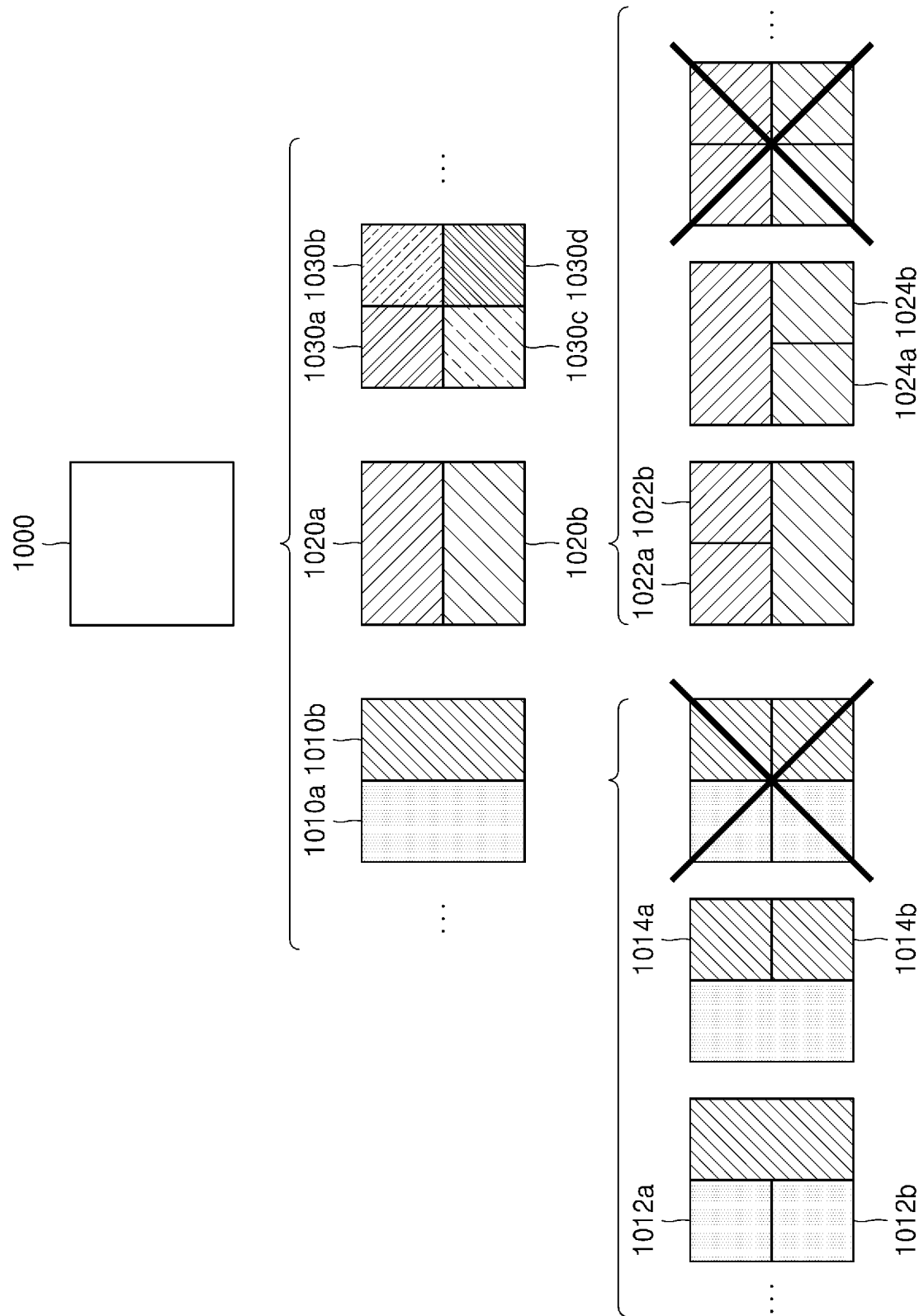
FIG. 13 is a diagram illustrating an example shape into which a second coding unit is splittable that may be restricted when the second coding unit having a non-square shape, which may be determined when an image decoding apparatus splits a first coding unit, satisfies a predetermined condition, according to various embodiments of the present disclosure.

FIG. 13 illustrates an example shape into which a second coding unit is splittable that may be restricted if or when the second coding unit having a non-square shape, which may be determined as the image decoding apparatus 100 splits a first coding unit 1000, satisfies a predetermined condition, according to various embodiments of the present disclosure.

According to some embodiments, the image decoding apparatus 100 may determine to split the square first coding unit 1000 into non-square second coding units 1010a and 1010b or 1020a and 1020b, based on at least one of block shape information and split shape mode information which may be obtained by the obtainer 105. The second coding units 1010a and 1010b or 1020a and 1020b may be independently split. Accordingly, the image decoding apparatus 100 may determine to split or not to split each of the second coding units 1010a and 1010b or 1020a and 1020b into a plurality of coding units, based on at least one of block shape information and split shape mode information about each of the second coding units 1010a and 1010b or 1020a and 1020b. According to some embodiments, the image decoding apparatus 100 may determine third coding units 1012a and 1012b by splitting the non-square left second coding unit 1010a, which may be determined by splitting the first coding unit 1000 in a vertical direction, in a horizontal direction. Alternatively or additionally, if or when the left second coding unit 1010a is split in a horizontal direction, the image decoding apparatus 100 may restrict the right second coding unit 1010b not to be split in a horizontal direction in which the left second coding unit 1010a is split. If or when third coding units 1014a and 1014b are determined by splitting the right second coding unit 1010b in a same direction, based on the left and right second coding units 1010a and 1010b being independently split in a horizontal direction, the third coding units 1012a and 1012b or 1014a and 1014b may be determined. In some embodiments, if or when the image decoding apparatus 100 splits the first coding unit 1000 into four square second coding units 1030a, 1030b, 1030c, and 1030d, based on at least one of the block shape information and the split shape mode information, may be inefficient in terms of image decoding.

According to some embodiments, the image decoding apparatus 100 may determine third coding units 1022a and 1022b or 1024a and 1024b by splitting the non-square second coding unit 1020a or 1020b, which may be determined by splitting the first coding unit 1000 in a horizontal direction, in a vertical direction. Alternatively or additionally, if or when a second coding unit (e.g., the upper second coding unit 1020a) is split in a vertical direction, the image decoding apparatus 100 may restrict the other second coding unit (e.g., the lower second coding unit 1020b) not to be split in a vertical direction in which the upper second coding unit 1020a is split.

Figure 14:
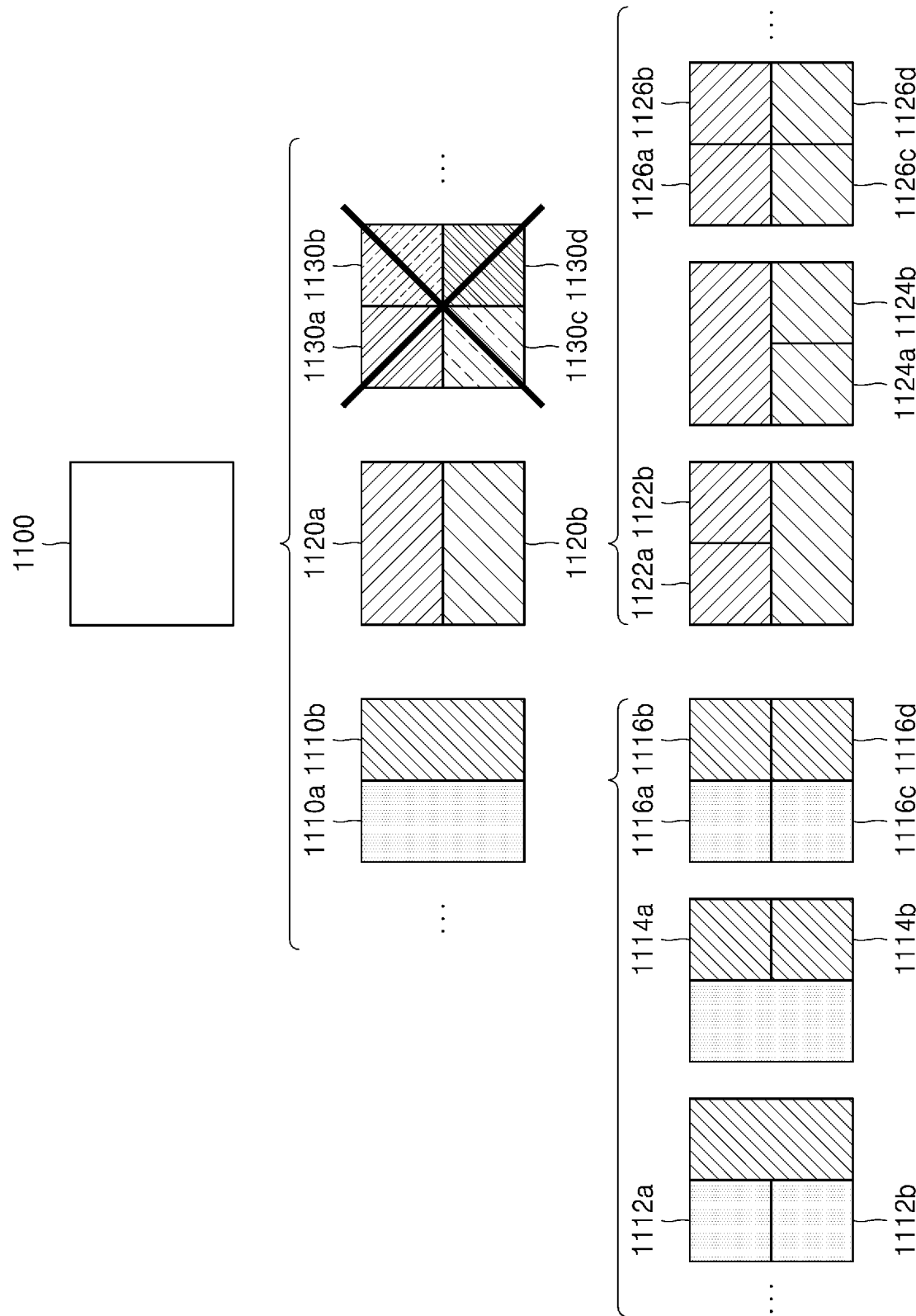
FIG. 14 illustrates an example process, performed by an image decoding apparatus, for splitting a square coding unit when split shape mode information indicates that the square coding unit is not to be split into four square coding units, according to various embodiments of the present disclosure.

FIG. 14 illustrates an example process, performed by the image decoding apparatus 100, for splitting a square coding unit if or when split shape mode information indicates that the square coding unit is not to be split into four square coding units, according to various embodiments of the present disclosure.

According to some embodiments, the image decoding apparatus 100 may determine second coding units (e.g., 1110*a* and 1110*b*, or 1120*a* and 1120*b*) by splitting a first coding unit 1100, based on at least one of block shape information and split shape mode information. The split shape mode information may include information about various methods of splitting a coding unit. Alternatively or additionally, the information about various splitting methods may not include information for splitting a coding unit into four square coding units. Based on the split shape mode information, the image decoding apparatus 100 does not split the square first coding unit 1100 into four square second coding units 1130*a*, 1130*b*, 1130*c*, and 1130*d*. The image decoding apparatus 100 may determine the non-square second coding units (e.g., 1110*a* and 1110*b*, or 1120*a* and 1120*b*), based on the split shape mode information.

According to some embodiments, the image decoding apparatus 100 may independently split the non-square second coding units (e.g., 1110*a* and 1110*b*, or 1120*a* and 1120*b*). Each of the second coding units (e.g., 1110*a* and 1110*b*, or 1120*a* and 1120*b*) may be recursively split in a predetermined order. In some embodiments, this splitting method may correspond to a method of splitting the first coding unit 1100, based on at least one of the block shape information and the split shape mode information.

For example, the image decoding apparatus 100 may determine square third coding units 1112*a* and 1112*b* by splitting the left second coding unit 1110*a* in a horizontal direction, and may determine square third coding units 1114*a* and 1114*b* by splitting the right second coding unit 1110*b* in a horizontal direction. Alternatively or additionally, the image decoding apparatus 100 may determine square third coding units 1116*a*, 1116*b*, 1116*c*, and 1116*d* by splitting both of the left and right second coding units 1110*a* and 1110*b* in a horizontal direction. As such, coding units having the same shape as the four square second coding units 1130*a*, 1130*b*, 1130*c*, and 1130*d* split from the first coding unit 1100 may be determined.

For another example, the image decoding apparatus 100 may determine square third coding units 1122*a* and 1122*b* by splitting the upper second coding unit 1120*a* in a vertical direction, and may determine square third coding units 1124*a* and 1124*b* by splitting the lower second coding unit 1120*b* in a vertical direction. Alternatively or additionally, the image decoding apparatus 100 may determine square third coding units 1126*a*, 1126*b*, 1126*c*, and 1126*d* by splitting both of the upper and lower second coding units 1120*a* and 1120*b* in a vertical direction. As such, coding units having the same shape as the four square second coding units 1130*a*, 1130*b*, 1130*c*, and 1130*d* split from the first coding unit 1100 may be determined.

Figure 15:
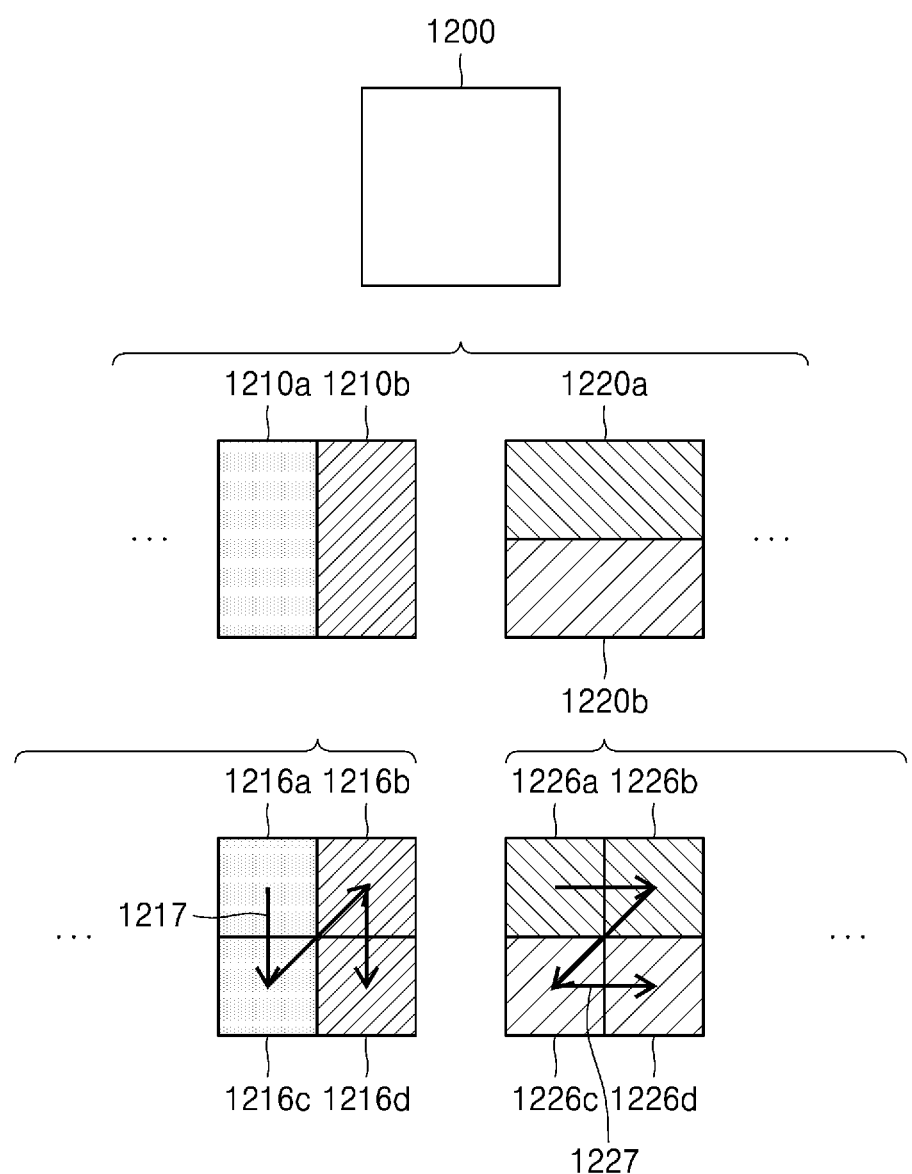
FIG. 15 illustrates an example processing order between a plurality of coding units that may be changed depending on a process of splitting a coding unit, according to various embodiments of the present disclosure.

FIG. 15 illustrates an example processing order between a plurality of coding units that may be changed depending on a process of splitting a coding unit, according to various embodiments of the present disclosure.

According to some embodiments, the image decoding apparatus 100 may split a first coding unit 1200, based on at least one of block shape information and split shape mode information. If or when the block shape information indicates a square shape and the split shape mode information indicates to split the first coding unit 1200 in at least one of horizontal and vertical directions, the image decoding apparatus 100 may determine second coding units (e.g., 1210*a* and 1210*b*, 1220*a* and 1220*b*, and the like) by splitting the first coding unit 1200. Referring to FIG. 15, the non-square second coding units 1210*a* and 1210*b* or 1220*a* and 1220*b* determined by splitting the first coding unit 1200 in a horizontal direction or a vertical direction may be independently split based on at least one of block shape information and split shape mode information about each coding unit. For example, the image decoding apparatus 100 may determine third coding units 1216*a*, 1216*b*, 1216*c*, and 1216*d* by splitting, in a horizontal direction, the second coding units 1210*a* and 1210*b*, which may have been generated by splitting the first coding unit 1200 in a vertical direction. Alternatively or additionally, the image decoding apparatus 100 may determine third coding units 1226*a*, 1226*b*, 1226*c*, and 1226*d* by splitting, in a vertical direction, the second coding units 1220*a* and 1220*b*, which may have been generated by splitting the first coding unit 1200 in a horizontal direction. An operation of splitting the second coding units 1210*a* and 1210*b* or 1220*a* and 1220*b* has been described above in relation to FIG. 13, and thus detailed descriptions thereof will not be provided herein.

According to some embodiments, the image decoding apparatus 100 may process coding units in a predetermined order. An operation of processing coding units in a predetermined order has been described above in relation to FIG. 10, and thus detailed descriptions thereof will not be provided herein. Referring to FIG. 15, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to some embodiments, the image decoding apparatus 100 may determine processing orders of the third coding units 1216*a*, 1216*b*, 1216*c*, and 1216*d*, and 1226*a*, 1226*b*, 1226*c*, and 1226*d* based on a splitting method of the first coding unit 1200.

According to some embodiments, the image decoding apparatus 100 may process the third coding units 1216*a*, 1216*b*, 1216*c*, and 1216*d* in a processing order 1217. For example, the processing order 1217 may indicate for initially processing the third coding units 1216*a* and 1216*c*, which are included in the left second coding unit 1210*a*, in a vertical direction and then processing the third coding units 1216*b* and 1216*d*, which are included in the right second coding unit 1210*b*, in a vertical direction.

According to some embodiments, the image decoding apparatus 100 may process the third coding units 1226*a*, 1226*b*, 1226*c*, and 1226*d* in a processing order 1227. For example, the processing order 1227 may indicate for initially processing the third coding units 1226*a* and 1226*b*, which are included in the upper second coding unit 1220*a*, in a horizontal direction and then processing the third coding units 1226*c* and 1226*d*, which are included in the lower second coding unit 1220*b*, in a horizontal direction.

Referring to FIG. 15, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. Accordingly, by recursively splitting a coding unit in different manners based on at least one of block shape information and split shape mode information, the image decoding apparatus 100 may process a plurality of coding units in different orders if or when the coding units may eventually be determined to have the same shape.

FIG. 16 illustrates an example process for determining a depth of a coding unit if or when a shape and size of the coding unit change, if or when the coding unit is recursively split such that a plurality of coding units are determined, according to various embodiments of the present disclosure.

According to some embodiments, the image decoding apparatus 100 may determine the depth of the coding unit, based on a predetermined criterion. For example, the predetermined criterion may be the length of a long side of the coding unit. If or when the length of a long side of a coding unit before being split is 2n times the length of a long side of a split current coding unit, the image decoding apparatus 100 may determine that a depth of the current coding unit is to be increased from a depth of the coding unit before being split by n, where n is an integer greater than zero. In some embodiments, a coding unit having an increased depth may be referred to as a coding unit of a lower depth.

Referring to FIG. 16, according to some embodiments, the image decoding apparatus 100 may determine a second coding unit 1302 and a third coding unit 1304 of lower depths by splitting a square first coding unit 1300 based on block shape information indicating a square shape (for example, the block shape information may be expressed as '0: SQUARE'). For example, if or when the size of the square first coding unit 1300 is 2N×2N, the second coding unit 1302 determined by splitting a width and height of the first coding unit 1300 in ½ may have a size of N×N. Alternatively or additionally, the third coding unit 1304 determined by splitting a width and height of the second coding unit 1302 in ½ may have a size of N/2×N/2. That is, a width and height of the third coding unit 1304 are ¼ times those of the first coding unit 1300. If or when a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to some embodiments, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (e.g., the block shape information may be referred to as '1: NS_VER' indicating a non-square shape with a height that is greater than a width, or as '2: NS_HOR' indicating a non-square shape with a width that is greater than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, and/or may determine the second coding unit 1312 having a size of N/2×N by splitting the first coding unit 1310 in horizontal and vertical directions.

According to some embodiments, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, and/or may determine the second coding unit 1322 having a size of N×N/2 by splitting the first coding unit 1320 in horizontal and vertical directions.

According to some embodiments, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to some embodiments, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, and/or may determine the third coding unit 1314 having a size of N/4×N/2 by splitting the second coding unit 1312 in vertical and horizontal directions.

According to some embodiments, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, and/or may determine the third coding unit 1324 having a size of N/2×N/4 by splitting the second coding unit 1322 in vertical and horizontal directions.

According to some embodiments, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, and/or may determine the first coding unit 1320 having a size of 2N×N by splitting the first coding unit 1300 in a horizontal direction. According to some embodiments, if or when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to some embodiments, a width and height of the third coding unit 1314 or 1324 may be ¼ times those of the first coding unit 1310 or 1320. If or when a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 17:
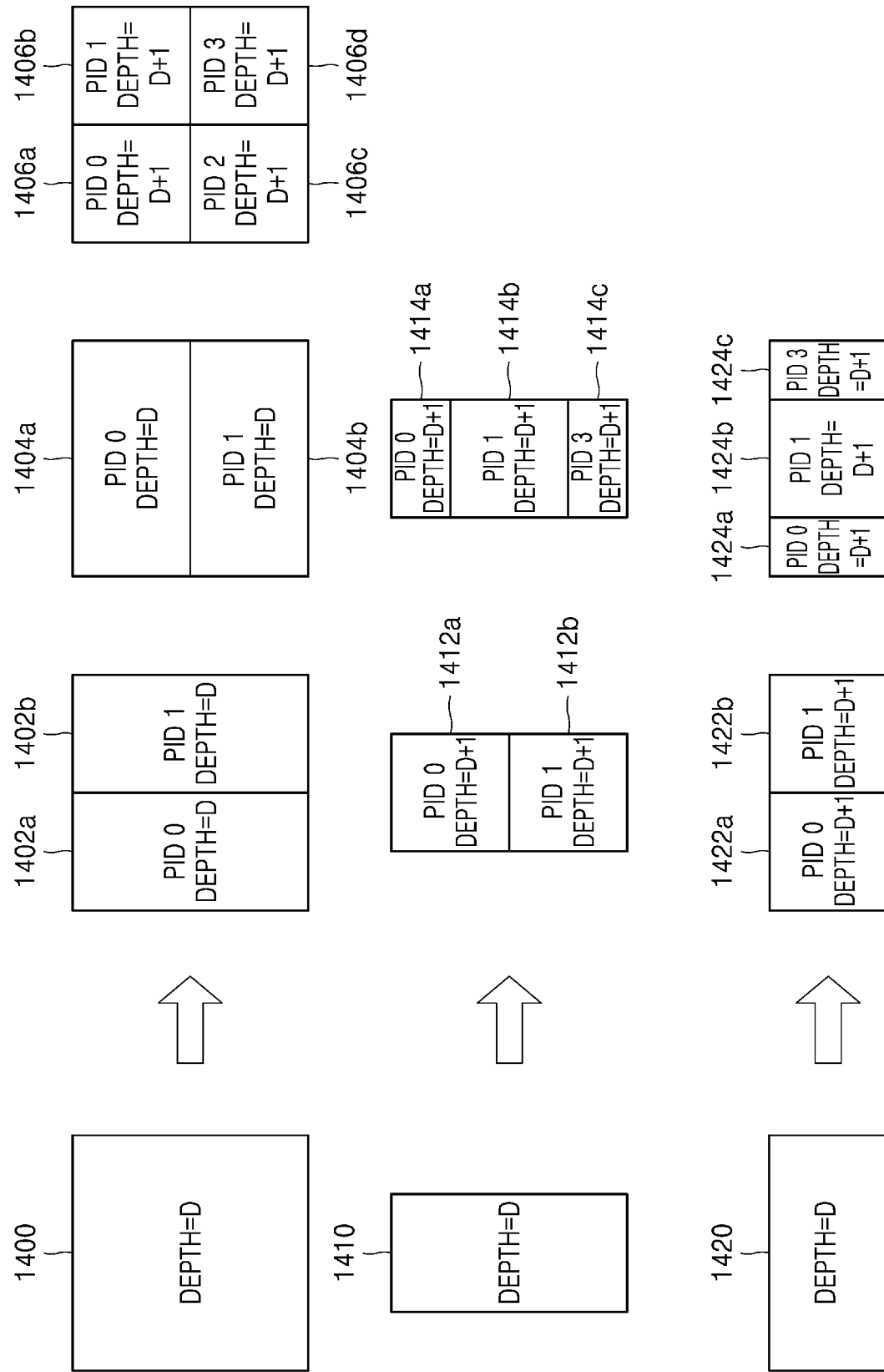
FIG. 17 illustrates example depths that may be determinable based on shapes and sizes of coding units, and part indexes (PIDs) for distinguishing the coding units, according to various embodiments of the present disclosure.

FIG. 17 illustrates example depths that may be determinable based on shapes and sizes of coding units, and part indexes (PIDs) that are for distinguishing the coding units, according to various embodiments of the present disclosure.

According to some embodiments, the image decoding apparatus 100 may determine various-shape second coding units by splitting a square first coding unit 1400. Referring to FIG. 17, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to some embodiments, depths of the second coding units 1402a and 1402b, 1404a and 1404b, and 1406a, 1406b, 1406c, and 1406d that have been determined based on the split shape mode information of the square first coding unit 1400 may be determined based on the length of a long side thereof. For example, if or when the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth (e.g., D). Alternatively or additionally, if or when the image decoding apparatus 100 splits the first coding unit 1400 into the four square second coding units 1406a, 1406b, 1406c, and 1406d based on the split shape mode information, based on the length of a side of the square second coding units 1406a, 1406b, 1406c, and 1406d being ½ times the length of a side of the first coding unit 1400, a depth of the second coding units 1406a, 1406b, 1406c, and 1406d may be D+1 which may be lower than the depth D of the first coding unit 1400 by 1.

According to some embodiments, the image decoding apparatus 100 may determine a plurality of second coding units 1412a and 1412b, and 1414a, 1414b, and 1414c by splitting a first coding unit 1410, a height of which may be greater than its width, in a horizontal direction based on the split shape mode information. According to some embodiments, the image decoding apparatus 100 may determine a plurality of second coding units 1422a and 1422b, and 1424a, 1424b, and 1424c by splitting a first coding unit 1420, a width of which may be greater than its height, in a vertical direction based on the split shape mode information.

According to some embodiments, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, if or when the length of a side of the square second coding units 1412a and 1412b is ½ times the length of a long side of the first coding unit 1410 having a non-square shape, a height of which may be greater than a width, a depth of the square second coding units 1412a and 1412b is D+1 which may be lower than the depth D of the non-square first coding unit 1410 by 1.

Alternatively or additionally, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In some embodiments, if or when the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which may be lower than the depth D of the non-square first coding unit 1410 by 1. The image decoding apparatus 100 may determine depths of coding units split from the first coding unit 1420 having a non-square shape, a width of which may be greater than a height, using the above-described method of determining depths of coding units split from the first coding unit 1410.

According to some embodiments, the image decoding apparatus 100 may determine PIDs for identifying split coding units, based on a size ratio between the coding units if or when an odd number of split coding units do not have equal sizes. Referring to FIG. 17, a coding unit 1414b of a center location among an odd number of split coding units 1414a, 1414b, and 1414c may have a width equal to that of the other coding units 1414a and 1414c and a height which may be two times that of the other coding units 1414a and 1414c. That is, the coding unit 1414b at the center location may include two of the other coding unit 1414a or 1414c. Therefore, if or when a PID of the coding unit 1414b at the center location is 1 based on a scan order, a PID of the coding unit 1414c located next to the coding unit 1414b may be increased by 2 and thus may be 3. That is, discontinuity in PID values may be present. According to some embodiments, the image decoding apparatus 100 may determine whether an odd number of split coding units do not have equal sizes, based on whether discontinuity is present in PIDs for identifying the split coding units.

According to some embodiments, the image decoding apparatus 100 may determine whether to use a specific splitting method, based on PID values for identifying a plurality of coding units determined by splitting a current coding unit. Referring to FIG. 17, the image decoding apparatus 100 may determine an even number of coding units 1412a and 1412b or an odd number of coding units 1414a, 1414b, and 1414c by splitting the first coding unit 1410 having a rectangular shape, a height of which may be greater than a width. The image decoding apparatus 100 may use PIDs to identify respective coding units. According to some embodiments, the PID may be obtained from a sample of a predetermined location of each coding unit (e.g., an upper left sample).

According to some embodiments, the image decoding apparatus 100 may determine a coding unit at a predetermined location from among the split coding units, using the PIDs for distinguishing the coding units. According to some embodiments, if or when the split shape mode information of the first coding unit 1410 having a rectangular shape, a height of which may be greater than its width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to some embodiments, the image decoding apparatus 100 may determine PIDs for distinguishing split coding units, based on a size ratio between the coding units if or when the split coding units do not have equal sizes. Referring to FIG. 17, the coding unit 1414b generated by splitting the first coding unit 1410 may have a width equal to that of the other coding units 1414a and 1414c and a height which may be two times that of the other coding units 1414a and 1414c. In some embodiments, if or when the PID of the coding unit 1414b at the center location is 1, the PID of the coding unit 1414c located next to the coding unit 1414b may be increased by 2 and thus may be 3. If or when the PID is not uniformly increased as described above, the image decoding apparatus 100 may determine that a coding unit is split into a plurality of coding units including a coding unit having a size different from that of the other coding units. According to some embodiments, if or when the split shape mode information indicates to split a coding unit into an odd number of coding units, the image decoding apparatus 100 may split a current coding unit in such a manner that a coding unit of a predetermined location among an odd number of coding units (e.g., a coding unit of a center location) has a size different from that of the other coding units. In some embodiments, the image decoding apparatus 100 may determine the coding unit of the center location, which has a different size, using PIDs of the coding units. However, the PIDs and the size or location of the coding unit of the predetermined location are not limited to the above-described examples, and various PIDs and various locations and sizes of coding units may be used.

According to some embodiments, the image decoding apparatus 100 may use a predetermined data unit where a coding unit starts to be recursively split.

Figure 18:
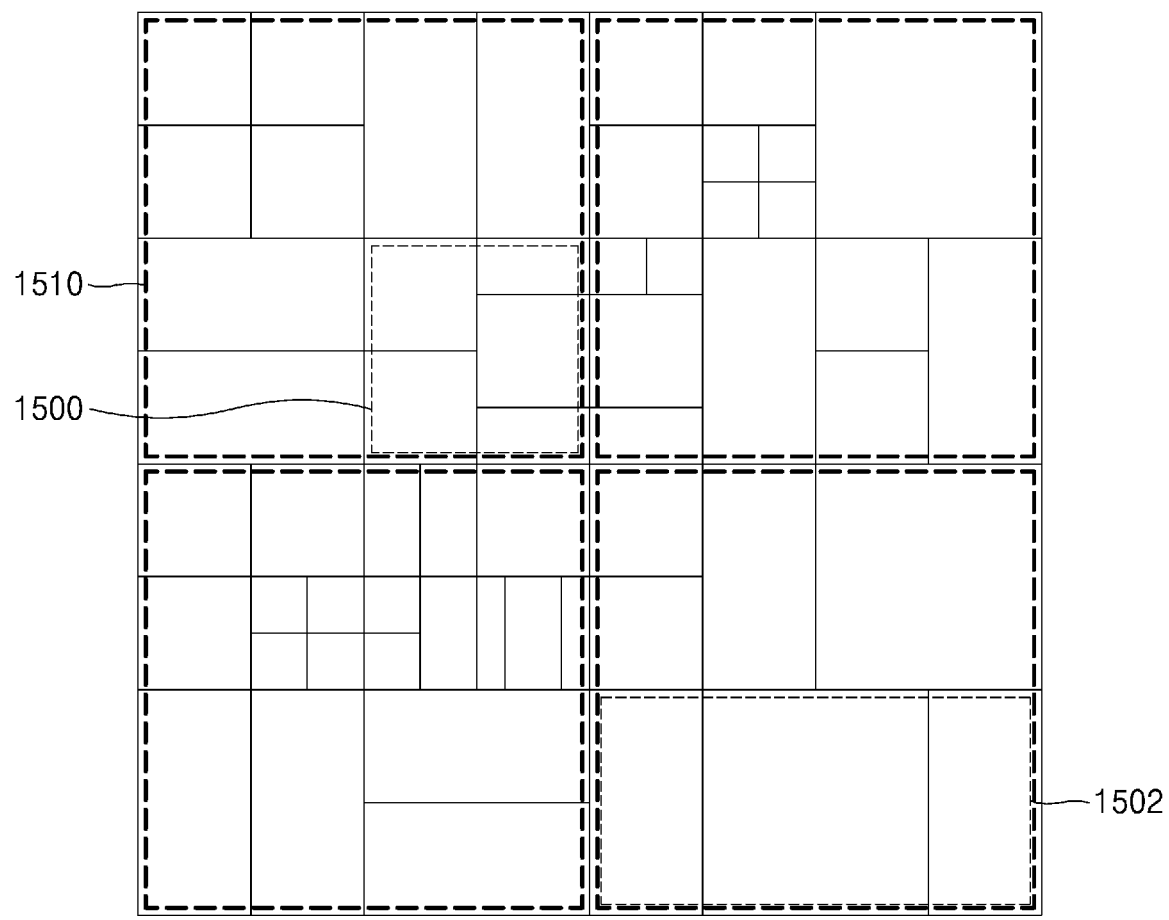
FIG. 18 illustrates an example plurality of coding units that may be determined based on a plurality of predetermined data units included in a picture, according to various embodiments of the present disclosure.

FIG. 18 illustrates an example plurality of coding units that may be determined based on a plurality of predetermined data units included in a picture, according to various embodiments of the present disclosure.

According to some embodiments, a predetermined data unit may refer to a data unit where a coding unit starts to be recursively split using at least one of block shape information and split shape mode information. That is, the predetermined data unit may correspond to a coding unit of an uppermost depth, which may be used to determine a plurality of coding units split from a current picture. In the following descriptions, for convenience of explanation, the predetermined data unit may be referred to as a reference data unit.

According to some embodiments, the reference data unit may have a predetermined size and/or a predetermined size shape. According to some embodiments, the reference data unit may include M×N samples. Herein, M and N may be equal to each other, and may be integers expressed as powers of 2. That is, the reference data unit may have a square or non-square shape, and may be split into an integer number of coding units.

According to some embodiments, the image decoding apparatus 100 may split the current picture into a plurality of reference data units. According to some embodiments, the image decoding apparatus 100 may split the plurality of reference data units, which are split from the current picture, using the split shape mode information of each reference data unit. The operation of splitting the reference data unit may correspond to a splitting operation using a quadtree structure.

According to some embodiments, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units using the block shape information and the split shape mode information with reference to the determined reference data unit.

Referring to FIG. 18, the image decoding apparatus 100 may use a square reference coding unit 1500 and/or a non-square reference coding unit 1502. According to some embodiments, the shape and size of reference coding units may be determined based on various data units that may include one or more reference coding units (e.g., sequences, pictures, slices, slice segments, largest coding units, and the like).

According to some embodiments, the obtainer 105 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 6, and an operation of splitting the non-square reference coding unit 1502 into one or more coding units has been described in reference to the operation of splitting the current coding unit 400 and/or 450 of FIG. 7. Thus, further descriptions thereof will not be provided herein.

According to some embodiments, the image decoding apparatus 100 may use a PID for identifying the size and shape of reference coding units, to determine the size and shape of reference coding units according to some data units previously determined based on a predetermined condition. That is, the obtainer 105 may obtain, from the bitstream, the PID for identifying the size and shape of reference coding units with respect to each slice, each slice segment, or each largest coding unit which may be a data unit satisfying a predetermined condition (e.g., a data unit having a size equal to or smaller than a slice) among the various data units (e.g., sequences, pictures, slices, slice segments, largest coding units, and the like). The image decoding apparatus 100 may determine the size and shape of reference coding units with respect to each data unit, which satisfies the predetermined condition, using the PID. If or when the reference coding unit shape information and the reference coding unit size information are obtained and used from the bitstream according to each data unit having a relatively small size, efficiency of using the bitstream may not be high, and therefore, the PID may be obtained and used instead of directly obtaining the reference coding unit shape information and the reference coding unit size information. In some embodiments, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to some embodiments, the image decoding apparatus 100 may use one or more reference coding units included in a largest coding unit. That is, a largest coding unit split from a picture may include one or more reference coding units, and coding units may be determined by recursively splitting each reference coding unit. According to some embodiments, at least one of a width and height of the largest coding unit may be integer times at least one of the width and height of the reference coding units. According to some embodiments, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments of the disclosure.

Figure 19:
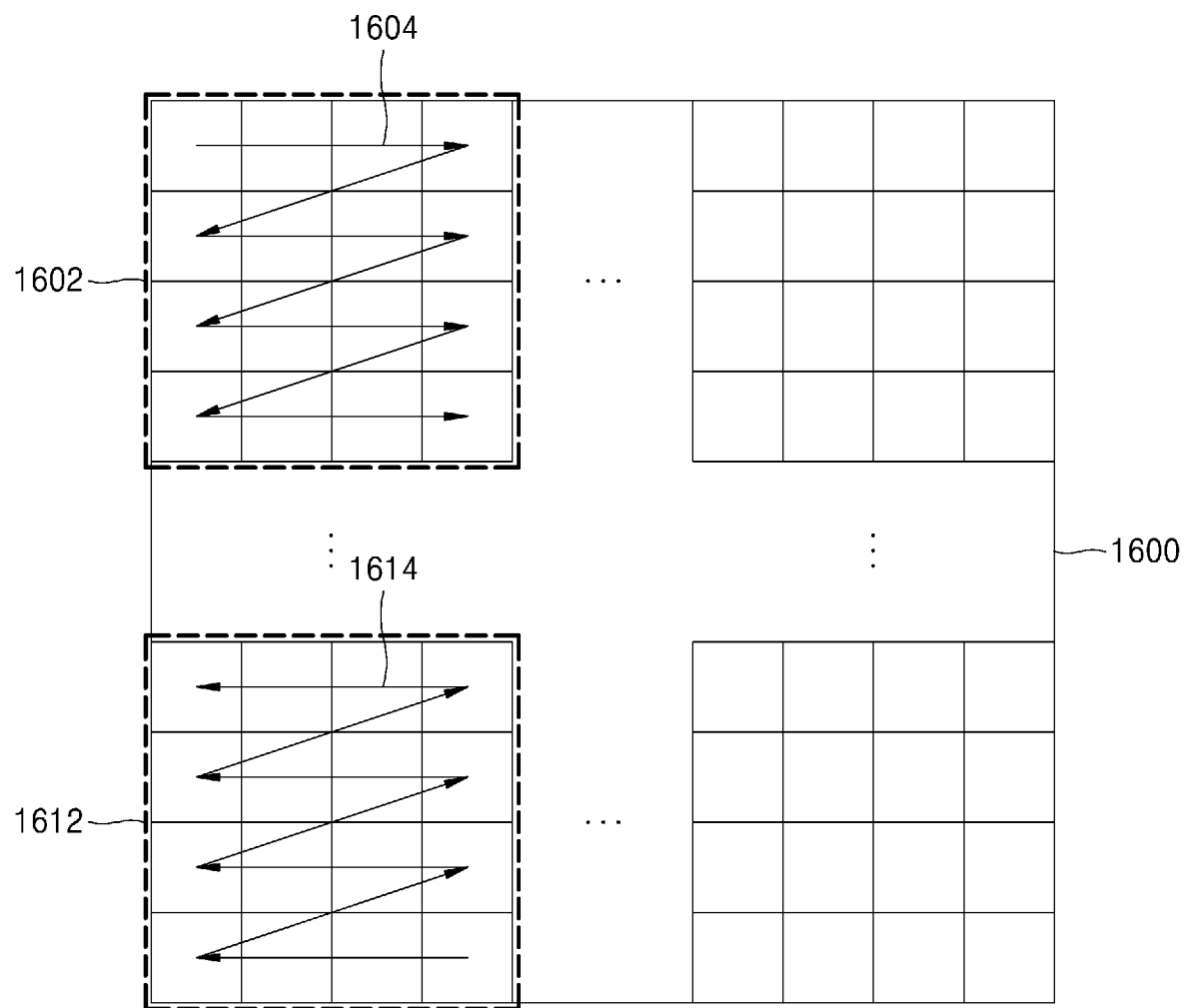
FIG. 19 illustrates an example processing block serving as a unit for determining a determination order of reference coding units included in a picture, according to various embodiments of the present disclosure.

FIG. 19 illustrates an example processing block serving as a criterion for determining a determination order of reference coding units included in a picture 1600, according to various embodiments of the disclosure.

According to some embodiments, the image decoding apparatus 100 may determine one or more processing blocks split from a picture 1600. The processing block may be a data unit including one or more reference coding units split from a picture 1600, and the one or more reference coding units included in the processing block may be determined according to a particular order. That is, a determination order of one or more reference coding units determined in each of processing blocks may correspond to one of various types of orders for determining reference coding units, and may vary depending on the processing block. The determination order of reference coding units, which may be determined with respect to each processing block, may be one of various orders (e.g., raster scan order, Z-scan, N-scan, up-right diagonal scan, horizontal scan, and vertical scan) but is not limited to the aforementioned scan orders.

According to some embodiments, the image decoding apparatus 100 may obtain processing block size information and may determine the size of one or more processing blocks included in the picture 1600. The image decoding apparatus 100 may obtain the processing block size information from a bitstream and may determine the size of one or more processing blocks included in the picture 1600. The size of processing blocks may be a predetermined size of data units, which may be indicated by the processing block size information.

According to some embodiments, the obtainer 105 of the image decoding apparatus 100 may obtain the processing block size information from the bitstream according to each particular data unit. For example, the processing block size information may be obtained from the bitstream in a data unit such as an image, sequence, picture, slice, slice segment, or the like. That is, the obtainer 105 may obtain the processing block size information from the bitstream according to each of the various data units, and the image decoding apparatus 100 may determine the size of one or more processing blocks, which may be split from the picture 1600, using the obtained processing block size information. In some embodiments, the size of the processing blocks may be integer times (e.g., N) that of the reference coding units.

According to some embodiments, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 19, according to some embodiments, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to some embodiments, the image decoding apparatus 100 may determine the processing blocks 1602 and 1612, which may be included in the picture 1600, based on the size of processing blocks, and may determine a determination order of one or more reference coding units in the processing blocks 1602 and 1612. According to some embodiments, determination of reference coding units may include determination of the size of the reference coding units.

According to some embodiments, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to some embodiments, the image decoding apparatus 100 may obtain, from the bitstream, the determination order information of reference coding units according to each particular data unit. For example, the obtainer 105 may obtain the determination order information of reference coding units from the bitstream according to each data unit such as an image, sequence, picture, slice, slice segment, or processing block. In response to the determination order information of reference coding units indicating an order for determining reference coding units in a processing block, the determination order information may be obtained with respect to each particular data unit including an integer number of processing blocks.

According to some embodiments, the image decoding apparatus 100 may determine one or more reference coding units based on the determined determination order.

According to some embodiments, the obtainer 105 may obtain the determination order information of reference coding units from the bitstream as information related to the processing blocks 1602 and 1612, and the image decoding apparatus 100 may determine a determination order of one or more reference coding units included in the processing blocks 1602 and 1612 and may determine one or more reference coding units, which are included in the picture 1600, based on the determination order. Referring to FIG. 19, the image decoding apparatus 100 may determine determination orders 1604 and 1614 of one or more reference coding units in the processing blocks 1602 and 1612, respectively. For example, if or when the determination order information of reference coding units is obtained with respect to each processing block, different types of the determination order information of reference coding units may be obtained for the processing blocks 1602 and 1612. If or when the determination order 1604 of reference coding units in the processing block 1602 is a raster scan order, reference coding units included in the processing block 1602 may be determined according to a raster scan order. On the contrary, if or when the determination order 1614 of reference coding units in the other processing block 1612 is a backward raster scan order, reference coding units included in the processing block 1612 may be determined according to the backward raster scan order.

According to some embodiments, the image decoding apparatus 100 may decode the determined one or more reference coding units. The image decoding apparatus 100 may decode an image, based on the reference coding units determined as described above. A method of decoding the reference coding units may include various image decoding methods.

According to some embodiments, the image decoding apparatus 100 may obtain, from the bitstream, block shape information indicating the shape of a current coding unit or split shape mode information indicating a splitting method of the current coding unit, and may use the obtained information. The block shape information or the split shape mode information may be included in the bitstream related to various data units. For example, the image decoding apparatus 100 may use the block shape information or the split shape mode information which may be included in a sequence parameter set, a picture parameter set, a video parameter set, a slice header, a slice segment header, a tile header, or a tile group header. Alternatively or additionally, the image decoding apparatus 100 may obtain, from the bitstream, a syntax element corresponding to the block shape information or the split shape mode information according to each largest coding unit, each reference coding unit, or each processing block, and may use the obtained syntax element.

Various embodiments have been described above. It will be understood by one of ordinary skill in the art that the disclosure may be embodied in many different forms without departing from essential features of the disclosure. Therefore, the embodiments of the disclosure set forth herein should be considered in a descriptive sense and not for purposes of limitation. The scope of the disclosure is set forth in the claims rather than in the foregoing description, and all differences falling within a scope equivalent thereto should be construed as being included in the disclosure.

The above-described embodiments of the disclosure may be written as a computer executable program and implemented by a general-purpose digital computer which operates the program via a computer-readable recording medium. The computer-readable recording medium may include a storage medium such as a magnetic storage medium (e.g., a ROM, a floppy disk, a hard disk, and the like) and an optical recording medium (e.g., a CD-ROM, a DVD, and the like).

The invention claimed is:

1. An image decoding method, comprising:
   determining, when a current prediction mode of a current block is an intra mode, a first sample value of an upper left reference sample of the current block by identifying a first availability of the upper left reference sample of the current block;
   sequentially searching, for remaining reference samples of at least one reference line from a plurality of reference lines, except for the upper left reference sample, the plurality of reference lines comprising a left reference line of the current block, an upper reference line of the current block, and a right reference line of the current block;
   determining second sample values of the remaining reference samples of the current block by identifying a second availability of the searched remaining reference samples;
   performing intra prediction on the current block to obtain a prediction block of the current block, based on the first sample value of the upper left reference sample of the current block and the second sample values of the remaining reference samples of the current block;
   obtaining, from a bitstream, residual data of the current block;
   obtaining a residual block of the current block using the residual data of the current block obtained from the bitstream; and
   obtaining a reconstruction block of the current block, based on the prediction block of the current block and the residual block of the current block,
   wherein the determining of the first sample value of the upper left reference sample of the current block comprises:
   determining, when the upper left reference sample is not available, a first value obtained based on a sample bit depth as the first sample value of the upper left reference sample,
   wherein the determining of the second sample values of the remaining reference samples of the current block comprises:
   determining, when a current reference sample in a current search location is not available, a second value obtained based on a sample value of a reference sample in a previous search location as a current sample value of the current reference sample in the current search location,
   wherein a first search direction of the upper reference line is a right direction relative to the upper left reference sample,
   wherein a second search direction of the left reference line is a first lower direction relative to the upper left reference sample,
   wherein a third search direction of the right reference line is a second lower direction relative to an upper right reference sample of the current block, and
   wherein when a coordinate value of an upper left corner sample of the current block is (0,0), a x-axis coordinate value of the upper right reference sample of the current block is a width of the current block, and a y-axis coordinate value of the upper right reference sample of the current block is −1.

2. An image decoding apparatus, comprising:
   a memory; and
   at least one processor communicatively coupled to the memory and configured to:
   determine, when a current prediction mode of a current block is an intra mode, a first sample value of an upper left reference sample of the current block by identifying a first availability of the upper left reference sample of the current block;
   sequentially search for remaining reference samples of at least one reference line from a plurality of reference lines, except for the upper left reference sample, the plurality of reference lines comprising a left reference line of the current block, an upper reference line of the current block, and a right reference line of the current block;
   determine second sample values of the remaining reference samples of the current block by identifying a second availability of the searched remaining reference samples;
   perform intra prediction on the current block to obtain a prediction block of the current block, based on the first sample value of the upper left reference sample of the current block and the second sample values of the remaining reference samples of the current block;
   obtain, from a bitstream, residual data of the current block;
   obtain a residual block of the current block using the residual data of the current block obtained from the bitstream; and
   obtain a reconstruction block of the current block, based on the prediction block of the current block and the residual block of the current block,
   wherein the at least one processor is further configured, when the at least one processor determines the first sample value of the upper left reference sample of the current block, to:
   determine, when the upper left reference sample is not available, a first value obtained based on a sample bit depth as the first sample value of the upper left reference sample, wherein the at least one processor is further configured, when the at least one processor determines the second sample values of the remaining reference samples of the current block, to:

determine, when a current reference sample in a current search location is not available, a second value obtained based on a sample value of a reference sample in a previous search location as a current sample value of the current reference sample in the current search location, wherein a first search direction of the upper reference line is a right direction relative to the upper left reference sample, wherein a second search direction of the left reference line is a first lower direction relative to the upper left reference sample, wherein a third search direction of the right reference line is a second lower direction relative to an upper right reference sample of the current block, and wherein when a coordinate value of an upper left corner sample of the current block is (0,0), a x-axis coordinate value of the upper right reference sample of the current block is a width of the current block, and a y-axis coordinate value of the upper right reference sample of the current block is −1.

3. An image encoding method, comprising:

determining, when a prediction mode of a current block is an intra mode, a first sample value of an upper left reference sample of the current block by identifying a first availability of the upper left reference sample of the current block;

sequentially searching for remaining reference samples of at least one reference line from a plurality of reference lines, except for the upper left reference sample, the plurality of reference lines comprising a left reference line of the current block, an upper reference line of the current block, and a right reference line of the current block;

determining second sample values of the remaining reference samples of the current block by identifying a second availability of the searched remaining reference samples;

performing intra prediction on the current block to obtain a prediction block of the current block, based on the first sample value of the upper left reference sample of the current block and the second sample values of the remaining samples; and based on the prediction block of the current block, generating a bitstream comprising residual data of the current block, wherein the determining of the first sample value of the upper left reference sample of the current block comprises:

determining, when the upper left reference sample is not available, a first value obtained based on a sample bit depth as the first sample value of the upper left reference sample, wherein the determining of the second sample values of the remaining reference samples of the current block comprises:

determining, when a current reference sample in a current search location is not available, a second value obtained based on a sample value of a reference sample in a previous search location as a current sample value of the current reference sample in the current search location, wherein a first search direction of the upper reference line is a right direction relative to the upper left reference sample, wherein a second search direction of the left reference line is a first lower direction relative to the upper left reference sample, wherein a third search direction of the right reference line is a second lower direction relative to an upper right reference sample of the current block, and wherein when a coordinate value of an upper left corner sample of the current block is (0,0), a x-axis coordinate value of the upper right reference sample of the current block is a width of the current block, and a y-axis coordinate value of the upper right reference sample of the current block is −1.

4. A non-transitory computer-readable medium storing computer-executable instructions for recording a bitstream that, when executed by at least one processor of a device, cause the device to record the bitstream comprising:

residual data of a current block, wherein the residual data of the current block is generated based on a prediction block of the current block, wherein the prediction block of the current block is obtained by performing intra prediction on the current block based on a first sample value of an upper left reference sample of the current block and second sample values of remaining reference samples, except for the upper left reference sample, wherein, when a prediction mode of the current block is an intra mode, the first sample value of the upper left reference sample of the current block is determined by identifying a first availability of the upper left reference sample of the current block, wherein the second sample values of the remaining reference samples of the current block are determined by sequentially searching for the remaining reference samples of at least one reference line from a plurality of reference lines and identifying a second availability of the searched remaining reference samples, wherein the plurality of reference lines comprising a left reference line of the current block, an upper reference line of the current block, and a right reference line of the current block, wherein, when the upper left reference sample is not available, a first value obtained based on a sample bit depth is determined as the first sample value of the upper left reference sample, wherein, when a current reference sample in a current search location is not available, a second value obtained based on a sample value of a reference sample in a previous search location is determined as a current sample value of the current reference sample in the current search location, wherein a first search direction of the upper reference line is a right direction relative to the upper left reference sample, wherein a second search direction of the left reference line is a first lower direction relative to the upper left reference sample, wherein a third search direction of the right reference line is a second lower direction relative to an upper right reference sample of the current block, and wherein when a coordinate value of an upper left corner sample of the current block is (0,0), a x-axis coordinate value of the upper right reference sample of the current block is a width of the current block, and a y-axis coordinate value of the upper right reference sample of the current block is −1.

* * * * *